US012657185B1

(12) United States Patent

Miller et al.

(10) Patent No.: US 12,657,185 B1

(45) Date of Patent: *Jun. 16, 2026

(54) ANALYZING A MODIFIED QUERY TO DETERMINE DATA ON WHICH TO EXECUTE THE MODIFIED QUERY

(71) Applicant: Cisco Technology, Inc., San Jose, CA (US)

(72) Inventors: Jesse Brandau Miller, San Francisco, CA (US); Marc V. Robichaud, San Francisco, CA (US); Cory Eugene Burke, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/772,809

(22) Filed: Jul. 15, 2024

Related U.S. Application Data

(63) Continuation of application No. 17/874,024, filed on Jul. 26, 2022, now Pat. No. 12,067,007, which is a (Continued)

(51) Int. Cl.
*G06F 7/00* (2006.01)
*G06F 16/242* (2019.01)
(Continued)

(52) U.S. Cl.
CPC ...... *G06F 16/2425* (2019.01); *G06F 16/2428* (2019.01); *G06F 16/2455* (2019.01); *G06F 16/248* (2019.01)

(58) Field of Classification Search
CPC ............. G06F 16/2425; G06F 16/2428; G06F 16/2455; G06F 16/248; G06F 16/14;
(Continued)

(56) References Cited

U.S. PATENT DOCUMENTS 12,067,007 B1 * 8/2024 Miller ................. G06F 16/2428
2005/0289109 A1 * 12/2005 Arrouye .................. G06F 16/14
(Continued)

OTHER PUBLICATIONS

U.S. Appl. No. 15/221,392, filed Jul. 27, 2016, Granted.
U.S. Appl. No. 16/776,317, filed Jan. 29, 2020, Granted.
U.S. Appl. No. 17/874,024, filed Jul. 26, 2022, Granted.

*Primary Examiner* — Mohammad A Sana
(74) *Attorney, Agent, or Firm* — Shook, Hardy & Bacon L.L.P.

(57) ABSTRACT

A method includes causing display to a user of at least one event of a first result set from a first pipelined search on events at an event source. Each event comprises a time stamp and a portion of machine data. A selection of a command is received from the user. The selection is to extend the first pipelined search with the selected command in a second pipelined search. The system selects between the first result set and the event source for execution of the second pipelined search based on an analysis of the selected command and at least one command of the first pipelined search. Based on the selecting being of the first result set, display to the user is caused of at least one event of a second result set from the execution of the second pipelined search on the first result set.

19 Claims, 38 Drawing Sheets

Related U.S. Application Data continuation of application No. 16/776,317, filed on Jan. 29, 2020, now Pat. No. 11,429,600, which is a continuation of application No. 15/221,392, filed on Jul. 27, 2016, now Pat. No. 10,558,651.

(51) Int. Cl.
*G06F 16/2455* (2019.01)
*G06F 16/248* (2019.01)

(58) Field of Classification Search
CPC ............... G06F 16/38; G06F 16/24578; G06F 3/04842; G06F 3/0482; G06F 3/04883
See application file for complete search history.

(56) References Cited

U.S. PATENT DOCUMENTS

| | | | |
|---|---|---|---|
| 2009/0063206 A1* | 3/2009 | Payne ................. | G06Q 30/0601 705/26.1 |
| 2009/0193009 A1 | 7/2009 | Naick et al. | |
| 2009/0198675 A1 | 8/2009 | Mihalik et al. | |
| 2014/0053088 A1* | 2/2014 | Civelli .............. | G06F 16/90335 715/760 |
| 2015/0019537 A1 | 1/2015 | Neels et al. | |
| 2015/0026167 A1* | 1/2015 | Neels ................... | G06F 3/0482 707/723 |
| 2015/0081356 A1 | 3/2015 | Olson et al. | |
| 2016/0012111 A1 | 1/2016 | Pattabhiraman et al. | |
| 2016/0034827 A1 | 2/2016 | Morris | |
| 2016/0335303 A1 | 11/2016 | Madhalam et al. | |
| 2018/0039638 A1* | 2/2018 | Krivokon ........... | G06F 16/3322 |

* cited by examiner

302 — RECEIVE DATA

304 — ANNOTATE DATA WITH METADATA FIELDS

306 — PARSE DATA INTO EVENTS

308 — DETERMINE TIMESTAMPS FOR EVENTS

310 — ASSOCIATE TIMESTAMPS AND OTHER METADATA FIELDS WITH EVENTS

312 — TRANSFORM EVENTS

314 — IDENTIFY KEYWORDS IN EVENTS

316 — UPDATE KEYWORD INDEX

318 — STORE EVENTS IN DATA STORE

402 — SEARCH HEAD RECEIVES QUERY FROM CLIENT

404 — SEARCH DETERMINES WHAT PORTIONS OF THE QUERY CAN BE DISTRIBUTED TO INDEXERS

406 — SEARCH HEAD DISTRIBUTES PORTIONS OF QUERY TO INDEXERS

408 — INDEXERS SEARCH DATA STORE FOR QUERY-RESPONSIVE EVENTS

410 — SEARCH HEAD COMBINES ANY PARTIAL RESULTS OR EVENTS TO PRODUCE FINAL RESULT

Data Summary                                                                    ×

| Hosts (5) | Sources (8) | Sourcetypes (3) |

( filter )

| Host ◇ | | Count ◇ | Last Update ◇ |
|---|---|---|---|
| mailsv | ‑ıl ⌄ | 9,829 | 4/29/14 1:32:47.000 PM |
| vendor_sales | ‑ıl ⌄ | 30,244 | 4/29/14 1:32:46.000 PM |
| www1 | ‑ıl ⌄ | 24,221 | 4/29/14 1:32:44.000 PM |
| www2 | ‑ıl ⌄ | 22,595 | 4/29/14 1:32:47.000 PM |
| www3 | ‑ıl ⌄ | 22,975 | 4/29/14 1:32:45.000 PM |

FIG. 6B

Figure 8:
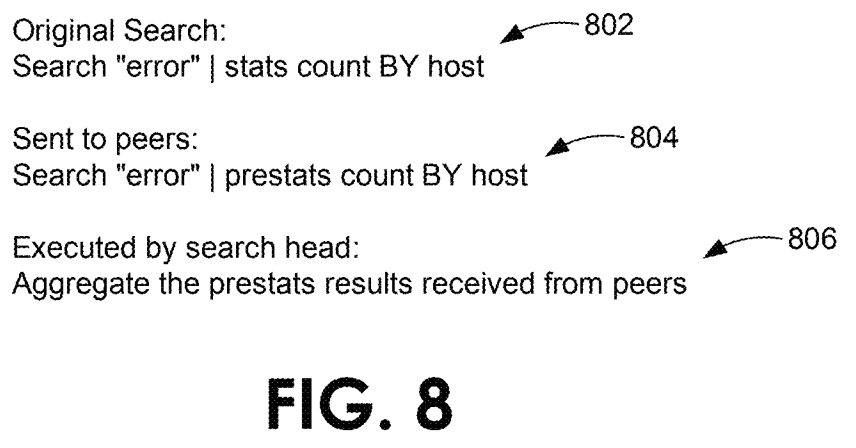

Original Search: — 802
Search "error" | stats count BY host

Sent to peers: — 804
Search "error" | prestats count BY host

Executed by search head: — 806
Aggregate the prestats results received from peers

Figure 14:
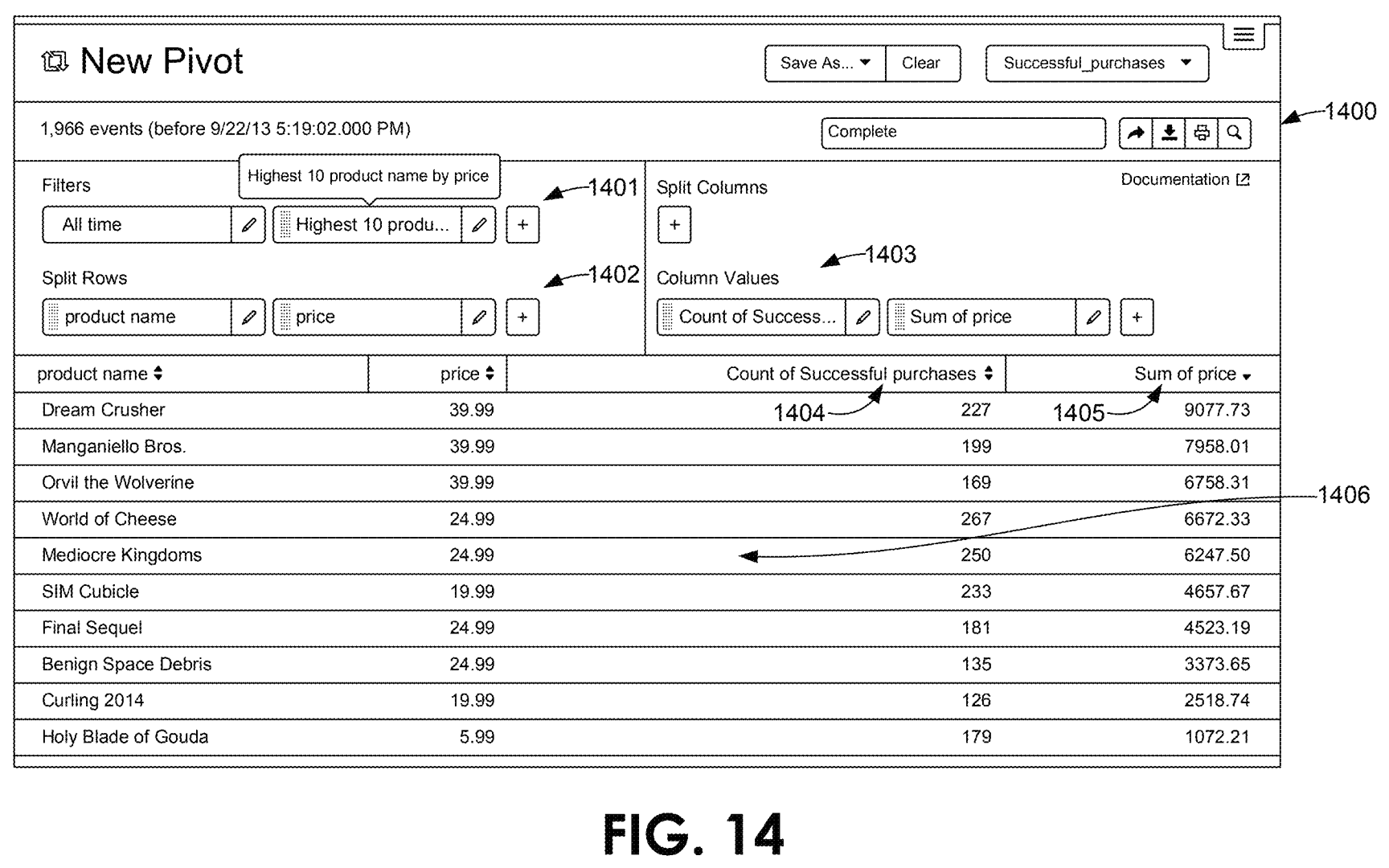

New Pivot — 1400

1,966 events (before 9/22/13 5:19:02.000 PM)

Save As... ▾　Clear　Successful_purchases ▾

Filters

Highest 10 product name by price

All time　✎　Highest 10 produ... ✎ + — 1401

Split Rows product name ✎　price ✎ + — 1402

Split Columns

+

Column Values — 1403

Count of Success... ✎　Sum of price ✎ +

Complete　　Documentation ☑

| product name ↕ | price ↕ | Count of Successful purchases ↕ | Sum of price ▾ |
|---|---|---|---|
| Dream Crusher | 39.99 | 227 | 9077.73 |
| Manganiello Bros. | 39.99 | 199 | 7958.01 |
| Orvil the Wolverine | 39.99 | 169 | 6758.31 |
| World of Cheese | 24.99 | 267 | 6672.33 |
| Mediocre Kingdoms | 24.99 | 250 | 6247.50 |
| SIM Cubicle | 19.99 | 233 | 4657.67 |
| Final Sequel | 24.99 | 181 | 4523.19 |
| Benign Space Debris | 24.99 | 135 | 3373.65 |
| Curling 2014 | 19.99 | 126 | 2518.74 |
| Holy Blade of Gouda | 5.99 | 179 | 1072.21 |

1404 — Count of Successful purchases

Figure 18A:
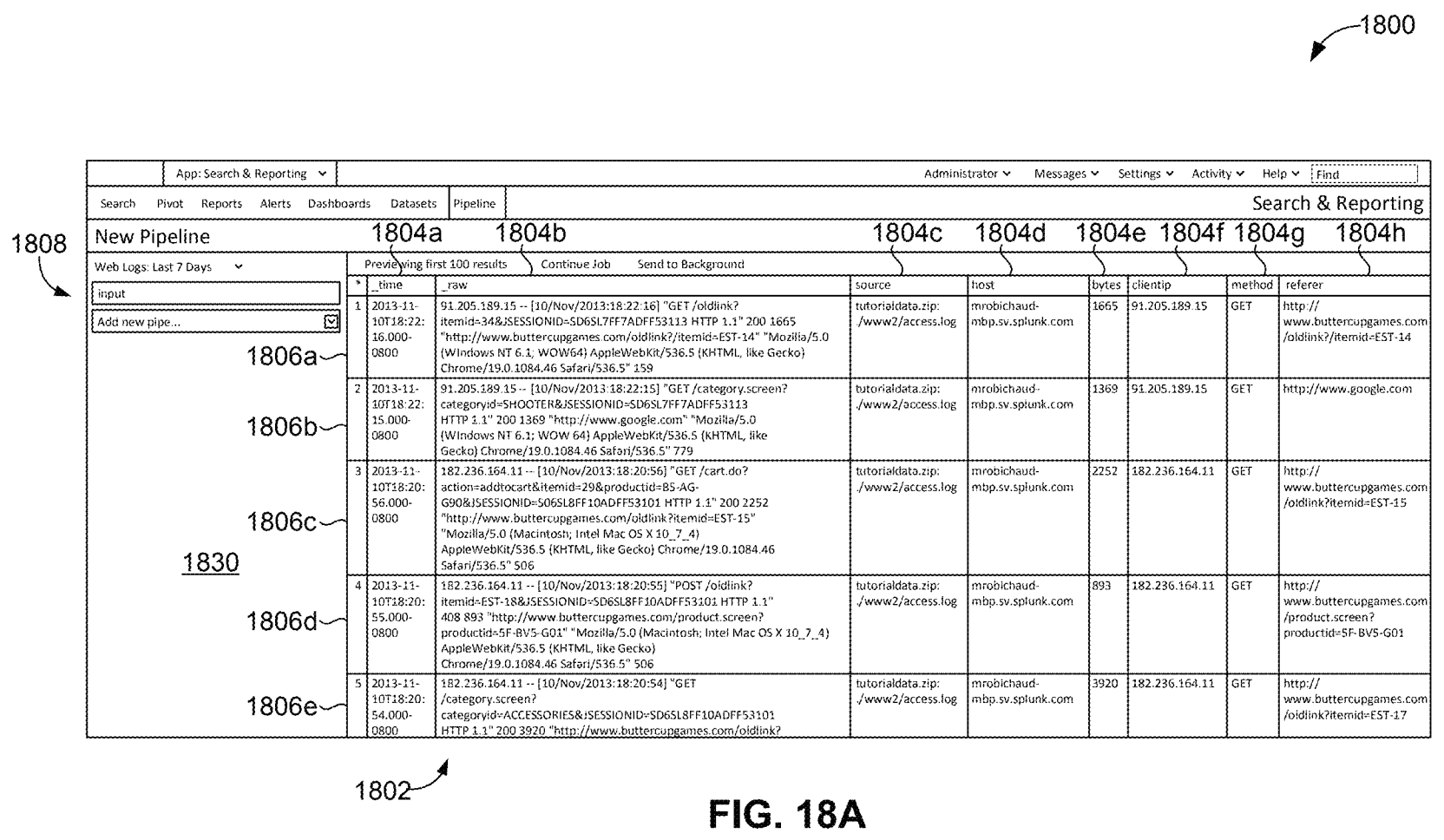

App: Search & Reporting ▾

Search  Pivot  Reports  Alerts  Dashboards  Datasets  Pipeline

Administrator ▾  Messages ▾  Settings ▾  Activity ▾  Help ▾  [Find]

New Pipeline                                           Search & Reporting

Web Logs: Last 7 Days ▾    _1804a_  _1804b_    Continue Job    Send to Background Previewing first 100 results

[input]

Add new pipe...

_1830_

_1802_

| | _time | _raw | source _1804c_ | host _1804d_ | bytes _1804e_ | clientip _1804f_ | method _1804g_ | referer _1804h_ |
|---|---|---|---|---|---|---|---|---|
| 1 _1806a_ | 2013-11-10T18:22:16.000-0800 | 91.205.189.15 - - [10/Nov/2013:18:22:16] "GET /oldlink?itemId=34&JSESSIONID=SD6SL7FF7ADFF53113 HTTP 1.1" 200 1665 "http://www.buttercupgames.com/oldlink?/itemid=EST-14" "Mozilla/5.0 (Windows NT 6.1; WOW64) AppleWebKit/536.5 (KHTML, like Gecko) Chrome/19.0.1084.46 Safari/536.5" 159 | tutorialdata.zip:/www2/access.log | mrobichaud-mbp.sv.splunk.com | 1665 | 91.205.189.15 | GET | http://www.buttercupgames.com/oldlink?/itemid=EST-14 |
| 2 _1806b_ | 2013-11-10T18:22:15.000-0800 | 91.205.189.15 - - [10/Nov/2013:18:22:15] "GET /category.screen?categoryId=SHOOTER&JSESSIONID=SD6SL7FF7ADFF53113 HTTP 1.1" 200 1369 "http://www.google.com" "Mozilla/5.0 (Windows NT 6.1; WOW 64) AppleWebKit/536.5 (KHTML, like Gecko) Chrome/19.0.1084.46 Safari/536.5" 779 | tutorialdata.zip:/www2/access.log | mrobichaud-mbp.sv.splunk.com | 1369 | 91.205.189.15 | GET | http://www.google.com |
| 3 _1806c_ | 2013-11-10T18:20:56.000-0800 | 182.236.164.11 - - [10/Nov/2013:18:20:56] "GET /cart.do?action=addtocart&itemId=29&productId=BS-AG-G09&JSESSIONID=SD6SL8FF10ADFF33101 HTTP 1.1" 200 2252 "http://www.buttercupgames.com/oldlink?/itemid=EST-15" "Mozilla/5.0 (Macintosh; Intel Mac OS X 10_7_4) AppleWebKit/536.5 (KHTML, like Gecko) Chrome/19.0.1084.46 Safari/536.5" 506 | tutorialdata.zip:/www2/access.log | mrobichaud-mbp.sv.splunk.com | 2252 | 182.236.164.11 | GET | http://www.buttercupgames.com/oldlink?/itemid=EST-15 |
| 4 _1806d_ | 2013-11-10T18:20:55.000-0800 | 182.236.164.11 - - [10/Nov/2013:18:20:55] "POST /oldlink?itemId=EST-18&JSESSIONID=SD6SL8FF10ADFF33101 HTTP 1.1" 408 893 "http://www.buttercupgames.com/product.screen?productId=5F-BV5-G01" "Mozilla/5.0 (Macintosh; Intel Mac OS X 10_7_4) AppleWebKit/536.5 (KHTML, like Gecko) Chrome/19.0.1084.46 Safari/536.5" 506 | tutorialdata.zip:/www2/access.log | mrobichaud-mbp.sv.splunk.com | 893 | 182.236.164.11 | GET | http://www.buttercupgames.com/product.screen?productid=5F-BV5-G01 |
| 5 _1806e_ | 2013-11-10T18:20:54.000-0800 | 182.236.164.11 - - [10/Nov/2013:18:20:54] "GET /category.screen?categoryId=ACCESSORIES&JSESSIONID=SD6SL8FF10ADFF53101 HTTP 1.1" 200 3920 "http://www.buttercupgames.com/oldlink? | tutorialdata.zip:/www2/access.log | mrobichaud-mbp.sv.splunk.com | 3920 | 182.236.164.11 | GET | http://www.buttercupgames.com/oldlink?/itemid=EST-17 |

Figure 22A:
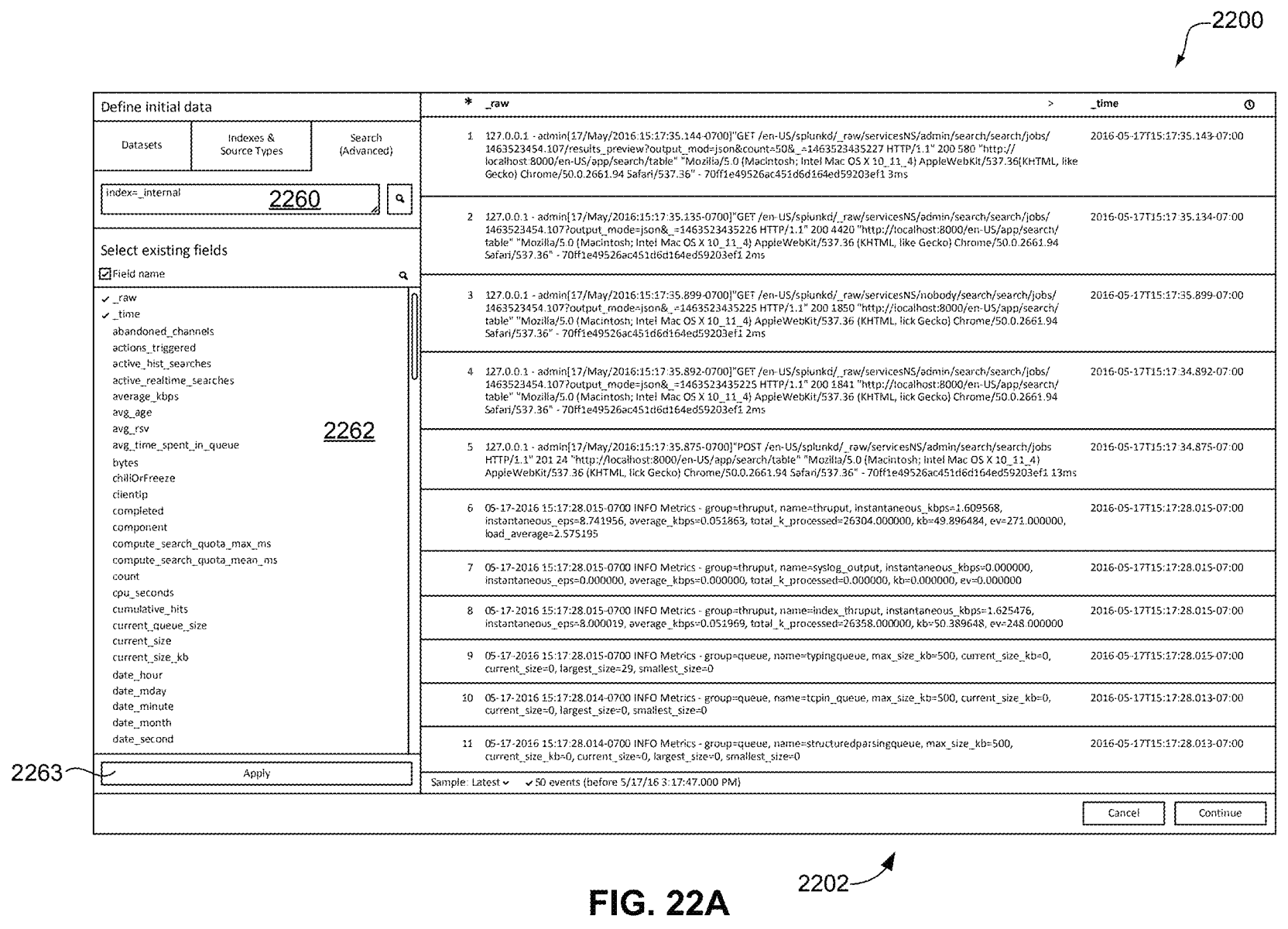

Define initial data

| Datasets | Indexes & Source Types | Search (Advanced) | index=_internal    2260

Select existing fields

☑ Field name

- ✓ _raw
- ✓ _time
- abandoned_channels
- actions_triggered
- active_hist_searches
- active_realtime_searches
- average_kbps
- avg_age
- avg_rsv
- avg_time_spent_in_queue
- bytes
- chillOrFreeze
- clientip
- completed
- component
- compute_search_quota_max_ms
- compute_search_quota_mean_ms
- count
- cpu_seconds
- cumulative_hits
- current_queue_size
- current_size
- current_size_kb
- date_hour
- date_mday
- date_minute
- date_month
- date_second

2262

Apply

2263

| # | _raw | _time |
|---|------|-------|
| 1 | 127.0.0.1 - admin[17/May/2016:15:17:35.144-0700]"GET /en-US/splunkd/_raw/servicesNS/admin/search/search/jobs/ 1463523454.107/results_preview?output_mode=json&count=50&_=1463523435227 HTTP/1.1" 200 580 "http:// localhost:8000/en-US/app/search/table" "Mozilla/5.0 (Macintosh; Intel Mac OS X 10_11_4) AppleWebKit/537.36(KHTML, like Gecko) Chrome/50.0.2661.94 Safari/537.36" - 70ff1e49526ac451d6d164ed59203ef1 3ms | 2016-05-17T15:17:35.143-07:00 |
| 2 | 127.0.0.1 - admin[17/May/2016:15:17:35.135-0700]"GET /en-US/splunkd/_raw/servicesNS/admin/search/search/jobs/ 1463523454.107?output_mode=json&_=1463523435226 HTTP/1.1" 200 4420 "http://localhost:8000/en-US/app/search/ table" "Mozilla/5.0 (Macintosh; Intel Mac OS X 10_11_4) AppleWebKit/537.36 (KHTML, like Gecko) Chrome/50.0.2661.94 Safari/537.36" - 70ff1e49526ac451d6d164ed59203ef1 2ms | 2016-05-17T15:17:35.134-07:00 |
| 3 | 127.0.0.1 - admin[17/May/2016:15:17:35.899-0700]"GET /en-US/servicesNS/nobody/search/search/jobs/ 1463523454.107?output_mode=json&_=1463523435225 HTTP/1.1" 200 1850 "http://localhost:8000/en-US/app/search/ table" "Mozilla/5.0 (Macintosh; Intel Mac OS X 10_11_4) AppleWebKit/537.36 (KHTML, lick Gecko) Chrome/50.0.2661.94 Safari/537.36" - 70ff1e49526ac451d6d164ed59203ef1 2ms | 2016-05-17T15:17:35.899-07:00 |
| 4 | 127.0.0.1 - admin[17/May/2016:15:17:35.892-0700]"GET /en-US/splunkd/_raw/servicesNS/admin/search/search/jobs/ 1463523454.107?output_mode=json&_=1463523435225 HTTP/1.1" 200 1841 "http://localhost:8000/en-US/app/search/ table" "Mozilla/5.0 (Macintosh; Intel Mac OS X 10_11_4) AppleWebKit/537.36 (KHTML, lick Gecko) Chrome/50.0.2661.94 Safari/537.36" - 70ff1e49526ac451d6d164ed59203ef1 2ms | 2016-05-17T15:17:34.892-07:00 |
| 5 | 127.0.0.1 - admin[17/May/2016:15:17:35.875-0700]"POST /en-US/splunkd/_raw/servicesNS/admin/search/search/jobs HTTP/1.1" 201 24 "http://localhost:8000/en-US/app/search/table" "Mozilla/5.0 (Macintosh; Intel Mac OS X 10_11_4) AppleWebKit/537.36 (KHTML, lick Gecko) Chrome/50.0.2661.94 Safari/537.36" - 70ff1e49526ac451d6d164ed59203ef1 13ms | 2016-05-17T15:17:34.875-07:00 |
| 6 | 05-17-2016 15:17:28.015-0700 INFO Metrics - group=thruput, name=syslog_output, instantaneous_kbps=0.000000, instantaneous_eps=8.741956, average_kbps=0.000000, average_kbps=0.000000, total_k_processed=0.000000, kb=0.000000, ev=0.000000 load_average=2.575195 | 2016-05-17T15:17:28.015-07:00 |
| 7 | 05-17-2016 15:17:28.015-0700 INFO Metrics - group=thruput, name=thruput, instantaneous_kbps=1.609568, instantaneous_eps=1.609568, average_kbps=0.000000, total_k_processed=26304.000000, kb=49.896484, ev=271.000000, | 2016-05-17T15:17:28.015-07:00 |
| 8 | 05-17-2016 15:17:28.015-0700 INFO Metrics - group=thruput, name=index_thruput, instantaneous_kbps=1.625476, instantaneous_eps=8.000019, average_kbps=0.053969, total_k_processed=26358.000000, kb=50.389648, ev=248.000000 | 2016-05-17T15:17:28.015-07:00 |
| 9 | 05-17-2016 15:17:28.015-0700 INFO Metrics - group=queue, name=typingqueue, max_size_kb=500, current_size_kb=0, current_size=0, largest_size=29, smallest_size=0 | 2016-05-17T15:17:28.015-07:00 |
| 10 | 05-17-2016 15:17:28.014-0700 INFO Metrics - group=queue, name=tcpin_queue, max_size_kb=500, current_size_kb=0, current_size=0, largest_size=0, smallest_size=0 | 2016-05-17T15:17:28.013-07:00 |
| 11 | 05-17-2016 15:17:28.014-0700 INFO Metrics - group=queue, name=structuredparsingqueue, max_size_kb=500, current_size_kb=0, current_size=0, largest_size=0, smallest_size=0 | 2016-05-17T15:17:28.013-07:00 |

Sample: Latest ⌄   ✓ 50 events (before 5/17/16 3:17:47.000 PM)

| Cancel | Continue |

New Table ‹‹

2207

Commands

Initial Data

Initial Data

Selected method:
search

Search:
index=_internal

Fields chosen:
_raw, _time, bytes

2230

Edit

2205

Edit ⌄  Sort ⌄  Filter ⌄  Clean ⌄  Add New ⌄

2210A  2210B  2210C  2210D  2210E  2226A  2233A

Calculate Field...
Extract Selected Text...
Format Timestamp...
Join from Lookup...
Duplicate Field...
Coalesce Fields...
Concatenate Fields or Text...
Map Ranges...
Split Fields...
Eval Expression...              Ad an ed
Extract with Regular Expression...   Ad an ed

2231

| * | _raw | ⌄ | _time | ⊙ bytes # |
|---|---|---|---|---|
| 1 | 127.0.0.1 - - [17/May/2016:15 US/static/@4545bafda794796 HTTP/1.1" 200 [SMISQ4] "http 10_11_4) AppleWebKit/537.3 | 74.df7cbb436374807cea9b.js 5.0 (Macintosh; Intel Mac OS X 37.36" - 573b9s6aef10ac87690 3ms | 2016-05-17T15:17:35.143-07:00 | 3944604 |
| 2 | 127.0.0.1 - admin [17/May/20 1463523454.107?output_mo table" "Mozilla/5.0 (Macintos Safari/537.36" - 70ff1e495263 | vicesNS/admin/search/jobs/ p://localhost:8080/en-US/app/search/ TML, like Gecko) Chrome/50.0.2661.94 | 2016-05-17T15:17:35.134-07:00 | 861807 |
| 3 | 127.0.0.1 - admin [17/May/20 1463523454.107?output_mo table" "Mozilla/5.0 (Macintos Safari/537.36" - 70ff1e495263 | vicesNS/nobody/search/search/jobs/ p://localhost:8080/en-US/app/search/ TML, like Gecko) Chrome/50.0.2661.94 | 2016-05-17T15:17:35.899-07:00 | 2633 |
| 4 | 127.0.0.1 - admin [17/May/20 1463523454.107?output_mo table" "Mozilla/5.0 (Macintos Safari/537.36" - 70ff1e495263 | vicesNS/admin/search/search/jobs/ p://localhost:8080/en-US/app/search/ TML, like Gecko) Chrome/50.0.2661.94 - 70ff1e495526c45186d164ed59203ef 2ms | 2016-05-17T15:17:34.875-07:00 | |
| 5 | 127.0.0.1 - admin [17/May/2016:15:17:35.875-0700] "POST /en-US/splunkd/_raw/servicesNS/admin/search/search/jobs/ HTTP/1.1" 201 24 "http://localhost:8080/en-US/app/search/table" "Mozilla/5.0 (Macintosh; Intel Mac OS X 10_11_4) AppleWebKit/537.36 (KHTML, like Gecko) Chrome/50.0.2661.94 Safari/537.36" - 70ff1e495526c45186d164ed59203ef 13ms | | 2016-05-17T15:17:34.892-07:00 | 747 |
| 6 | 05-17-2016 15:17:28.015-0700 INFO Metrics - group=thruput, name=thruput, instantaneous_kbps=1.609568, instantaneous_eps=8.741956, average_kbps=0.051863, total_k_processed=26304.000000, ev=271.000000, load_average=2.575195 | | 2016-05-17T15:17:28.015-07:00 | 442 |
| 7 | 05-17-2016 15:17:28.015-0700 INFO Metrics - group=thruput, name=syslog_output, instantaneous_kbps=0.000000, instantaneous_eps=0.0000000, average_kbps=0.0000000, total_k_processed=0.000000, kb=0.000000, ev=0.000000 | | 2016-05-17T15:17:28.015-07:00 | 3165 |
| 8 | 05-17-2016 15:17:28.015-0700 INFO Metrics - group=thruput, name=index_thruput, instantaneous_kbps=0.051969, total_k_processed=26358.000000, kbps=50.389648, ev=248.000000 instantaneous_eps=8.000019, average_kbps=0.051969, | | 2016-05-17T15:17:28.015-07:00 | 1820 |
| 9 | 05-17-2016 15:17:28.015-0700 INFO Metrics - group=queue, name=typingqueue, max_size_kb=500, current_size_kb=0, current_size=0, largest_size=29, smallest_size=0 | | 2016-05-17T15:17:28.015-07:00 | 4566 |
| 10 | 05-17-2016 15:17:28.014-0700 INFO Metrics - group=queue, name=tcpin_queue, max_size_kb=500, current_size_kb=0, current_size=0, largest_size=0, smallest_size=0 | | 2016-05-17T15:17:28.013-07:00 | 140826 |
| 11 | 05-17-2016 15:17:28.014-0700 INFO Metrics - group=queue, name=structuredparsingqueue, max_size_kb=500, current_size_kb=0, current_size=0, largest_size=0, smallest_size=0 | | 2016-05-17T15:17:28.013-07:00 | |

2214

2250  Save  Save As

Save ⊙ bytes #

Preview Rows     Summarize Fields

Sample: Latest ⌄  🔍  ✓ 50 events (5/13/16 6:06:50.000 PM to 5/17/16 3:17:16.000 PM)

2202

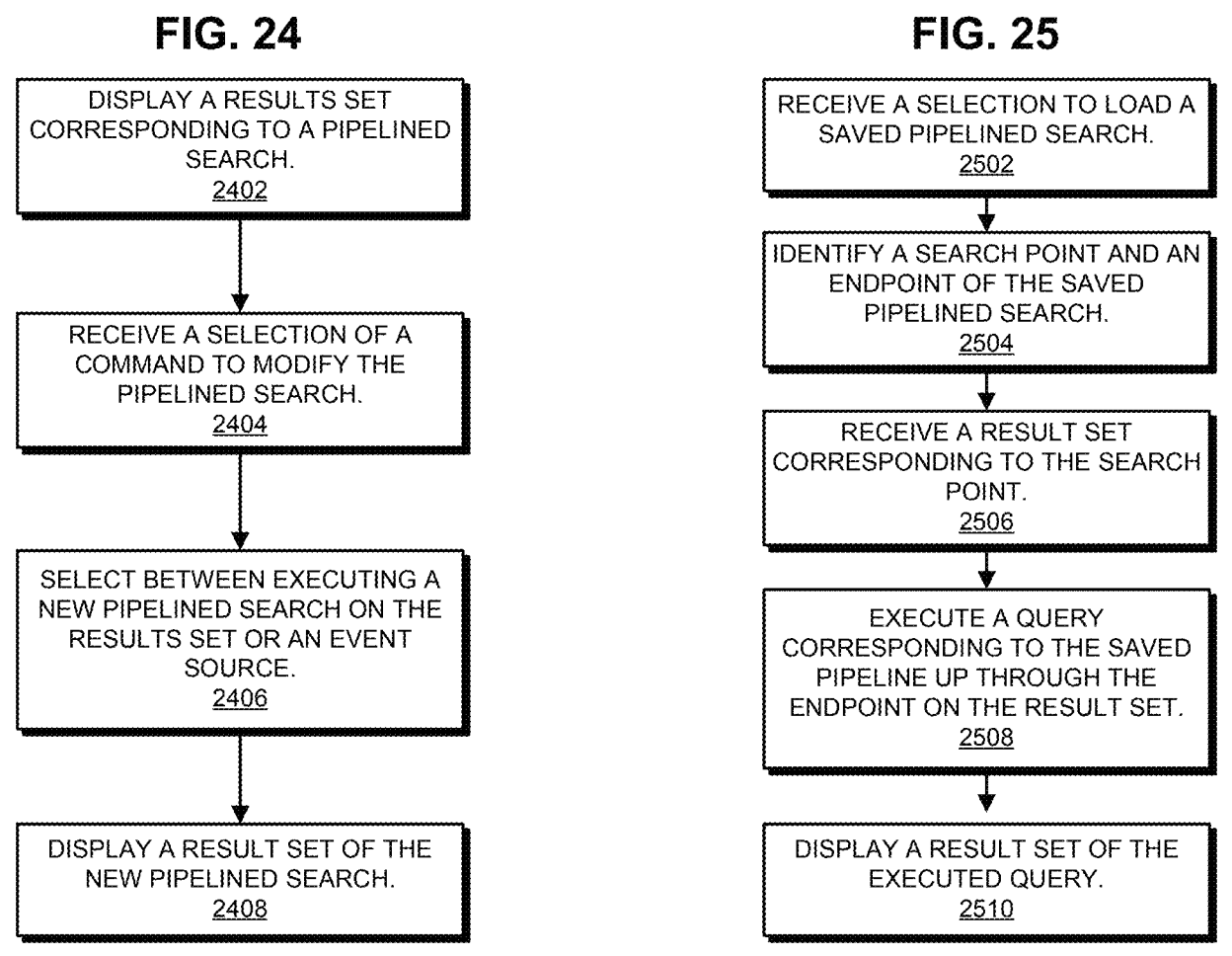

RECEIVE A SELECTION TO LOAD A SAVED PIPELINED SEARCH.
2502

↓

IDENTIFY A SEARCH POINT AND AN ENDPOINT OF THE SAVED PIPELINED SEARCH.
2504

↓

RECEIVE A RESULT SET CORRESPONDING TO THE SEARCH POINT.
2506

↓

EXECUTE A QUERY CORRESPONDING TO THE SAVED PIPELINE UP THROUGH THE ENDPOINT ON THE RESULT SET.
2508

↓

DISPLAY A RESULT SET OF THE EXECUTED QUERY.
2510

FIG. 24

DISPLAY A RESULTS SET CORRESPONDING TO A PIPELINED SEARCH.
2402

↓

RECEIVE A SELECTION OF A COMMAND TO MODIFY THE PIPELINED SEARCH.
2404

↓

SELECT BETWEEN EXECUTING A NEW PIPELINED SEARCH ON THE RESULTS SET OR AN EVENT SOURCE.
2406

↓

DISPLAY A RESULT SET OF THE NEW PIPELINED SEARCH.
2408

1

ANALYZING A MODIFIED QUERY TO DETERMINE DATA ON WHICH TO EXECUTE THE MODIFIED QUERY

CROSS-REFERENCE TO RELATED APPLICATIONS

This application is a Continuation of U.S. patent application Ser. No. 17/874,024 filed Jul. 26, 2022, which itself is a Continuation of U.S. patent application Ser. No. 16/776, 317 filed Jan. 29, 2020 and now issued as U.S. Pat. No. 11,429,600, which is itself a Continuation of Ser. No. 15/221,392 filed Jul. 27, 2016 and now issued as U.S. Pat. No. 10,558,651, the entire contents of each of which are incorporated by reference herein in their entirety.

BACKGROUND

Modern data centers often include thousands of hosts that operate collectively to service requests from even larger numbers of remote clients. During operation, components of these data centers can produce significant volumes of machine-generated data. In order to reduce the size of the data, it is typically pre-processed before it is stored. In some instances, the pre-processing includes extracting and storing some of the data, but discarding the remainder of the data. Although this may save storage space in the short term, it can be undesirable in the long term. For example, if the discarded data is later determined to be of use, it may no longer be available.

In some instances, techniques have been developed to apply minimal processing to the data in an attempt to preserve more of the data for later use. For example, the data may be maintained in a relatively unstructured form to reduce the loss of relevant data. Unfortunately, the unstructured nature of much of this data has made it challenging to perform indexing and searching operations because of the difficulty of applying semantic meaning to unstructured data. As the number of hosts and clients associated with a data center continues to grow, processing large volumes of machine-generated data in an intelligent manner and effectively presenting the results of such processing continues to be a priority. Moreover, processing of the data may return a large amount of information that can be difficult for a user to interpret. For example, if a user submits a search of the data, the user may be provided with a large set of search results for the data but may not know how the search results relate to the data itself or how the search results relate to one another. As a result, a user may have a difficult time deciphering what portions of the data or the search results are relevant to her/his inquiry.

SUMMARY

Embodiments of the present invention are directed to search point management.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Implementations of the present disclosure are described in detail below with reference to the attached drawing figures, wherein:

2

Figure 1:
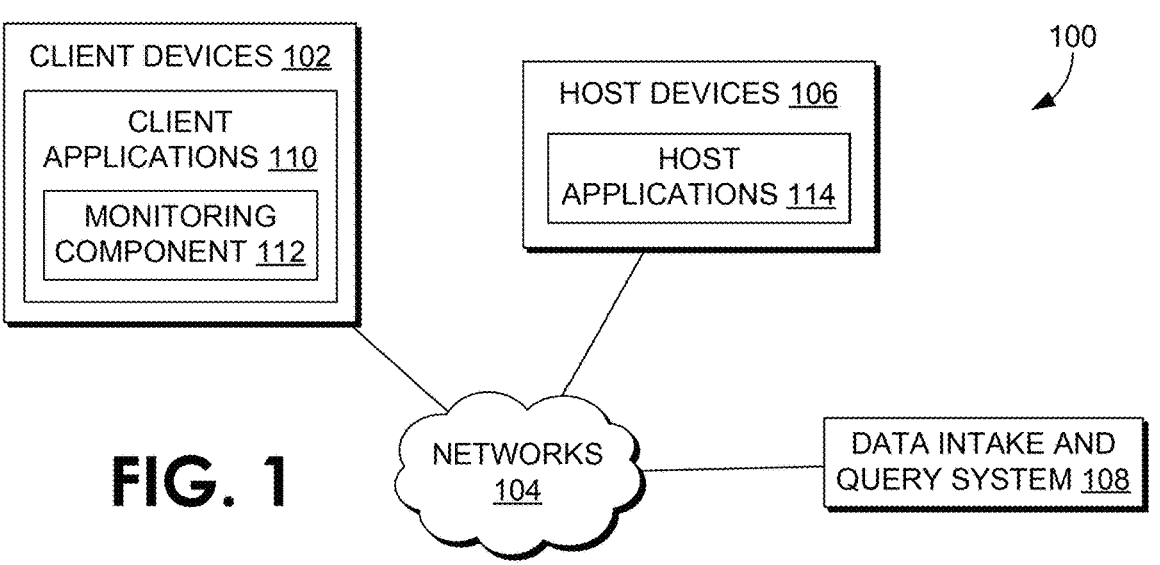
Figure 2:
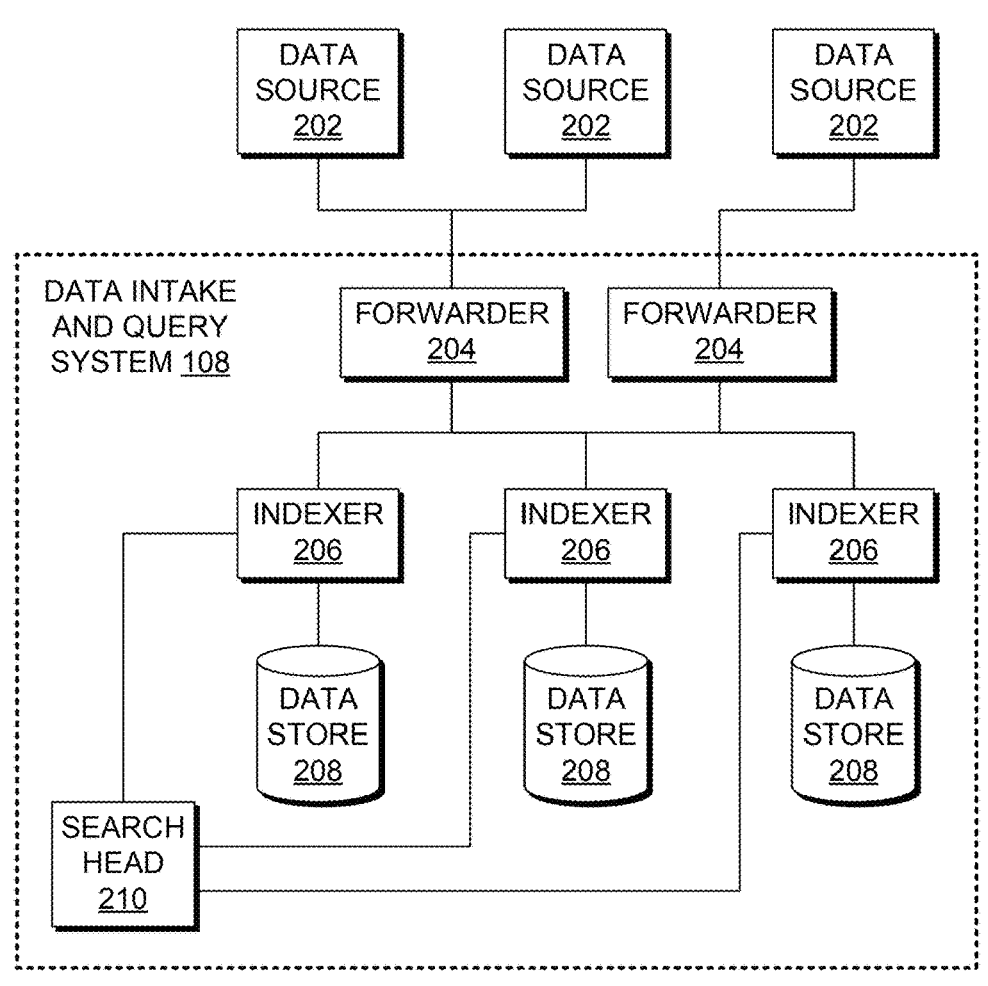
Figure 3:
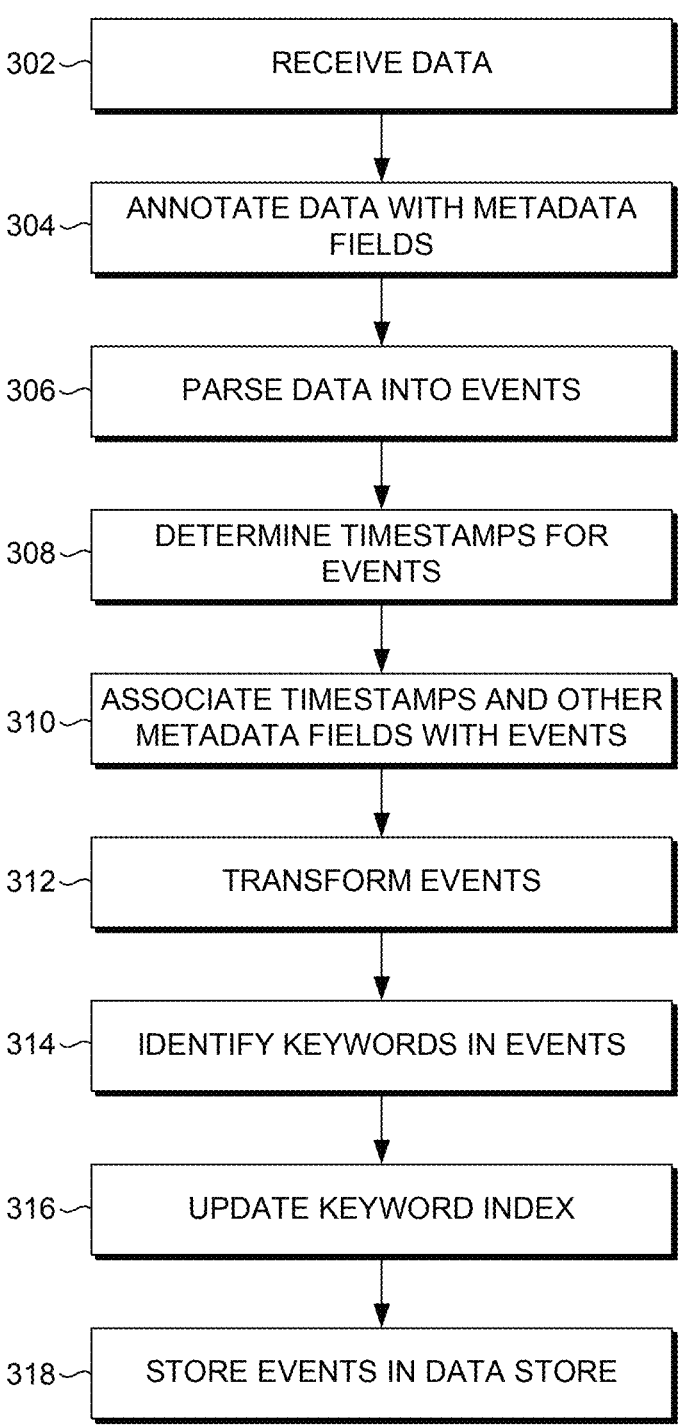
Figure 4:
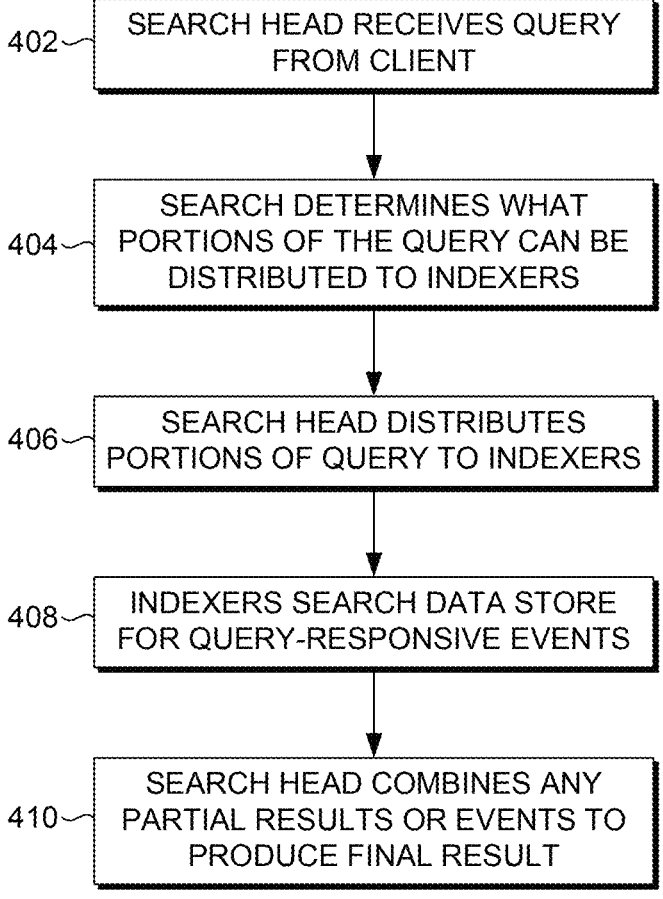
Figure 5:
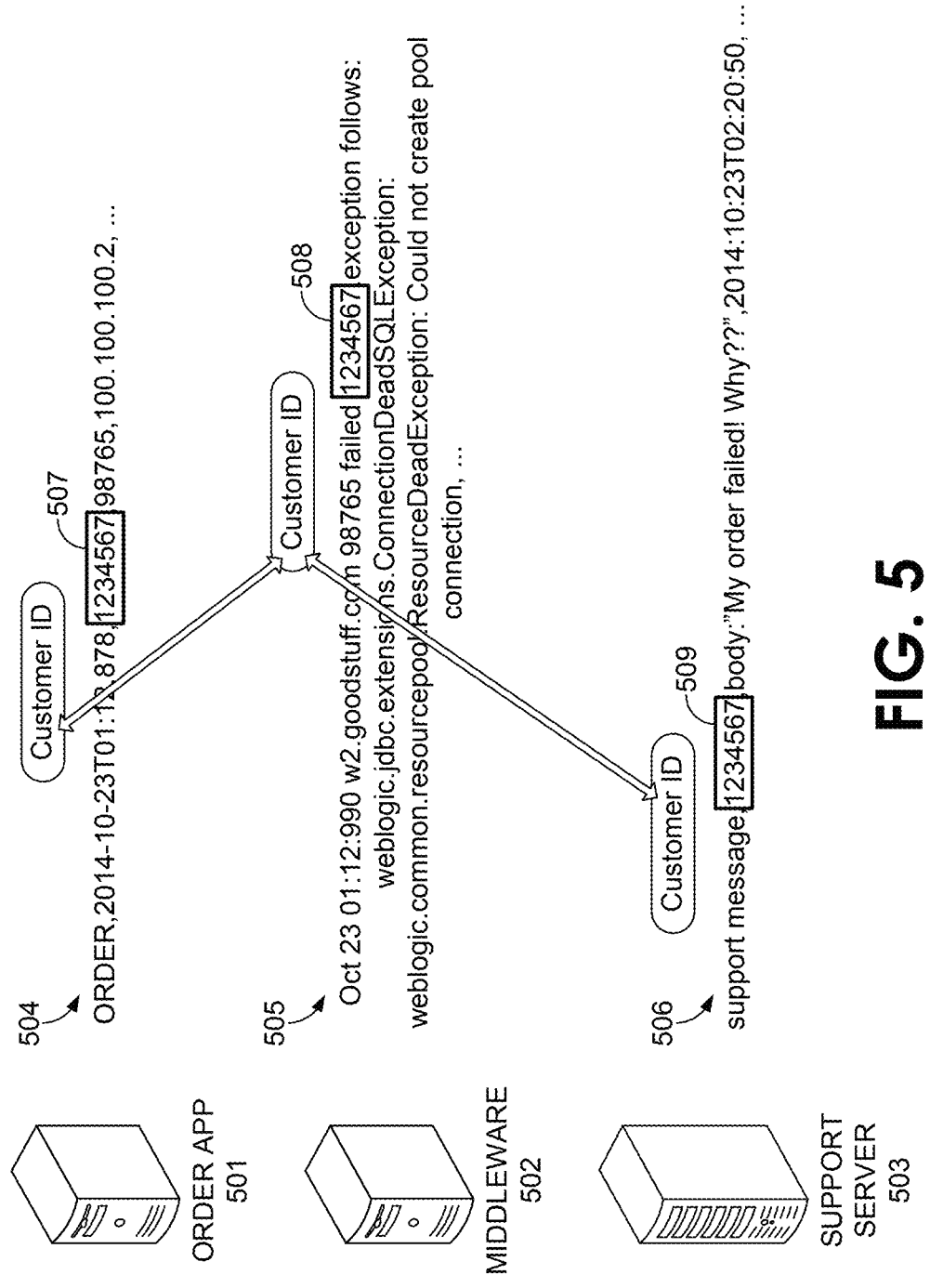
Figure 6A:
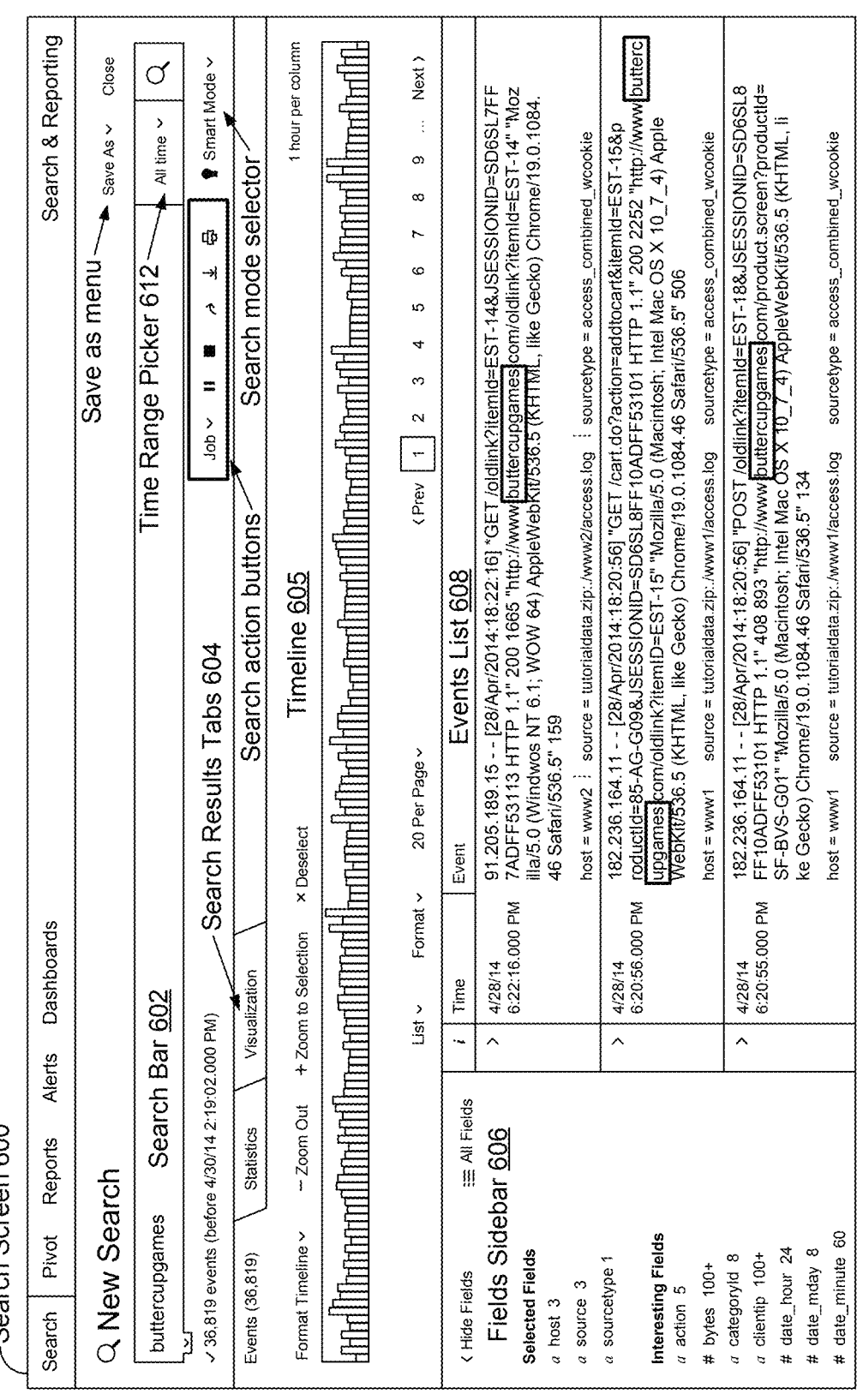
Figure 9A:
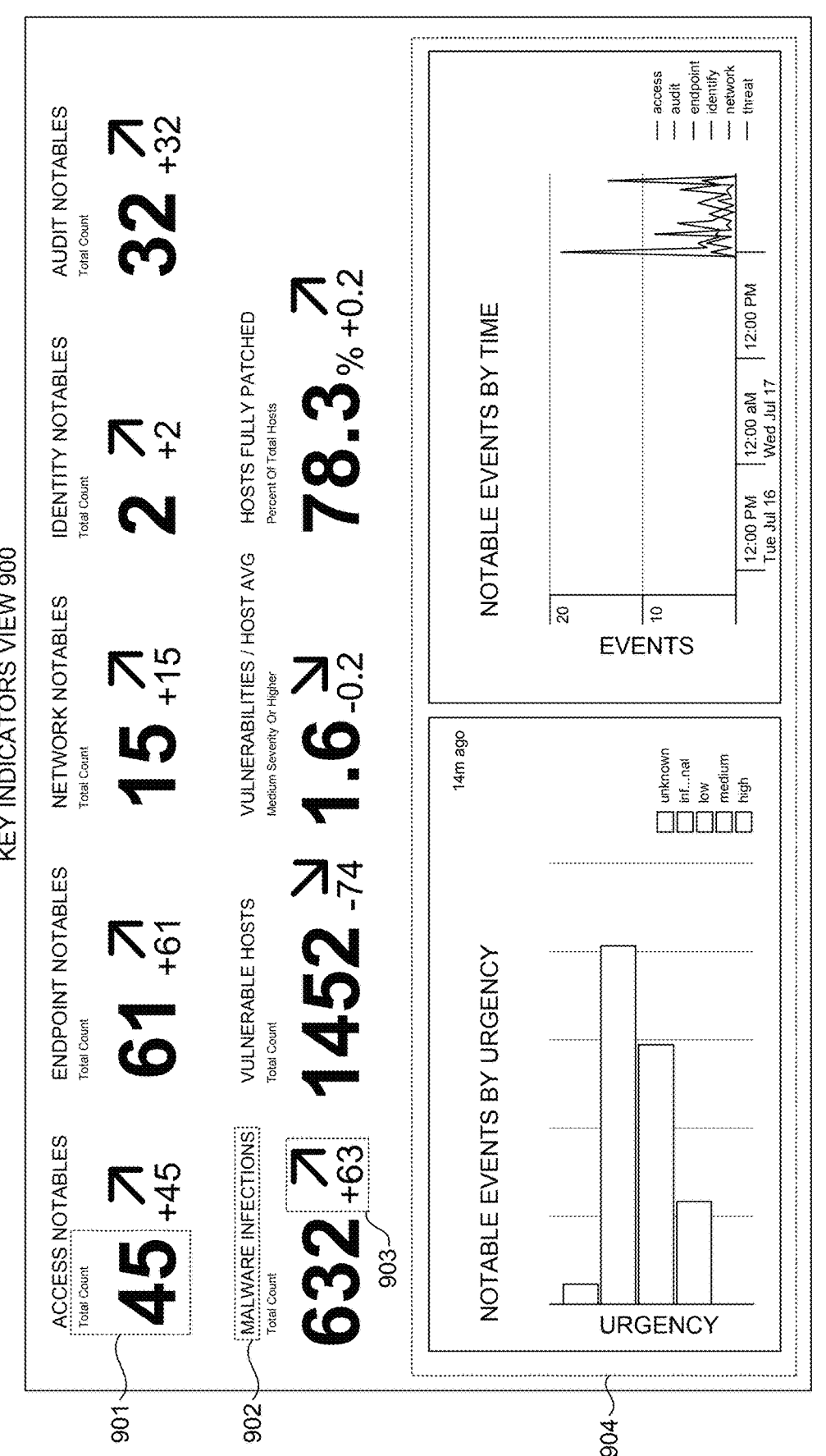
Figure 9C:
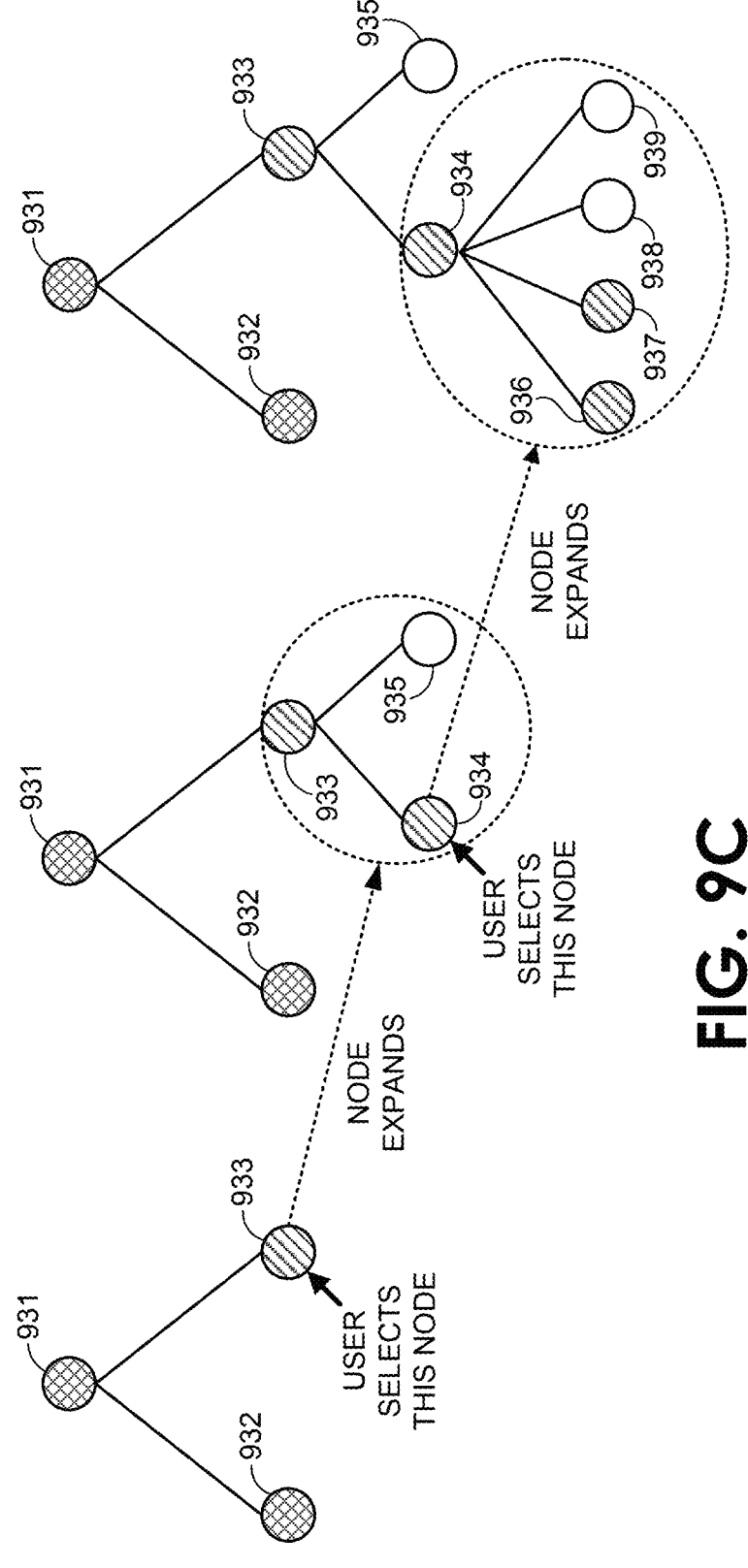
Figure 9D:
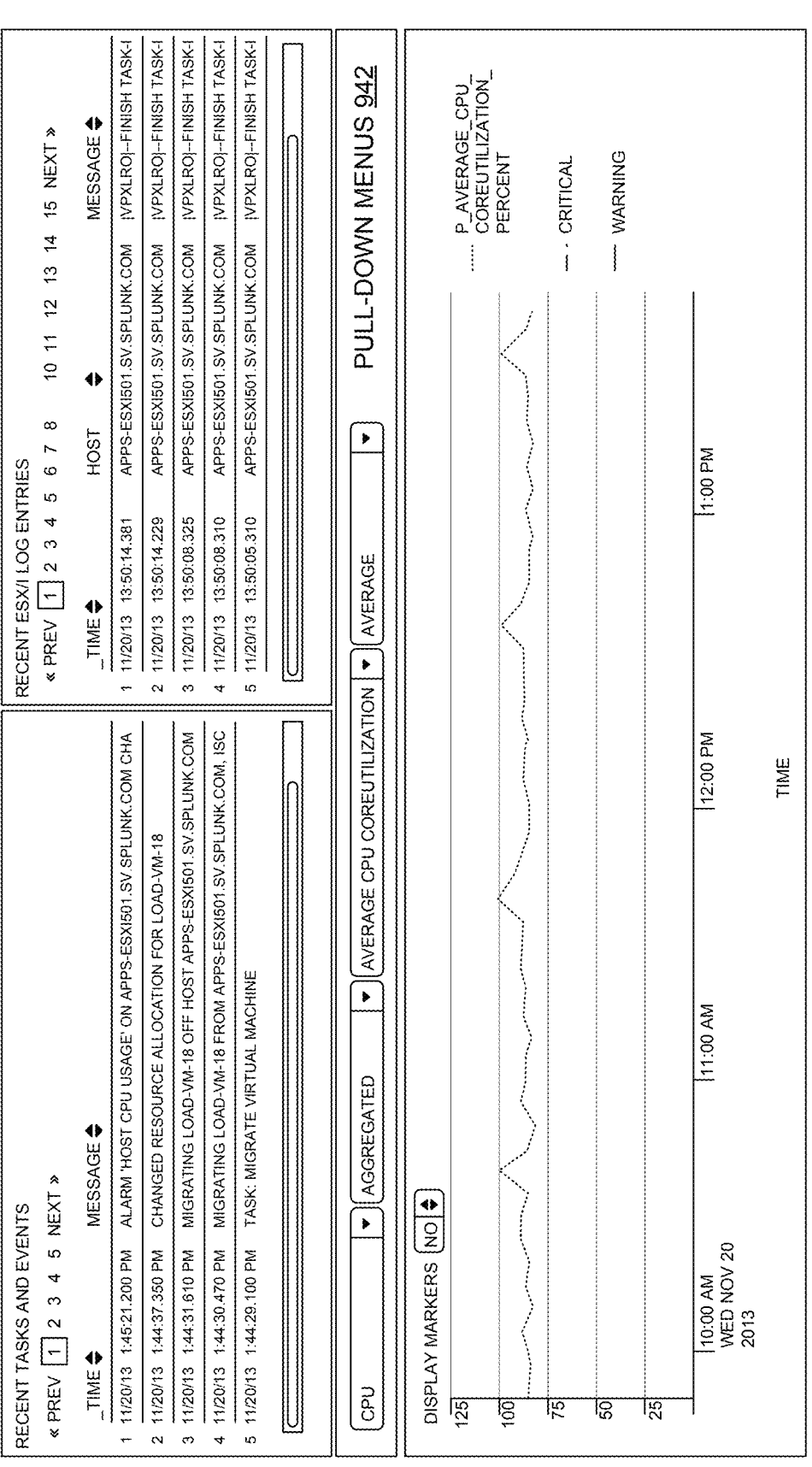
Figure 10:
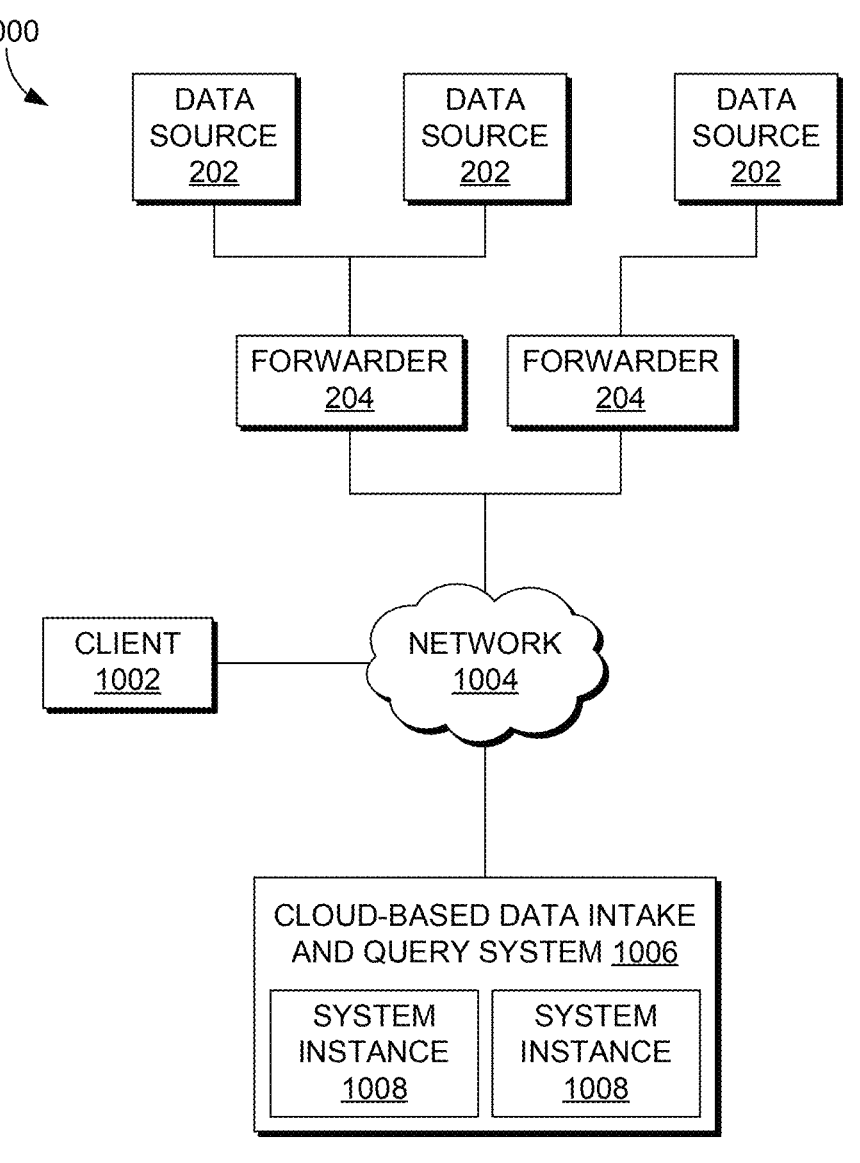
Figure 11:
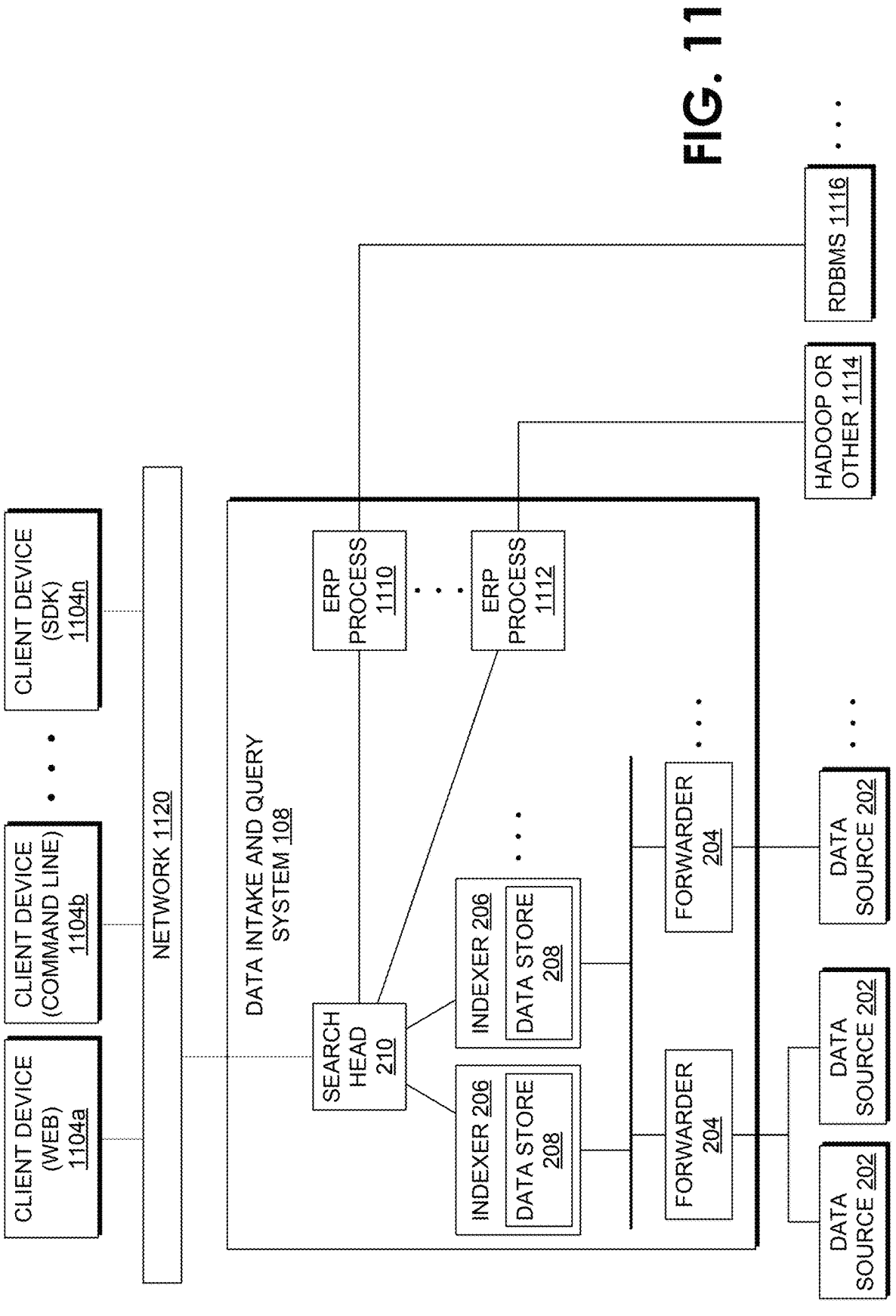
Figure 12:
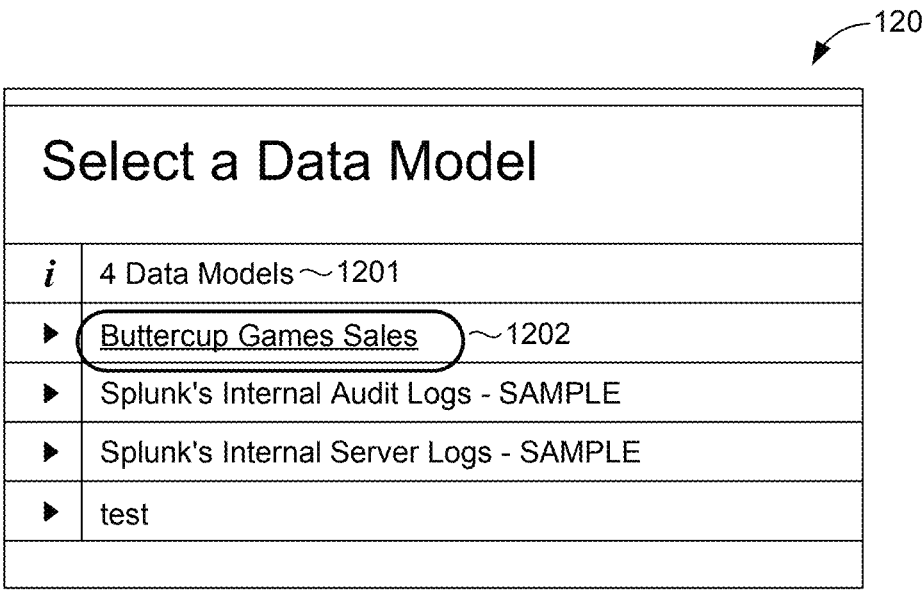
Figure 13:
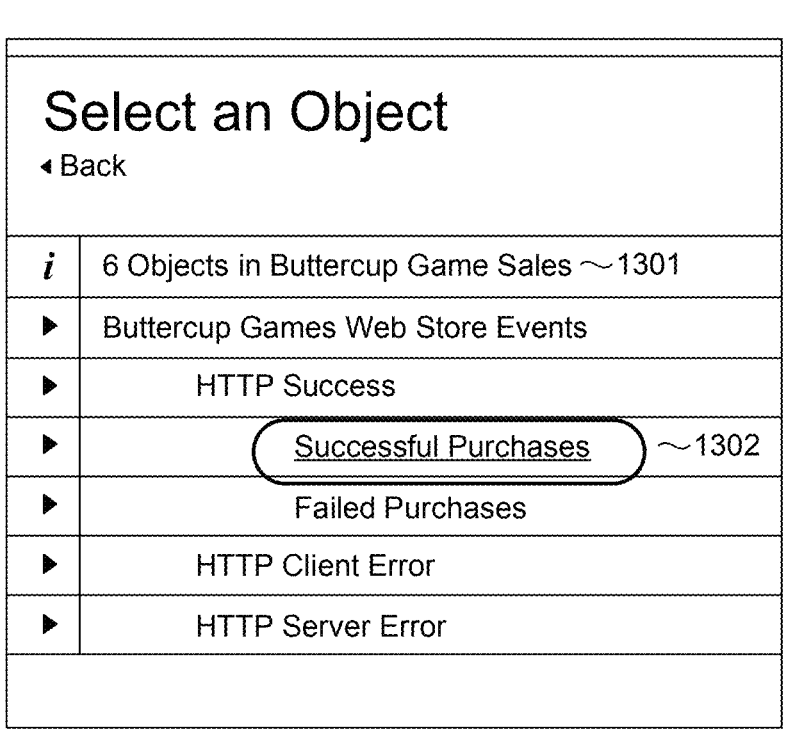
Figure 15:
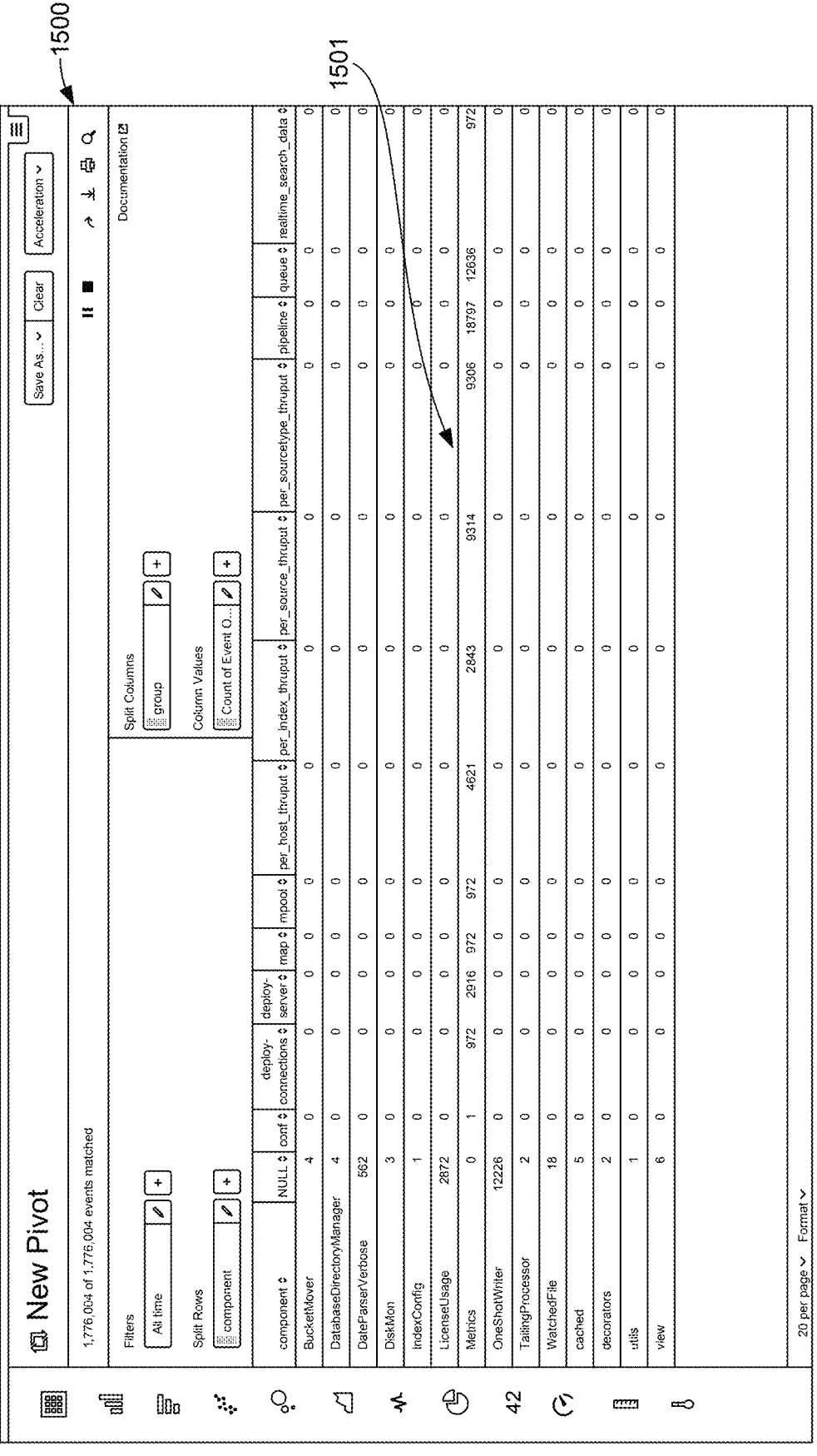
Figure 16:
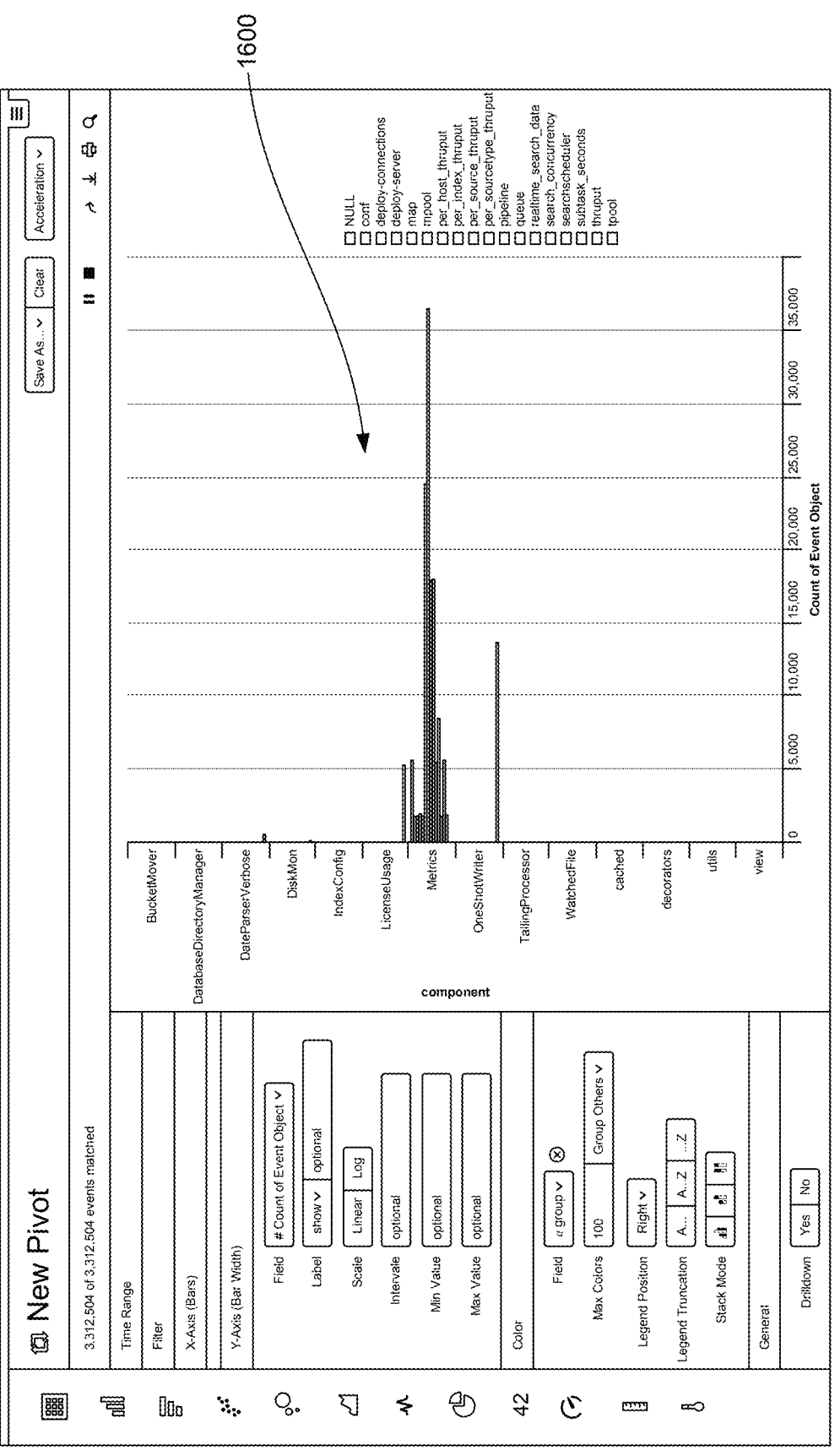
Figure 17:
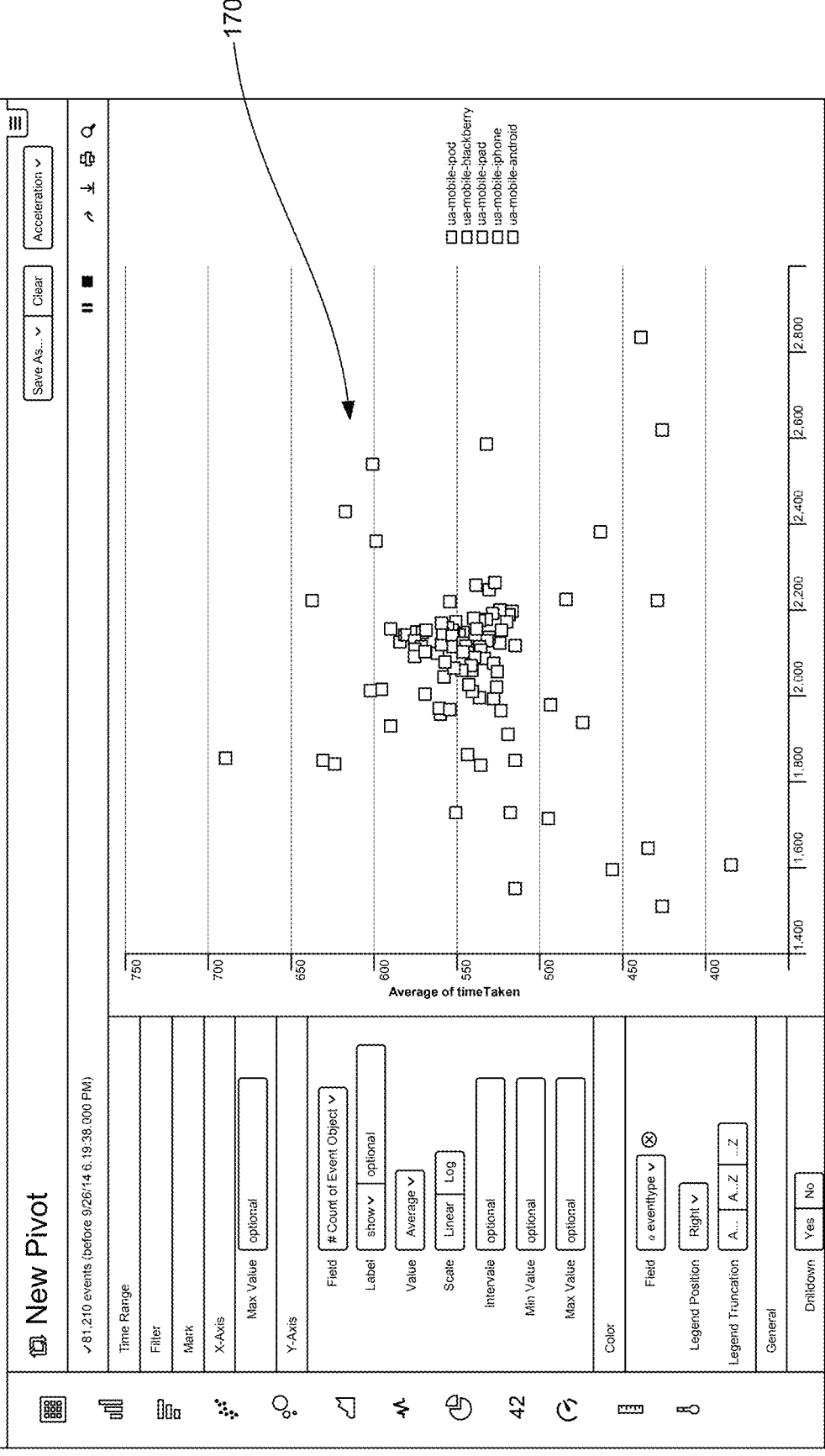

FIG. 1 illustrates a networked computer environment in which an embodiment may be implemented;

FIG. 2 illustrates a block diagram of an example data intake and query system in which an embodiment may be implemented;

FIG. 3 is a flow diagram that illustrates how indexers process, index, and store data received from forwarders in accordance with the disclosed embodiments;

FIG. 4 is a flow diagram that illustrates how a search head and indexers perform a search query in accordance with the disclosed embodiments;

FIG. 5 illustrates a scenario where a common customer ID is found among log data received from three disparate sources in accordance with the disclosed embodiments;

FIG. 6A illustrates a search screen in accordance with the disclosed embodiments;

FIG. 6B illustrates a data summary dialog that enables a user to select various data sources in accordance with the disclosed embodiments;

FIGS. 7A-7D illustrate a series of user interface screens for an example data model-driven report generation interface in accordance with the disclosed embodiments;

FIG. 8 illustrates an example search query received from a client and executed by search peers in accordance with the disclosed embodiments;

Figure 9B:
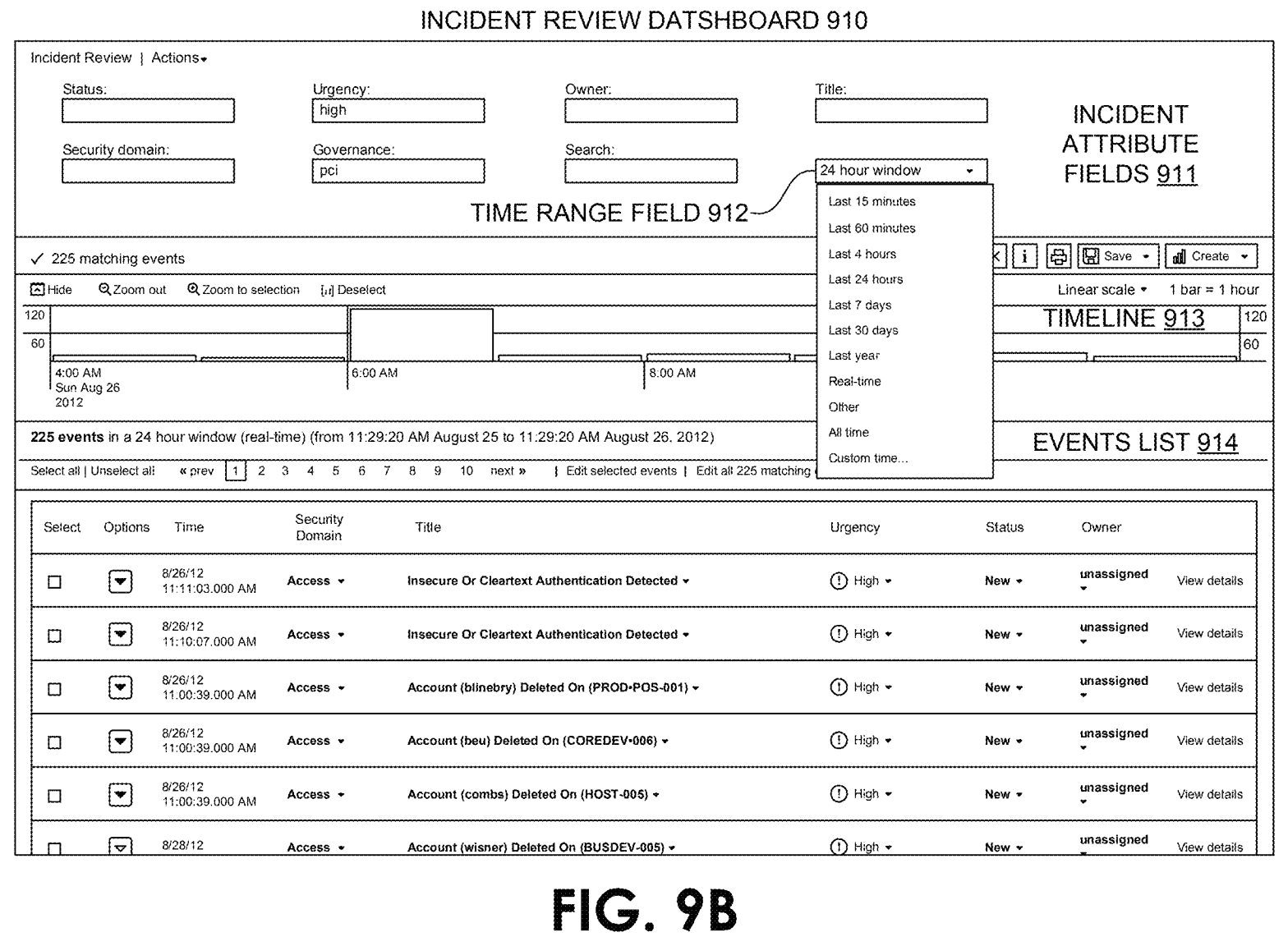

FIG. 9A illustrates a key indicators view in accordance with the disclosed embodiments;

FIG. 9B illustrates an incident review dashboard in accordance with the disclosed embodiments;

FIG. 9C illustrates a proactive monitoring tree in accordance with the disclosed embodiments;

FIG. 9D illustrates a user interface screen displaying both log data and performance data in accordance with the disclosed embodiments;

FIG. 10 illustrates a block diagram of an example cloud-based data intake and query system in which an embodiment may be implemented;

FIG. 11 illustrates a block diagram of an example data intake and query system that performs searches across external data systems in accordance with the disclosed embodiments;

FIGS. 12-14 illustrate a series of user interface screens for an example data model-driven report generation interface in accordance with the disclosed embodiments;

FIGS. 15-17 illustrate example visualizations generated by a reporting application in accordance with the disclosed embodiments;

FIG. 18A illustrates a search screen in accordance with the disclosed embodiments.

Figure 18B:
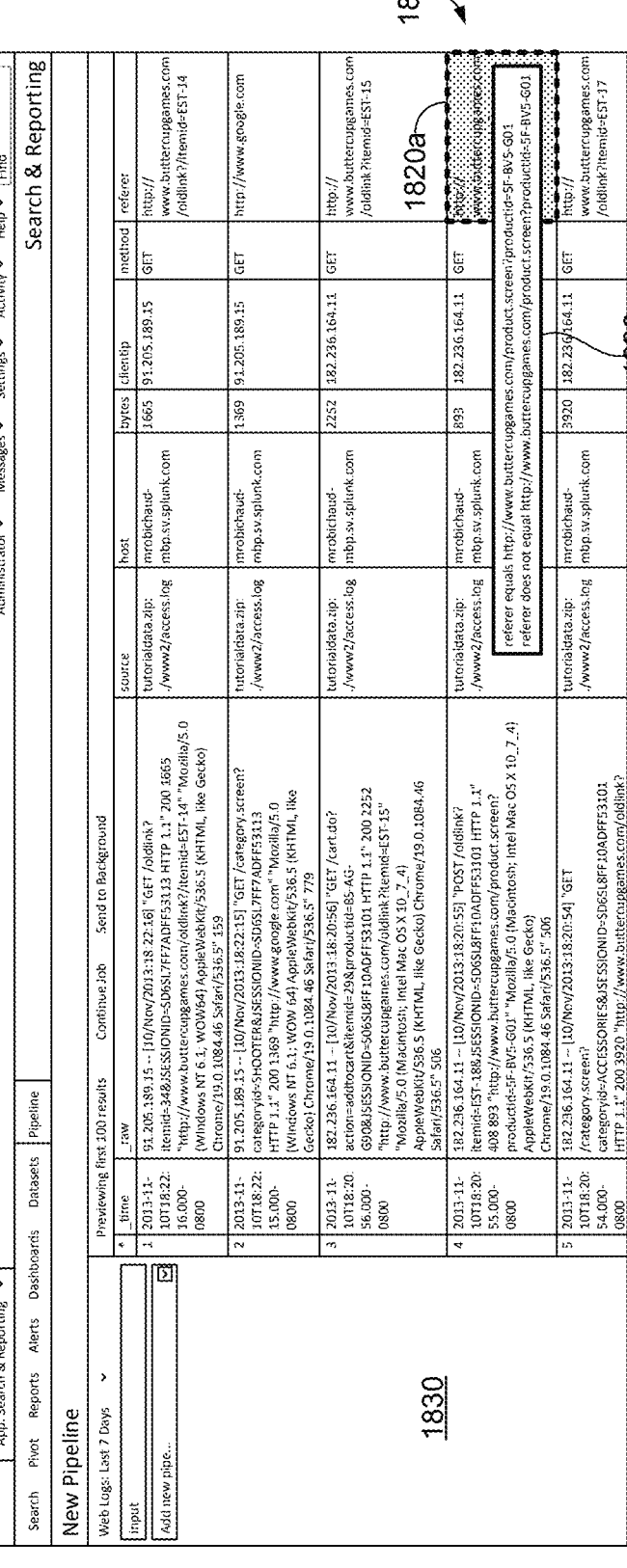

FIG. 18B illustrates a search screen in accordance with the disclosed embodiments.

Figure 18C:
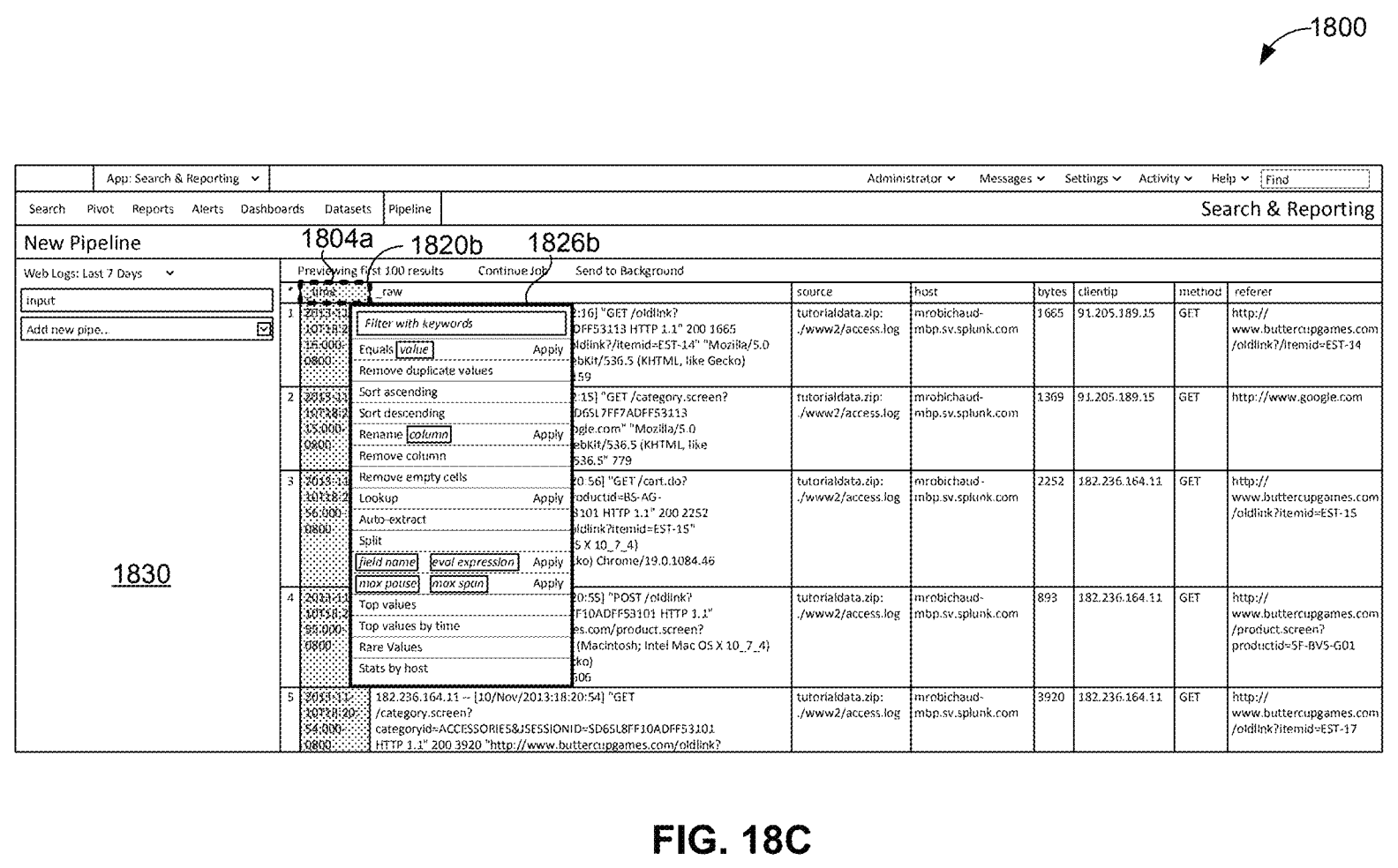

FIG. 18C illustrates a search screen in accordance with the disclosed embodiments.

Figure 18D:
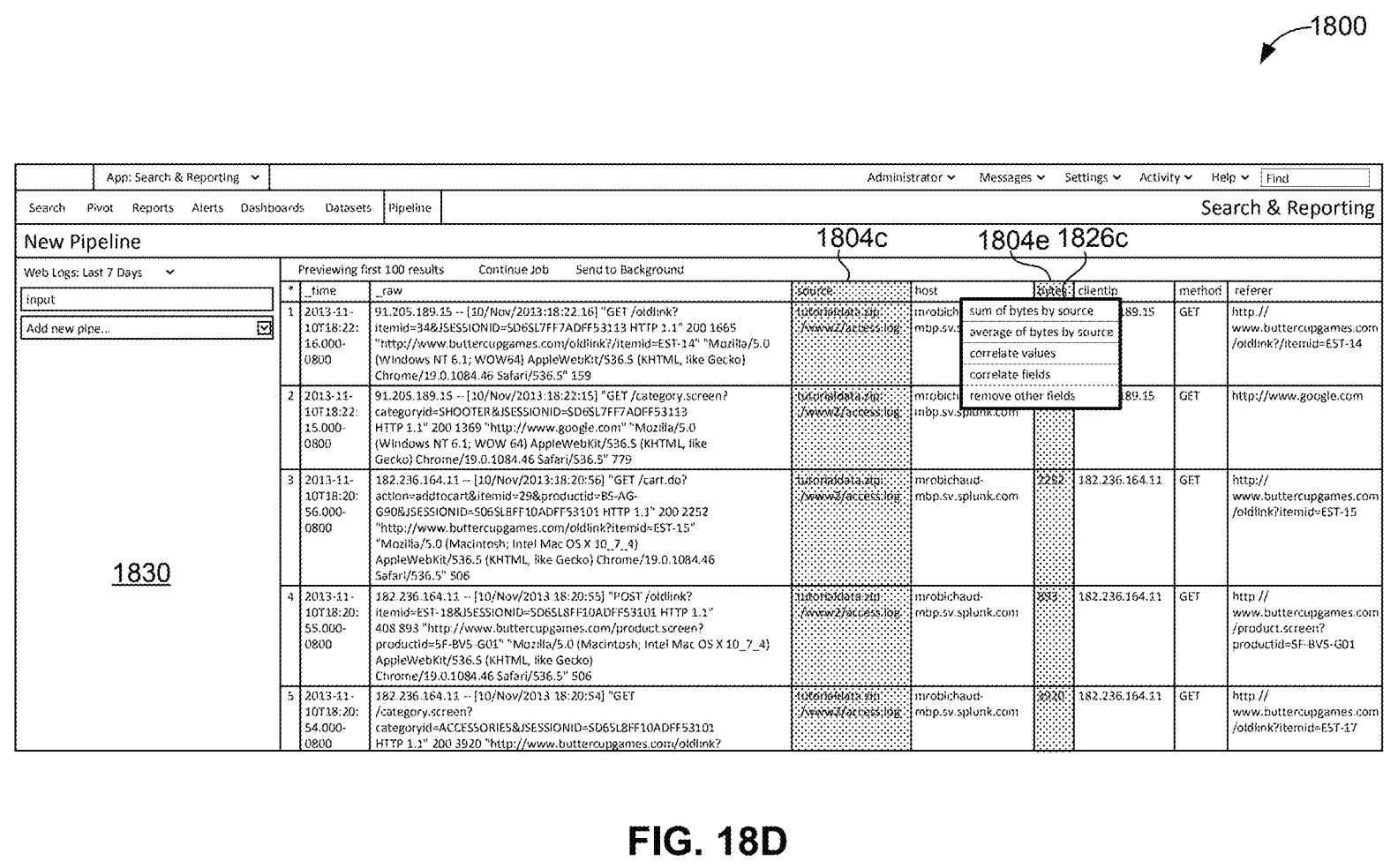

FIG. 18D illustrates a search screen in accordance with the disclosed embodiments.

Figure 18E:
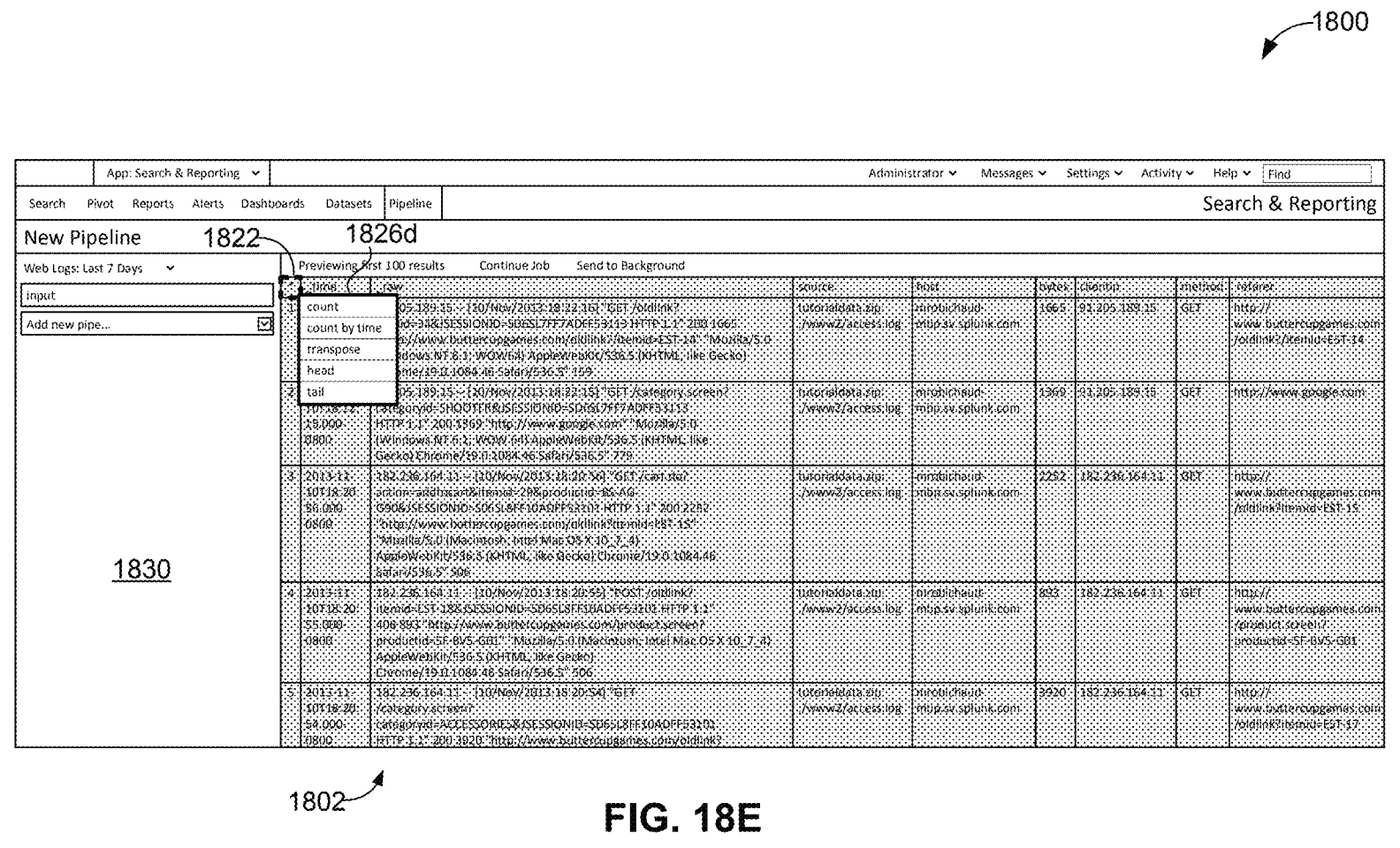

FIG. 18E illustrates a search screen in accordance with the disclosed embodiments.

Figure 18F:
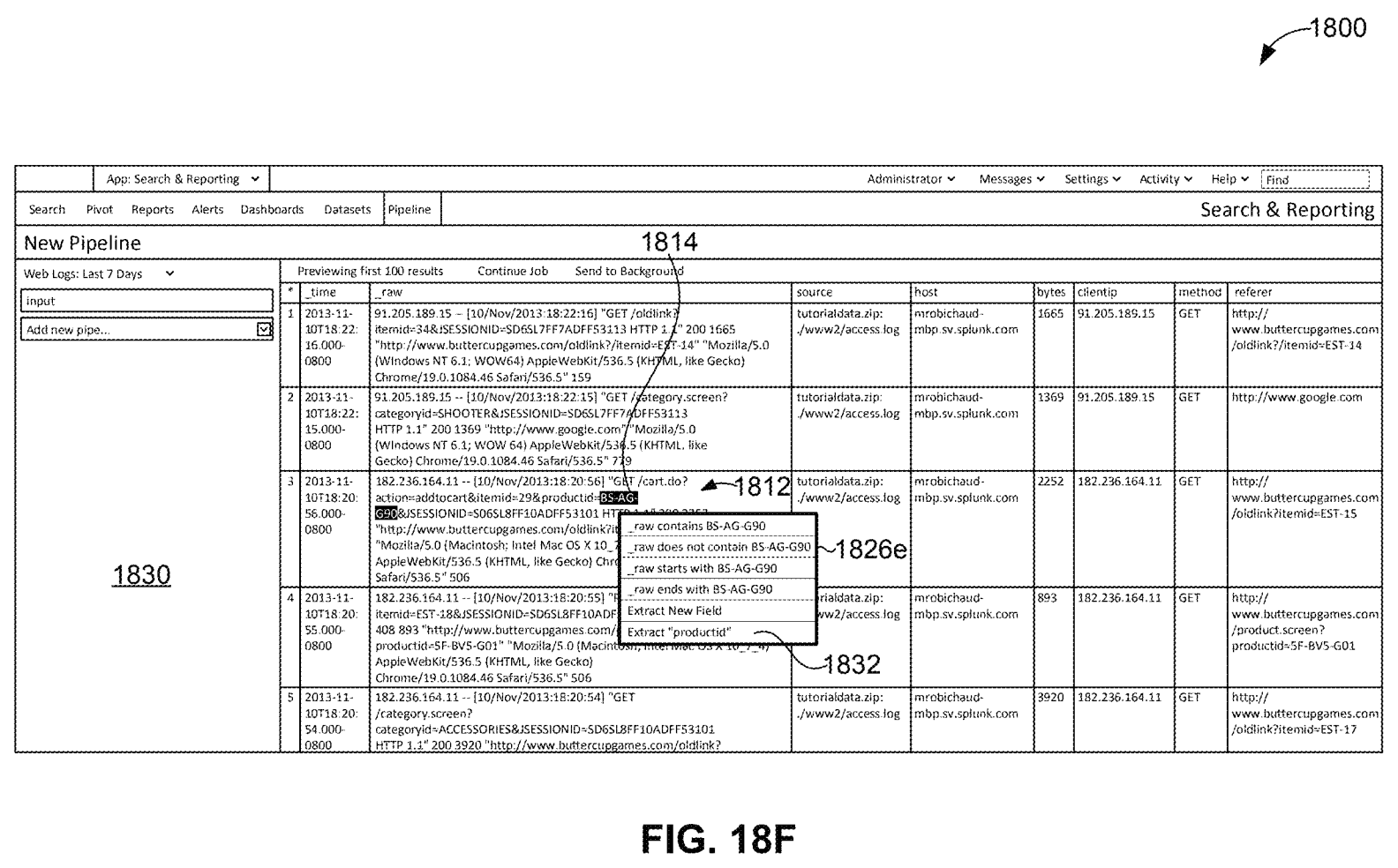

FIG. 18F illustrates a search screen in accordance with the disclosed embodiments.

Figure 18G:
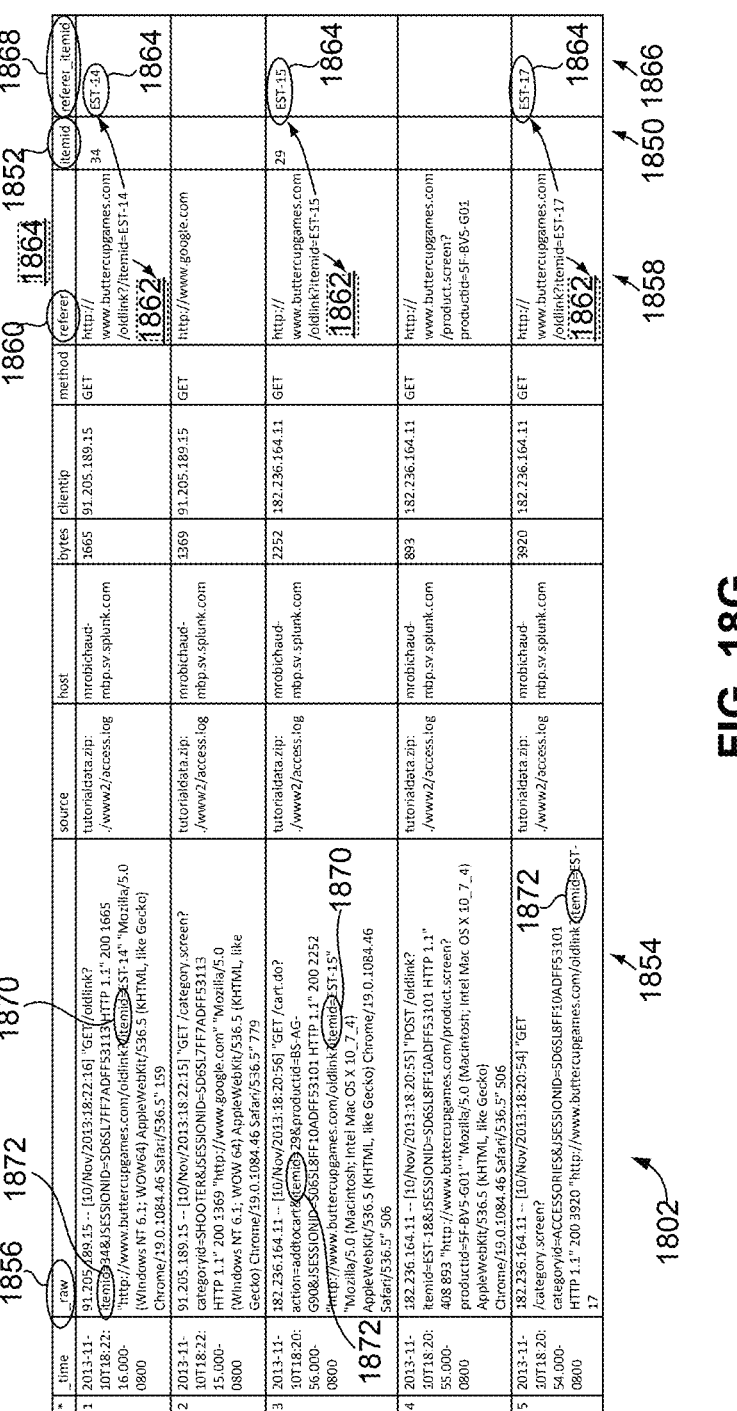

FIG. 18G illustrates events in a table format including fields extracted from the events.

Figure 19:
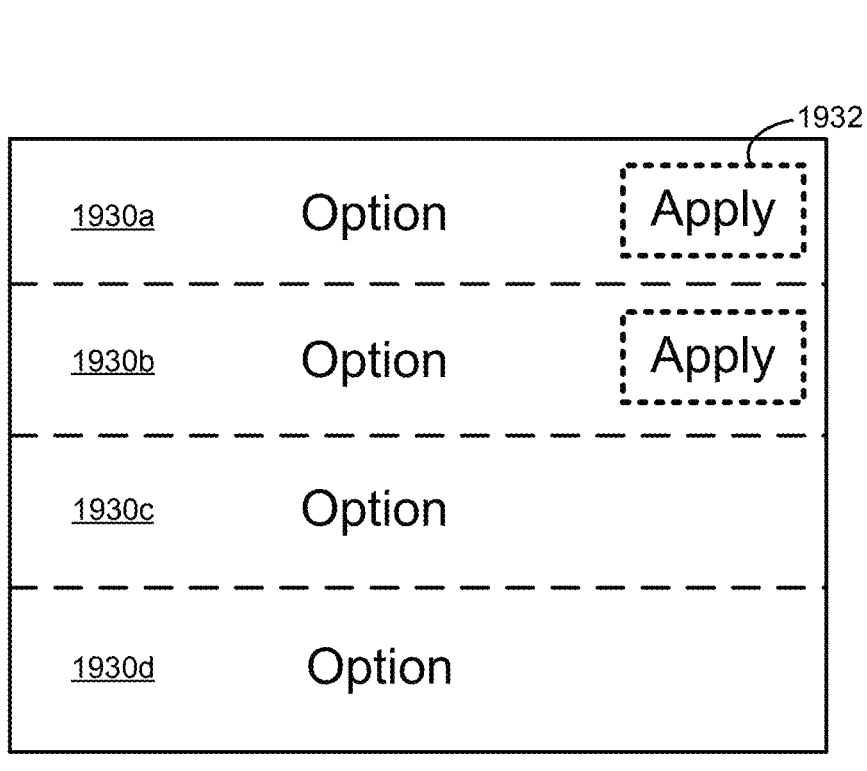

FIG. 19 illustrates an option menu in accordance with the disclosed embodiments.

Figure 20:
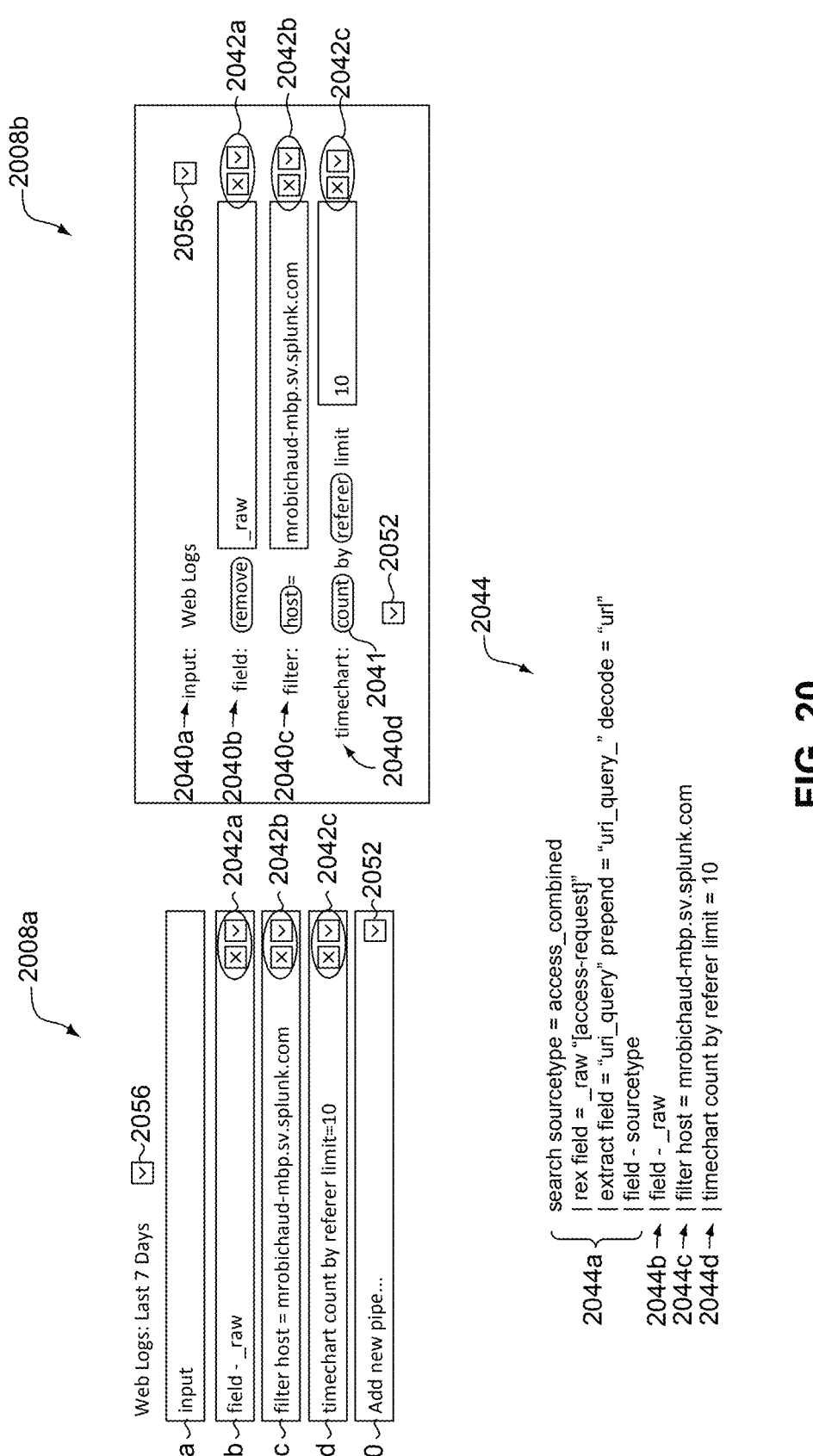

FIG. 20 illustrates command entry lists in accordance with the disclosed embodiments.

Figure 21:
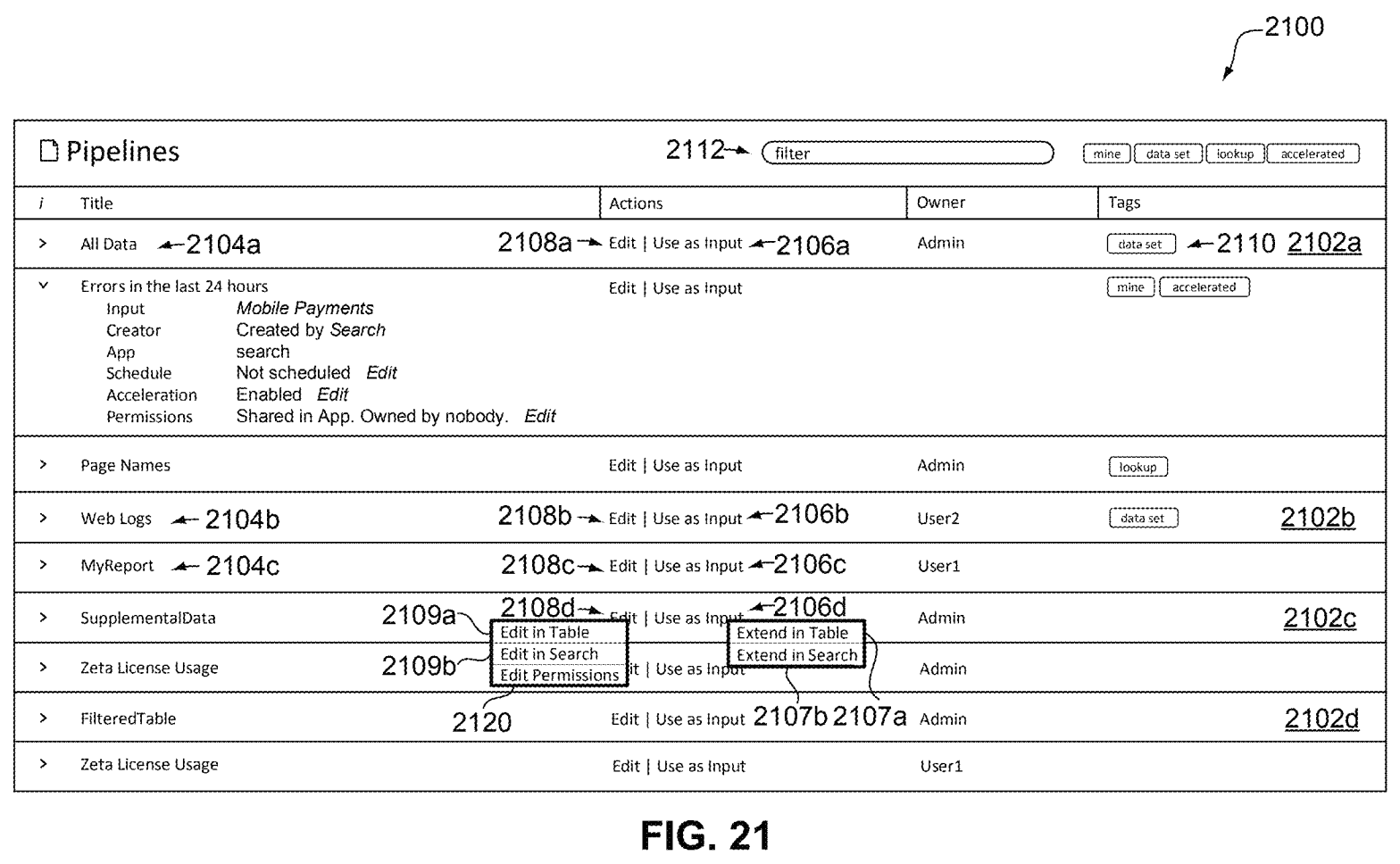

FIG. 21 illustrates a selection interface in accordance with the disclosed embodiments.

FIG. 22A illustrates a search screen in accordance with the disclosed embodiments.

FIG. 22B illustrates a search screen in accordance with the disclosed embodiments.

Figure 22C:

FIG. 22C illustrates a search screen in accordance with the disclosed embodiments.

Figure 22D:
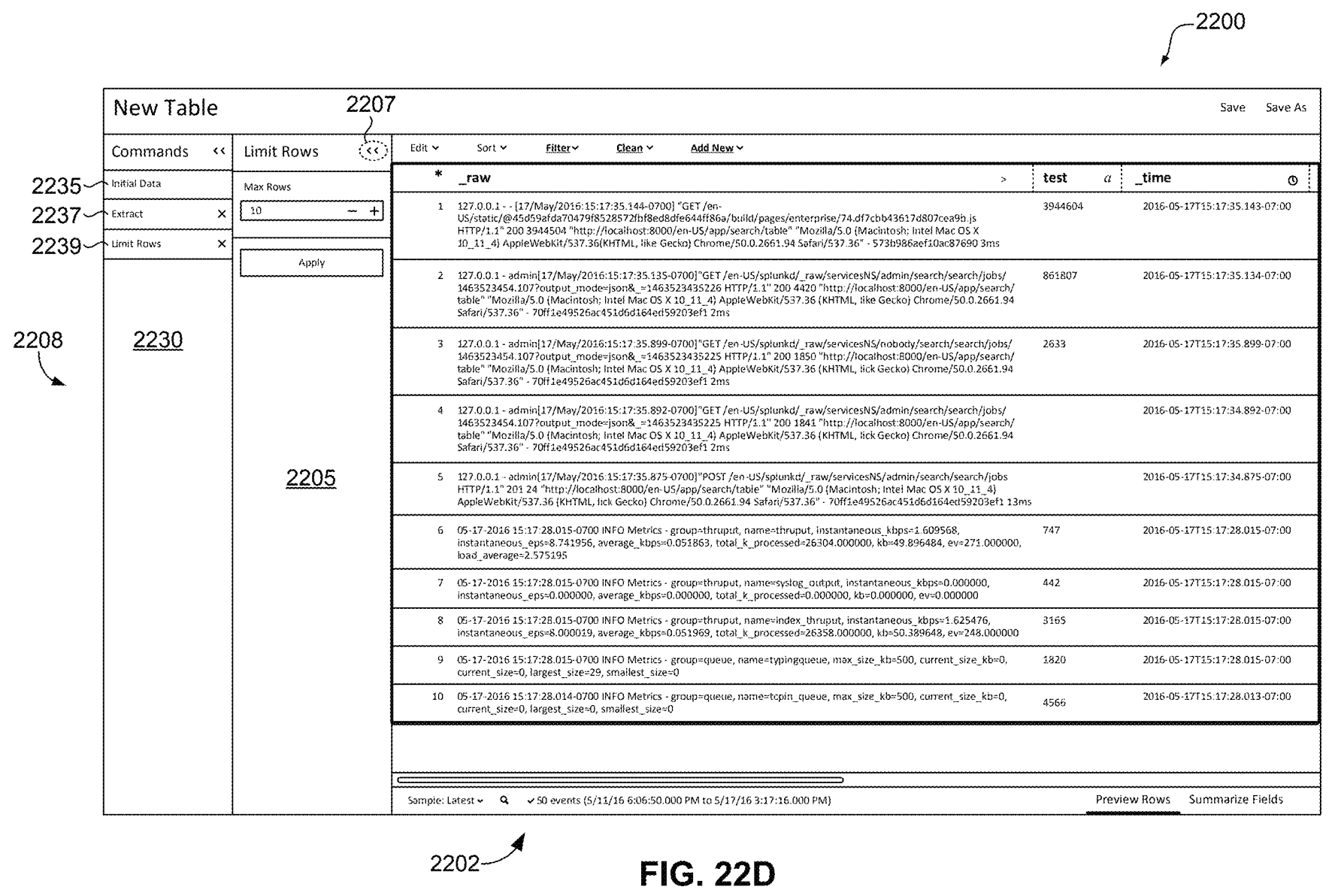

FIG. 22D illustrates a search screen in accordance with the disclosed embodiments.

Figure 23:
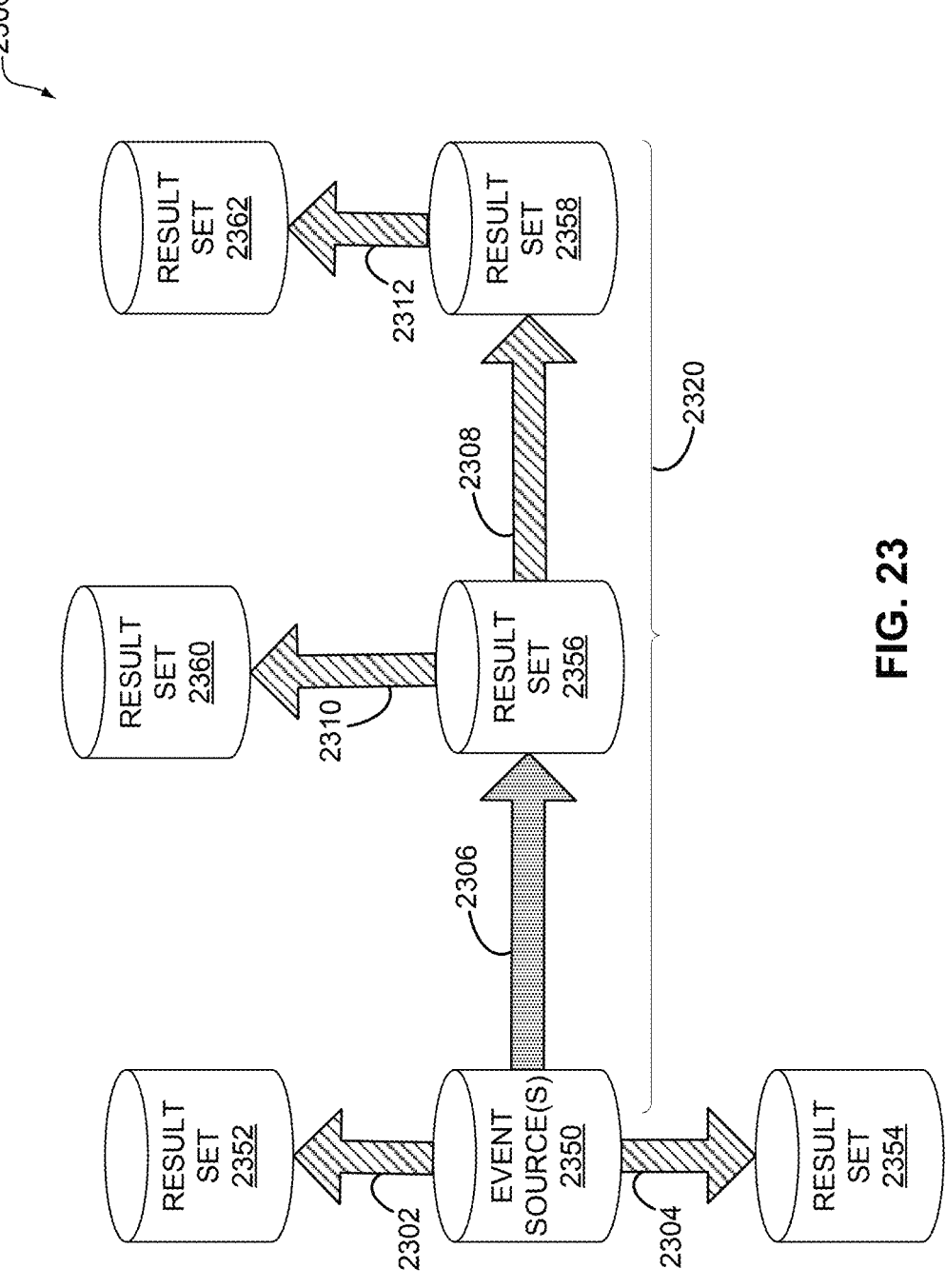

FIG. 23 illustrates a search screen in accordance with the disclosed embodiments.

FIG. 24 presents a flowchart illustrating a method of reusing result sets in accordance with the disclosed embodiments.

FIG. 25 presents a flowchart illustrating a method of reusing result sets in accordance with the disclosed embodiments.

DETAILED DESCRIPTION

Embodiments are described herein according to the following outline:

1.0. General Overview
2.0. Operating Environment
    2.1. Host Devices
    2.2. Client Devices
    2.3. Client Device Applications
    2.4. Data Server System
    2.5. Data Ingestion
        2.5.1. Input
        2.5.2. Parsing
        2.5.3. Indexing
    2.6. Query Processing
    2.7. Field Extraction
    2.8. Example Search Screen
    2.9. Data Modelling
    2.10. Acceleration Techniques
        2.10.1. Aggregation Technique
        2.10.2. Keyword Index
        2.10.3. High Performance Analytics Store
        2.10.4. Accelerating Report Generation
    2.11. Security Features
    2.12. Data Center Monitoring
    2.13. Cloud-Based System Overview
    2.14. Searching Externally Archived Data
        2.14.1. ERP Process Features
    2.15. IT Service Monitoring
3.0. Additional Example Search Screen
3.1. Example Table Format
3.2. Example Interactions with a Table Format
3.3. Example Options
3.4. Command Entry List
3.5. Example Pipeline Selection Interface
3.6 Extracting Field Label-Value Pairs
3.7 Additional Example Search Screen
3.8 Interface Panels
3.9 Option Menu Links
4.0 Selecting Command Entries to View Corresponding Query Results
4.1 Search Point Processing
4.2 Search Point Management
4.3 Additional Implementations

1.0. General Overview

Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments, such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, California. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events". An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.).. The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data". In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as IP address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters form a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources (further discussed with respect to FIG. 5).

2.0. Operating Environment

FIG. 1 illustrates a networked computer system 100 in which an embodiment may be implemented. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In an embodiment, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In one embodiment, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some cases, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In an embodiment, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In an embodiment, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In an embodiment, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

FIG. 2 depicts a block diagram of an exemplary data intake and query system 108, similar to the SPLUNK® ENTERPRISE system. System 108 includes one or more forwarders 204 that receive data from a variety of input data sources 202, and one or more indexers 206 that process and store the data in one or more data stores 208. These forwarders and indexers can comprise separate computer systems, or may alternatively comprise separate processes executing on one or more computer systems.

Each data source 202 broadly represents a distinct source of data that can be consumed by a system 108. Examples of a data source 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In an embodiment, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events.. A forwarder 204 may generate time stamps for events. Additionally or alternatively, a forwarder 204 may perform routing of events to indexers. Data store 208 may contain events derived from machine data from a variety of sources all pertaining to the same component in an IT environment, and this data may be produced by the machine in question or by other components in the IT environment.

2.5. Data Ingestion

FIG. 3 depicts a flow chart illustrating an example data flow performed by Data Intake and Query system 108, in accordance with the disclosed embodiments. The data flow illustrated in FIG. 3 is provided for illustrative purposes only; those skilled in the art would understand that one or more of the steps of the processes illustrated in FIG. 3 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

2.5.1. Input

At block 302, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks", or "buckets," possibly of a uniform data size, to facilitate subsequent processing steps.

At block 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the essential components needed to forward data. It can gather data from a variety of inputs and forward the data to a SPLUNK® ENTERPRISE server for indexing and searching. It also can tag metadata (e.g., source, source type, host, etc.).

Additionally or optionally, in an embodiment, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. It can also index data locally while forwarding the data to another indexer.

2.5.2. Parsing

At block 306, an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

At block 308, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or use any other rules for determining timestamps.

At block 310, the indexer associates with each event one or more metadata fields including a field containing the timestamp (in some embodiments, a timestamp may be included in the metadata fields) determined for the event. These metadata fields may include a number of "default fields" that are associated with all events, and may also include one more custom fields as defined by a user. Similar to the metadata fields associated with the data blocks at block 304, the default metadata fields associated with each event may include a host, source, and source type field including or in addition to a field storing the timestamp.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

2.5.3. Indexing

At blocks 314 and 316, an indexer can optionally generate a keyword index to facilitate fast keyword searching for event data. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block 318, the indexer stores the events with an associated timestamp in a data store 208. Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query.

Moreover, events and buckets can also be replicated across different indexers and data stores to facilitate high availability and disaster recovery as described in U.S. patent application Ser. No. 14/266,812, entitled "SITE-BASED SEARCH AFFINITY", filed on 30 Apr. 2014, and in U.S. patent application Ser. No. 14/266,817, entitled "MULTI-SITE CLUSTERING also filed on 30 Apr. 2014, each of which is hereby incorporated by reference in its entirety for all purposes.

2.6. Query Processing

FIG. 4 is a flow diagram that illustrates an exemplary process that a search head and one or more indexers may perform during a search query. At block 402, a search head receives a search query from a client. At block 404, the search head analyzes the search query to determine what portion(s) of the query can be delegated to indexers and what portions of the query can be executed locally by the search head. At block 406, the search head distributes the determined portions of the query to the appropriate indexers. In an embodiment, a search head cluster may take the place of an independent search head where each search head in the search head cluster coordinates with peer search heads in the search head cluster to schedule jobs, replicate search results, update configurations, fulfill search requests, etc. In an embodiment, the search head (or each search head) communicates with a master node (also known as a cluster master, not shown in FIG.) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 408, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 408 may use the late-binding schema to extract values for specified fields from events at the time the query is processed. In an embodiment, one or more rules for extracting field values may be specified as part of a source type definition. The indexers may then either send the relevant events back to the search head, or use the events to determine a partial result, and send the partial result back to the search head.

At block 410, the search head combines the partial results and/or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

2.7. Field Extraction

The search head 210 allows users to search and visualize event data extracted from raw machine data received from homogenous data sources. It also allows users to search and visualize event data extracted from raw machine data received from heterogeneous data sources. The search head 210 includes various mechanisms, which may additionally reside in an indexer 206, for processing a query. Splunk Processing Language (SPL), used in conjunction with the SPLUNK® ENTERPRISE system, can be utilized to make a query. SPL is a pipelined search language in which a set of inputs is operated on by a first command in a command line, and then a subsequent command following the pipe symbol "|" operates on the results produced by the first command, and so on for additional commands. Other query languages, such as the Structured Query Language ("SQL"), can be used to create a query.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 210 can apply the extraction rules to event data that it receives from indexers 206. Indexers 206 may apply the extraction rules to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

FIG. 5 illustrates an example of raw machine data received from disparate data sources. In this example, a user submits an order for merchandise using a vendor's shopping application program 501 running on the user's system. In this example, the order was not delivered to the vendor's server due to a resource exception at the destination server that is detected by the middleware code 502. The user then sends a message to the customer support 503 to complain about the order failing to complete. The three systems 501, 502, and 503 are disparate systems that do not have a common logging format. The order application 501 sends log data 504 to the SPLUNK® ENTERPRISE system in one format, the middleware code 502 sends error log data 505 in a second format, and the support server 503 sends log data 506 in a third format.

Using the log data received at one or more indexers 206 from the three systems the vendor can uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems—there is a semantic relationship between the customer ID field values generated by the three systems. The search head 210 requests event data from the one or more indexers 206 to gather relevant event data from the three systems. It then applies extraction rules to the event data in order to extract field values that it can correlate. The search head may apply a different extraction rule to each set of events from each system when the event data format differs among systems. In this example, the user interface can display to the administrator the event data corresponding to the common customer ID field values 507, 508, and 509, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, or a visualization, such as a graph or chart, generated from the values.

2.8. Example Search Screen

FIG. 6A illustrates an example search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, such as by selecting specific hosts and log files.

After the search is executed, the search screen 600 in FIG. 6A can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

2.9. Data Models

A data model is a hierarchically structured search-time mapping of semantic knowledge about one or more datasets. It encodes the domain knowledge necessary to build a variety of specialized searches of those datasets. Those searches, in turn, can be used to generate reports.

A data model is composed of one or more "objects" (or "data model objects") that define or otherwise correspond to a specific set of data.

Objects in data models can be arranged hierarchically in parent/child relationships. Each child object represents a subset of the dataset covered by its parent object. The top-level objects in data models are collectively referred to as "root objects."

Child objects have inheritance. Data model objects are defined by characteristics that mostly break down into constraints and attributes. Child objects inherit constraints and attributes from their parent objects and have additional constraints and attributes of their own. Child objects provide a way of filtering events from parent objects. Because a child object always provides an additional constraint in addition to the constraints it has inherited from its parent object, the dataset it represents is always a subset of the dataset that its parent represents.

For example, a first data model object may define a broad set of data pertaining to e-mail activity generally, and another data model object may define specific datasets within the broad dataset, such as a subset of the e-mail data pertaining specifically to e-mails sent. Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. For example, a user can simply select an "e-mail activity" data model object to access a dataset relating to e-mails generally (e.g., sent or received), or select an "e-mails sent" data model object (or data sub-model object) to access a dataset relating to e-mails sent.

A data model object may be defined by (1) a set of search constraints, and (2) a set of fields. Thus, a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events in a user interface screen.

A child of the parent data model may be defined by a search (typically a narrower search) that produces a subset of the events that would be produced by the parent data model's search. The child's set of fields can include a subset of the set of fields of the parent data model and/or additional fields. Data model objects that reference the subsets can be arranged in a hierarchical manner, so that child subsets of events are proper subsets of their parents. A user iteratively applies a model development tool (not shown in FIG.) to prepare a query that defines a subset of events and assigns an object name to that subset. A child subset is created by further limiting a query that generated a parent subset. A late-binding schema of field extraction rules is associated with each object or subset in the data model.

Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 March, 2015, U.S. patent application Ser. No. 14/611,232, entitled "GENERATION OF A DATA MODEL APPLIED TO QUERIES", filed on 31 Jan. 2015, and U.S. patent application Ser. No. 14/815,884, entitled "GENERATION OF A DATA MODEL APPLIED TO OBJECT QUERIES", filed on 31 Jul. 2015, each of which is hereby incorporated by reference in its entirety for all purposes. See, also, Knowledge Manager Manual, Build a Data Model, Splunk Enterprise 6.1.3 pp. 150-204 (Aug. 25, 2014).

A data model can also include reports. One or more report formats can be associated with a particular data model and be made available to run against the data model. A user can use child objects to design reports with object datasets that already have extraneous data pre-filtered out. In an embodiment, the data intake and query system 108 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine and/or filter search results to produce more precise reports. The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Building reports using the report generation interface is further explained in U.S. patent application Ser. No. 14/503,335, entitled "GENERATING REPORTS FROM UNSTRUCTURED DATA", filed on 30 Sep. 2014, and which is hereby incorporated by reference in its entirety for all purposes, and in Pivot Manual, Splunk Enterprise 6.1.3 (Aug. 4, 2014). Data visualizations also can be generated in a variety of formats, by reference to the data model. Reports, data visualizations, and data model objects can be saved and associated with the data model for future use. The data model object may be used to perform searches of other data.

FIGS. 12, 13, and 7A-7D illustrate a series of user interface screens where a user may select report generation options using data models. The report generation process may be driven by a predefined data model object, such as a data model object defined and/or saved via a reporting application or a data model object obtained from another source. A user can load a saved data model object using a report editor. For example, the initial search query and fields used to drive the report editor may be obtained from a data model object. The data model object that is used to drive a report generation process may define a search and a set of fields. Upon loading of the data model object, the report generation process may enable a user to use the fields (e.g., the fields defined by the data model object) to define criteria for a report (e.g., filters, split rows/columns, aggregates, etc.) and the search may be used to identify events (e.g., to identify events responsive to the search) used to generate the report. That is, for example, if a data model object is selected to drive a report editor, the graphical user interface of the report editor may enable a user to define reporting criteria for the report using the fields associated with the selected data model object, and the events used to generate the report may be constrained to the events that match, or otherwise satisfy, the search constraints of the selected data model object.

The selection of a data model object for use in driving a report generation may be facilitated by a data model object selection interface. FIG. 12 illustrates an example interactive data model selection graphical user interface 1200 of a report editor that displays a listing of available data models 1201. The user may select one of the data models 1202.

FIG. 13 illustrates an example data model object selection graphical user interface 1300 that displays available data objects 1301 for the selected data object model 1202. The user may select one of the displayed data model objects 1302 for use in driving the report generation process.

Figure 7A:
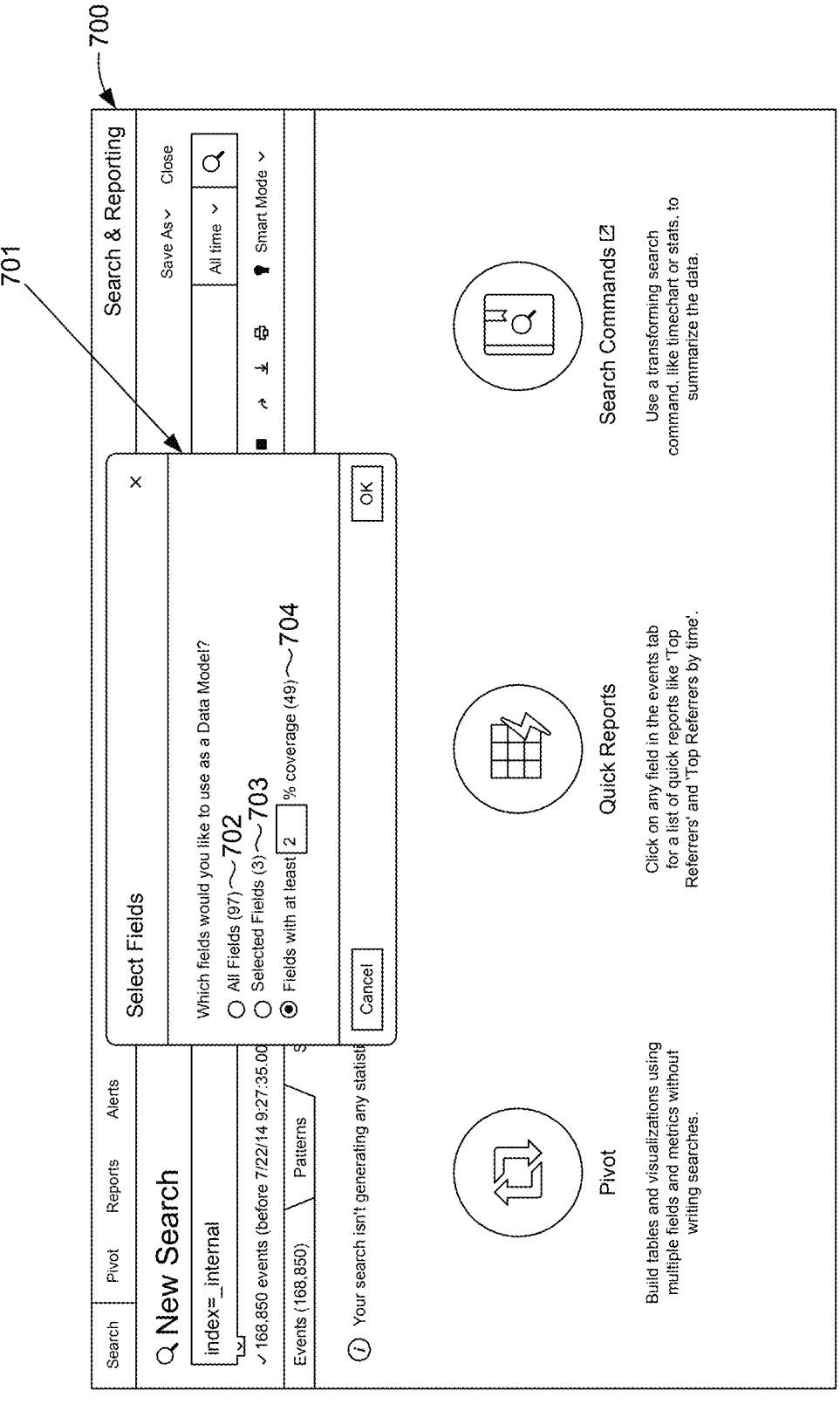

Once a data model object is selected by the user, a user interface screen 700 shown in FIG. 7A may display an interactive listing of automatic field identification options 701 based on the selected data model object. For example, a user may select one of the three illustrated options (e.g., the "All Fields" option 702, the "Selected Fields" option 703, or the "Coverage" option (e.g., fields with at least a specified % of coverage) 704). If the user selects the "All Fields" option 702, all of the fields identified from the events that were returned in response to an initial search query may be selected. That is, for example, all of the fields of the identified data model object fields may be selected. If the user selects the "Selected Fields" option 703, only the fields from the fields of the identified data model object fields that are selected by the user may be used. If the user selects the "Coverage" option 704, only the fields of the identified data model object fields meeting a specified coverage criteria may be selected. A percent coverage may refer to the percentage of events returned by the initial search query that a given field appears in. Thus, for example, if an object dataset includes 10,000 events returned in response to an initial search query, and the "avg_age" field appears in 854 of those 10,000 events, then the "avg_age" field would have a coverage of 8.54% for that object dataset. If, for example, the user selects the "Coverage" option and specifies a coverage value of 2%, only fields having a coverage value equal to or greater than 2% may be selected. The number of fields corresponding to each selectable option may be displayed in association with each option. For example, "97" displayed next to the "All Fields" option 702 indicates that 97 fields will be selected if the "All Fields" option is selected. The "3" displayed next to the "Selected Fields" option 703 indicates that 3 of the 97 fields will be selected if the "Selected Fields" option is selected. The "49" displayed next to the "Coverage" option 704 indicates that 49 of the 97 fields (e.g., the 49 fields having a coverage of 2% or greater) will be selected if the "Coverage" option is selected. The number of fields corresponding to the "Coverage" option may be dynamically updated based on the specified percent of coverage.

Figure 7B:
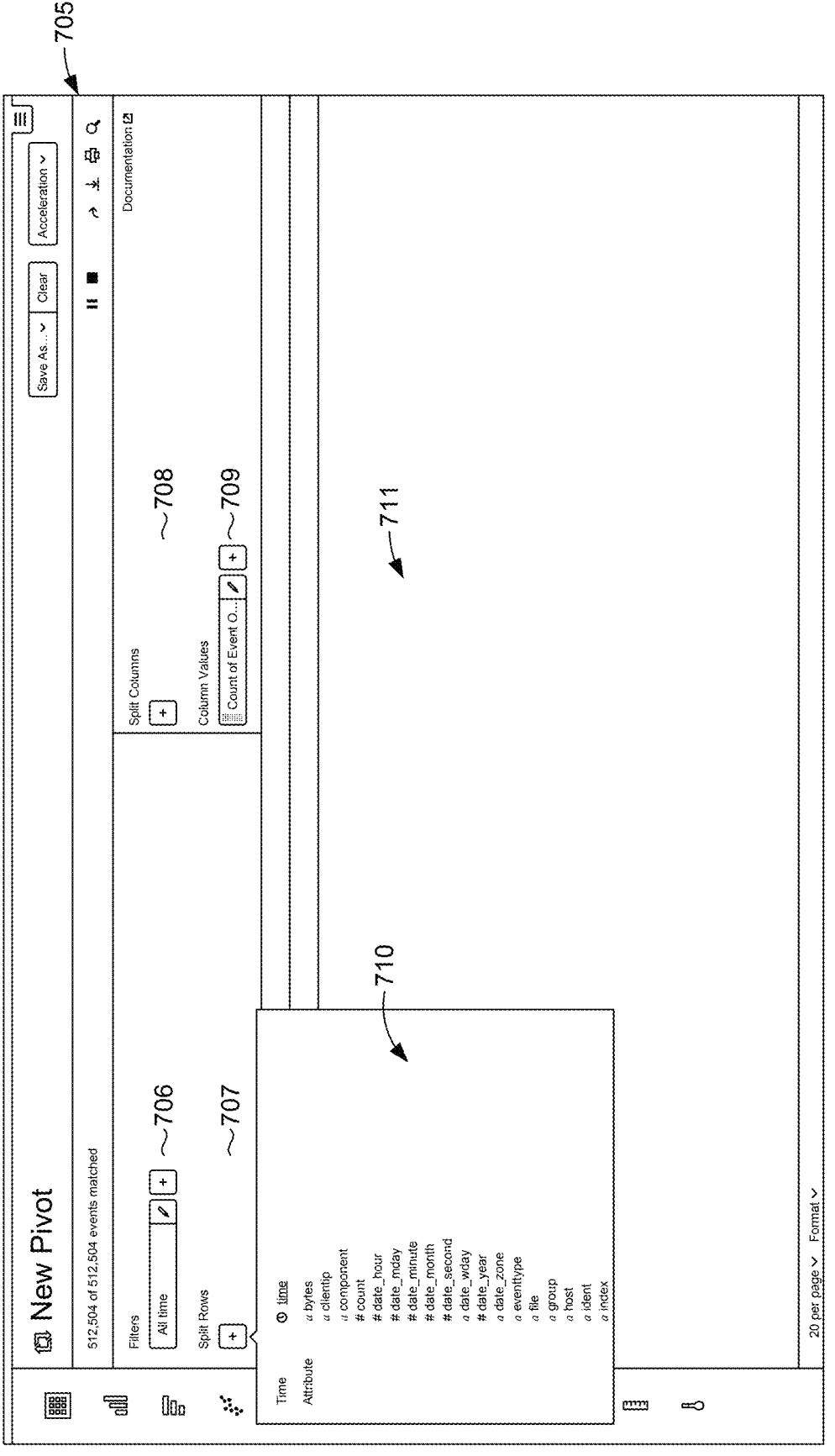
Figure 7C:
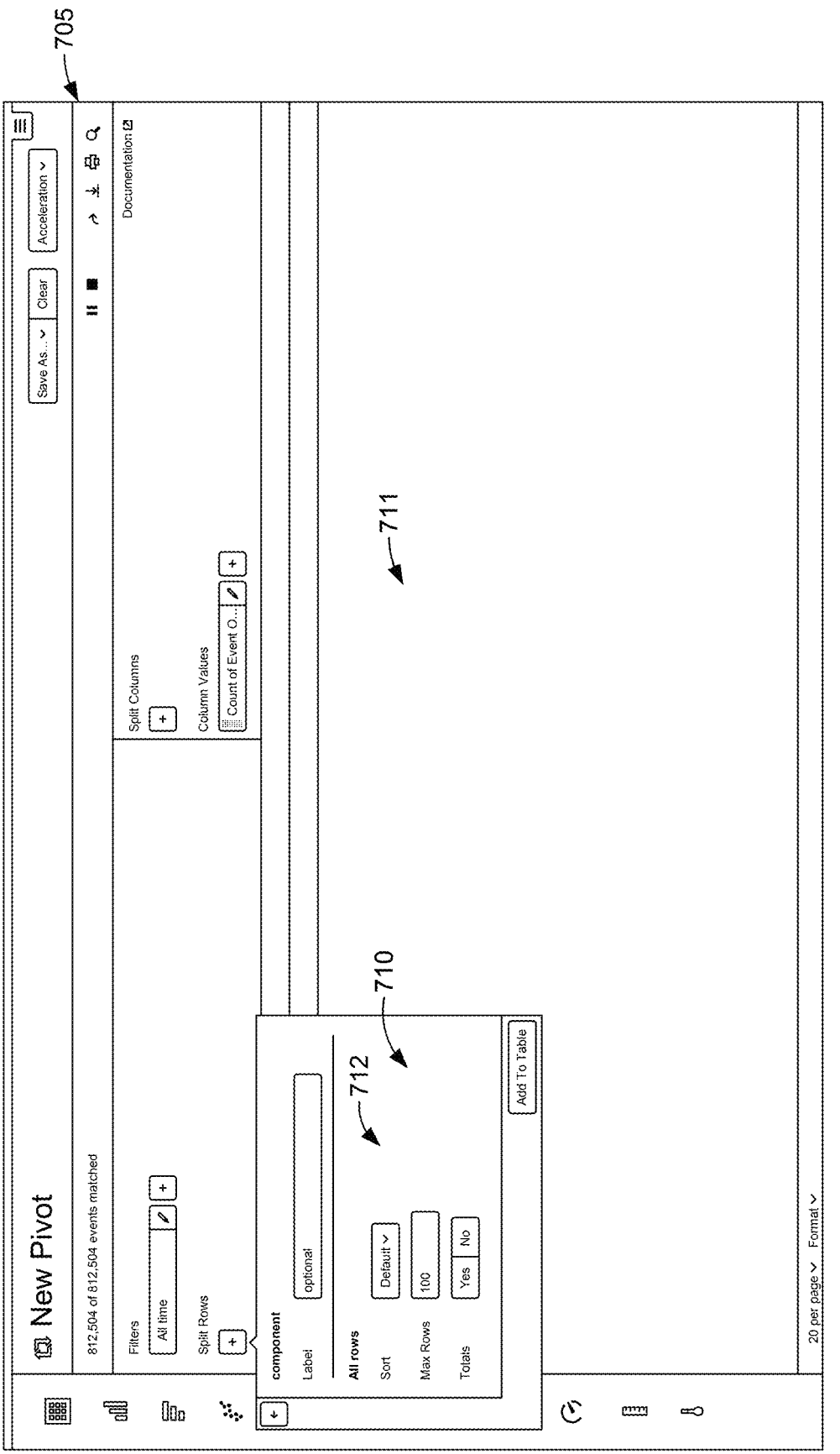

FIG. 7B illustrates an example graphical user interface screen (also called the pivot interface) 705 displaying the reporting application's "Report Editor" page. The screen may display interactive elements for defining various elements of a report. For example, the page includes a "Filters" element 706, a "Split Rows" element 707, a "Split Columns" element 708, and a "Column Values" element 709. The page may include a list of search results 711. In this example, the Split Rows element 707 is expanded, revealing a listing of fields 710 that can be used to define additional criteria (e.g., reporting criteria). The listing of fields 710 may correspond to the selected fields (attributes). That is, the listing of fields 710 may list only the fields previously selected, either automatically and/or manually by a user. FIG. 7C illustrates a formatting dialogue 712 that may be displayed upon selecting a field from the listing of fields 710. The dialogue can be used to format the display of the results of the selection (e.g., label the column to be displayed as "component").

Figure 7D:
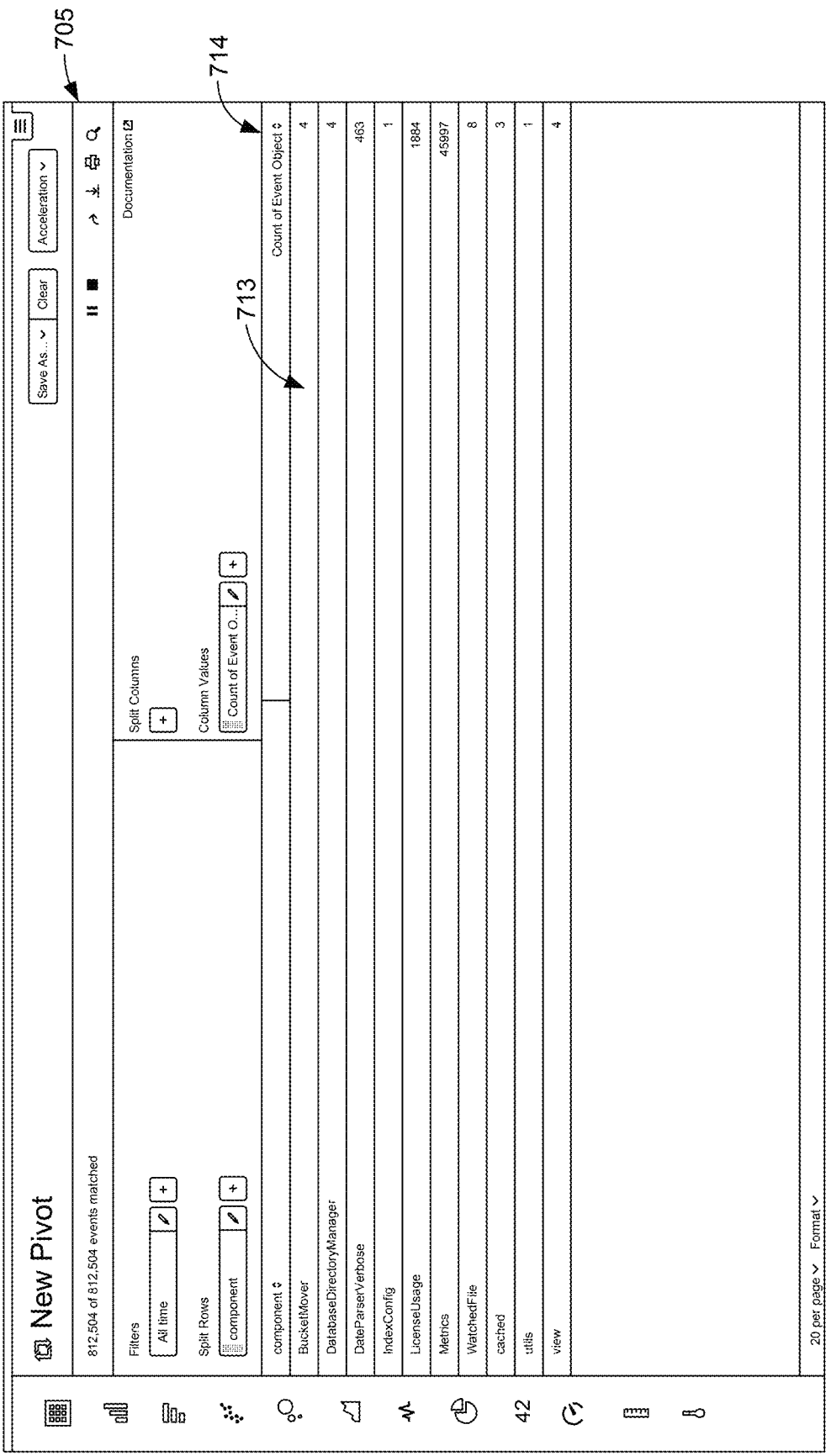

FIG. 7D illustrates an example graphical user interface screen 705 including a table of results 713 based on the selected criteria including splitting the rows by the "component" field. A column 714 having an associated count for each component listed in the table may be displayed that indicates an aggregate count of the number of times that the particular field-value pair (e.g., the value in a row) occurs in the set of events responsive to the initial search query.

FIG. 14 illustrates an example graphical user interface screen 1400 that allows the user to filter search results and to perform statistical analysis on values extracted from specific fields in the set of events. In this example, the top ten product names ranked by price are selected as a filter 1401 that causes the display of the ten most popular products sorted by price. Each row is displayed by product name and price 1402. This results in each product displayed in a column labeled "product name" along with an associated price in a column labeled "price" 1406. Statistical analysis of other fields in the events associated with the ten most popular products have been specified as column values 1403. A count of the number of successful purchases for each product is displayed in column 1404. This statistics may be produced by filtering the search results by the product name, finding all occurrences of a successful purchase in a field within the events and generating a total of the number of occurrences. A sum of the total sales is displayed in column 1405, which is a result of the multiplication of the price and the number of successful purchases for each product.

The reporting application allows the user to create graphical visualizations of the statistics generated for a report. For example, FIG. 15 illustrates an example graphical user interface 1500 that displays a set of components and associated statistics 1501. The reporting application allows the user to select a visualization of the statistics in a graph (e.g., bar chart, scatter plot, area chart, line chart, pie chart, radial gauge, marker gauge, filler gauge, etc.). FIG. 16 illustrates an example of a bar chart visualization 1600 of an aspect of the statistical data 1501. FIG. 17 illustrates a scatter plot visualization 1700 of an aspect of the statistical data 1501.

2.10. Acceleration Technique

The above-described system provides significant flexibility by enabling a user to analyze massive quantities of minimally processed data "on the fly" at search time instead of storing pre-specified portions of the data in a database at ingestion time. This flexibility enables a user to see valuable insights, correlate data, and perform subsequent queries to examine interesting aspects of the data that may not have been apparent at ingestion time.

However, performing extraction and analysis operations at search time can involve a large amount of data and require a large number of computational operations, which can cause delays in processing the queries. Advantageously, SPLUNK® ENTERPRISE system employs a number of unique acceleration techniques that have been developed to speed up analysis operations performed at search time. These techniques include: (1) performing search operations in parallel across multiple indexers; (2) using a keyword index; (3) using a high performance analytics store; and (4) accelerating the process of generating reports. These novel techniques are described in more detail below.

2.10.1. Aggregation Technique

To facilitate faster query processing, a query can be structured such that multiple indexers perform the query in parallel, while aggregation of search results from the multiple indexers is performed locally at the search head. For example, FIG. 8 illustrates how a search query 802 received from a client at a search head 210 can split into two phases, including: (1) subtasks 804 (e.g., data retrieval or simple filtering) that may be performed in parallel by indexers 206 for execution, and (2) a search results aggregation operation 806 to be executed by the search head when the results are ultimately collected from the indexers.

During operation, upon receiving search query 802, a search head 210 determines that a portion of the operations involved with the search query may be performed locally by the search head. The search head modifies search query 802 by substituting "stats" (create aggregate statistics over results sets received from the indexers at the search head) with "prestats" (create statistics by the indexer from local results set) to produce search query 804, and then distributes search query 804 to distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as illustrated in FIG. 4, or may alternatively distribute a modified version (e.g., a more restricted version) of the search query to the search peers. In this example, the indexers are responsible for producing the results and sending them to the search head. After the indexers return the results to the search head, the search head aggregates the received results 806 to form a single search result set. By executing the query in this manner, the system effectively distributes the computational operations across the indexers while minimizing data transfers.

2.10.2. Keyword Index

As described above with reference to the flow charts in FIG. 3 and FIG. 4, data intake and query system 108 can construct and maintain one or more keyword indices to quickly identify events containing specific keywords. This technique can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

2.10.3. High Performance Analytics Store

To speed up certain types of queries, some embodiments of system 108 create a high performance analytics store, which is referred to as a "summarization table," that contains entries for specific field-value pairs. Each of these entries keeps track of instances of a specific value in a specific field in the event data and includes references to events containing the specific value in the specific field. For example, an example entry in a summarization table can keep track of occurrences of the value "94107" in a "ZIP code" field of a set of events and the entry includes references to all of the events that contain the value "94107" in the ZIP code field. This optimization technique enables the system to quickly process queries that seek to determine how many events have a particular value for a particular field. To this end, the system can examine the entry in the summarization table to count instances of the specific value in the field without having to go through the individual events or perform data extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range. A bucket-specific summarization table includes entries for specific field-value combinations that occur in events in the specific bucket. Alternatively, the system can maintain a separate summarization table for each indexer. The indexer-specific summarization table includes entries for the events in a data store that are managed by the specific indexer. Indexer-specific summarization tables may also be bucket-specific.

The summarization table can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination.

In some cases, when the summarization tables may not cover all of the events that are relevant to a query, the system can use the summarization tables to obtain partial results for the events that are covered by summarization tables, but may also have to search through other events that are not covered by the summarization tables to produce additional results. These additional results can then be combined with the partial results to produce a final set of results for the query. The summarization table and associated techniques are described in more detail in U.S. Pat. No. 8,682,925, entitled "DISTRIBUTED HIGH PERFORMANCE ANALYTICS STORE", issued on 25 Mar. 2014, U.S. patent application Ser. No. 14/170,159, entitled "SUPPLEMENTING A HIGH PERFORMANCE ANALYTICS STORE WITH EVALUATION OF INDIVIDUAL EVENTS TO RESPOND TO AN EVENT QUERY", filed on 31 Jan. 2014, and U.S. patent application Ser. No. 14/815,973, entitled "STORAGE MEDIUM AND CONTROL DEVICE", filed on 21 Feb. 2014, each of which is hereby incorporated by reference in its entirety.

2.10.4. Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so advantageously only the newer event data needs to be processed while generating an updated report. These report acceleration techniques are described in more detail in U.S. Pat. No. 8,589,403, entitled "COMPRESSED JOURNALING IN EVENT TRACKING FILES FOR METADATA RECOVERY AND REPLICATION", issued on 19 Nov. 2013, U.S. Pat. No. 8,412,696, entitled "REAL TIME SEARCHING AND REPORTING", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety.

2.11. Security Features

The SPLUNK® ENTERPRISE platform provides various schemas, dashboards and visualizations that simplify developers' task to create applications with additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. SPLUNK® APP FOR ENTERPRISE SECURITY provides the security practitioner with visibility into security-relevant threats found in the enterprise infrastructure by capturing, monitoring, and reporting on data from enterprise security devices, systems, and applications. Through the use of SPLUNK® ENTERPRISE searching and reporting capabilities, SPLUNK® APP FOR ENTERPRISE SECURITY provides a top-down and bottom-up view of an organization's security posture.

The SPLUNK® APP FOR ENTERPRISE SECURITY leverages SPLUNK® ENTERPRISE search-time normalization techniques, saved searches, and correlation searches to provide visibility into security-relevant threats and activity and generate notable events for tracking. The App enables the security practitioner to investigate and explore the data to find new or unknown threats that do not follow signature-based patterns.

Conventional Security Information and Event Management (SIEM) systems that lack the infrastructure to effectively store and analyze large volumes of security-related data. Traditional SIEM systems typically use fixed schemas to extract data from pre-defined security-related fields at data ingestion time and storing the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data and enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on 2 Sep. 2014, U.S. patent application Ser. No. 13/956,252, entitled "INVESTIGATIVE AND DYNAMIC DETECTION OF POTENTIAL SECURITY-THREAT INDICATORS FROM EVENTS IN BIG DATA", filed on 31 Jul. 2013, U.S. patent application Ser. No. 14/445,018, entitled "GRAPHIC DISPLAY OF SECURITY THREATS BASED ON INDICATIONS OF ACCESS TO NEWLY REGISTERED DOMAINS", filed on 28 Jul. 2014, U.S. patent application Ser. No. 14/445,023, entitled "SECURITY THREAT DETECTION OF NEWLY REGISTERED DOMAINS", filed on 28 Jul. 2014, U.S. patent application Ser. No. 14/815,971, entitled "SECURITY THREAT DETECTION USING DOMAIN NAME ACCESSES", filed on 1 Aug. 2015, and U.S. patent application Ser. No. 14/815,972, entitled "SECURITY THREAT DETECTION USING DOMAIN NAME REGISTRATIONS", filed on 1 Aug. 2015, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting "notable events" that are likely to indicate a security threat. These notable events can be detected in a number of ways: (1) a user can notice a correlation in the data and can manually identify a corresponding group of one or more events as "notable;" or (2) a user can define a "correlation search" specifying criteria for a notable event, and every time one or more events satisfy the criteria, the application can indicate that the one or more events are notable. A user can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

The SPLUNK® APP FOR ENTERPRISE SECURITY provides various visualizations to aid in discovering security threats, such as a "key indicators view" that enables a user to view security metrics, such as counts of different types of notable events. For example, FIG. 9A illustrates an example key indicators view 900 that comprises a dashboard, which can display a value 901, for various security-related metrics, such as malware infections 902. It can also display a change in a metric value 903, which indicates that the number of malware infections increased by 63 during the preceding interval. Key indicators view 900 additionally displays a histogram panel 904 that displays a histogram of notable events organized by urgency values, and a histogram of notable events organized by time intervals. This key indicators view is described in further detail in pending U.S. patent application Ser. No. 13/956,338, entitled "KEY INDI-CATORS VIEW", filed on 31 Jul. 2013, and which is hereby incorporated by reference in its entirety for all purposes.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 9B illustrates an example incident review dashboard 910 that includes a set of incident attribute fields 911 that, for example, enables a user to specify a time range field 912 for the displayed events. It also includes a timeline 913 that graphically illustrates the number of incidents that occurred in time intervals over the selected time range. It additionally displays an events list 914 that enables a user to view a list of all of the notable events that match the criteria in the incident attributes fields 911. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event.

2.12. Data Center Monitoring

As mentioned above, the SPLUNK® ENTERPRISE platform provides various features that simplify the developers's task to create various applications. One such application is SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks.

Conventional data-center-monitoring systems lack the infrastructure to effectively store and analyze large volumes of machine-generated data, such as performance information and log data obtained from the data center. In conventional data-center-monitoring systems, machine-generated data is typically pre-processed prior to being stored, for example, by extracting pre-specified data items and storing them in a database to facilitate subsequent retrieval and analysis at search time. However, the rest of the data is not saved and discarded during pre-processing.

In contrast, the SPLUNK® APP FOR VMWARE® stores large volumes of minimally processed machine data, such as performance information and log data, at ingestion time for later retrieval and analysis at search time when a live performance issue is being investigated. In addition to data obtained from various log files, this performance-related information can include values for performance metrics obtained through an application programming interface (API) provided as part of the vSphere Hypervisor" system distributed by VMware, Inc. of Palo Alto, California. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. Such performance metrics are described in U.S. patent application Ser. No. 14/167,316, entitled "CORRE-LATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

To facilitate retrieving information of interest from performance data and log files, the SPLUNK® APP FOR VMWARE® provides pre-specified schemas for extracting relevant values from different types of performance-related event data, and also enables a user to define such schemas.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Example node-expansion operations are illustrated in FIG. 9C, wherein nodes 933 and 934 are selectively expanded. Note that nodes 931-939 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/253,490, entitled "PROACTIVE MONITORING TREE WITH SEVERITY STATE SORTING", filed on 15 Apr. 2014, and U.S. patent application Ser. No. 14/812,948, also entitled "PROACTIVE MONITORING TREE WITH SEVERITY STATE SORTING", filed on 29 Jul. 2015, each of which is hereby incorporated by reference in its entirety for all purposes.

The SPLUNK® APP FOR VMWARE® also provides a user interface that enables a user to select a specific time range and then view heterogeneous data comprising events, log data, and associated performance metrics for the selected time range. For example, the screen illustrated in FIG. 9D displays a listing of recent "tasks and events" and a listing of recent "log entries" for a selected time range above a performance-metric graph for "average CPU core utilization" for the selected time range. Note that a user is able to operate pull-down menus 942 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

2.13. Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

FIG. 10 illustrates a block diagram of an example cloud-based data intake and query system. Similar to the system of FIG. 2, the networked computer system 1000 includes input data sources 202 and forwarders 204. These input data sources and forwarders may be in a subscriber's private computing environment. Alternatively, they might be directly managed by the service provider as part of the cloud service. In the example system 1000, one or more forwarders 204 and client devices 1002 are coupled to a cloud-based data intake and query system 1006 via one or more networks 1004. Network 1004 broadly represents one or more LANs, WANs, cellular networks, intranetworks, internetworks, etc., using any of wired, wireless, terrestrial microwave, satellite links, etc., and may include the public Internet, and is used by client devices 1002 and forwarders 204 to access the system 1006. Similar to the system of 108, each of the forwarders 204 may be configured to receive data from an input source and to forward the data to other components of the system 1006 for further processing.

In an embodiment, a cloud-based data intake and query system 1006 may comprise a plurality of system instances 1008. In general, each system instance 1008 may include one or more computing resources managed by a provider of the cloud-based system 1006 made available to a particular subscriber. The computing resources comprising a system instance 1008 may, for example, include one or more servers or other devices configured to implement one or more forwarders, indexers, search heads, and other components of a data intake and query system, similar to system 108. As indicated above, a subscriber may use a web browser or other application of a client device 1002 to access a web portal or other interface that enables the subscriber to configure an instance 1008.

Providing a data intake and query system as described in reference to system 108 as a cloud-based service presents a number of challenges. Each of the components of a system 108 (e.g., forwarders, indexers and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 1008) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment such as SPLUNK® ENTERPRISE and a cloud-based environment such as SPLUNK CLOUD™ are centrally visible).

2.14. Searching Externally Archived Data

FIG. 11 shows a block diagram of an example of a data intake and query system 108 that provides transparent search facilities for data systems that are external to the data intake and query system. Such facilities are available in the HUNK® system provided by Splunk Inc. of San Francisco, California. HUNK® represents an analytics platform that enables business and IT teams to rapidly explore, analyze, and visualize data in Hadoop and NoSQL data stores.

The search head 210 of the data intake and query system receives search requests from one or more client devices 1104 over network connections 1120. As discussed above, the data intake and query system 108 may reside in an enterprise location, in the cloud, etc. FIG. 11 illustrates that multiple client devices 1104a, 1104b, . . . , 1104n may communicate with the data intake and query system 108. The client devices 1104 may communicate with the data intake and query system using a variety of connections. For example, one client device in FIG. 11 is illustrated as communicating over an Internet (Web) protocol, another client device is illustrated as communicating via a command line interface, and another client device is illustrated as communicating via a system developer kit (SDK).

The search head 210 analyzes the received search request to identify request parameters. If a search request received from one of the client devices 1104 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores can comprise one or more storage devices and typically reside on the same system, though they may be connected via a local network connection.

If the request parameters of the received search request reference an external data collection, which is not accessible to the indexers 206 or under the management of the data intake and query system, then the search head 210 can access the external data collection through an External Result Provider (ERP) process 1110. An external data collection may be referred to as a "virtual index" (plural, "virtual indices"). An ERP process provides an interface through which the search head 210 may access virtual indices.

Thus, a search reference to an index of the system relates to a locally stored and managed data collection. In contrast, a search reference to a virtual index relates to an externally stored and managed data collection, which the search head may access through one or more ERP processes 1110, 1112. FIG. 11 shows two ERP processes 1110, 1112 that connect to respective remote (external) virtual indices, which are indicated as a Hadoop or another system 1114 (e.g., Amazon S3, Amazon EMR, other Hadoop Compatible File Systems (HCFS), etc.) and a relational database management system (RDBMS) 1116. Other virtual indices may include other file organizations and protocols, such as Structured Query Language (SQL) and the like. The ellipses between the ERP processes 1110, 1112 indicate optional additional ERP processes of the data intake and query system 108. An ERP process may be a computer process that is initiated or spawned by the search head 210 and is executed by the search data intake and query system 108. Alternatively or additionally, an ERP process may be a process spawned by the search head 210 on the same or different host system as the search head 210 resides.

The search head 210 may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to an SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 1110, 1112 receive a search request from the search head 210. The search head may optimize the received search request for execution at the respective external virtual index. Alternatively, the ERP process may receive a search request as a result of analysis performed by the search head or by a different system process. The ERP processes 1110, 1112 can communicate with the search head 210 via conventional input/output routines (e.g., standard in/standard out, etc.). In this way, the ERP process receives the search request from a client device such that the search request may be efficiently executed at the corresponding external virtual index.

The ERP processes 1110, 1112 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 1110, 1112 generate appropriate search requests in the protocol and syntax of the respective virtual indices 1114, 1116, each of which corresponds to the search request received by the search head 210. Upon receiving search results from their corresponding virtual indices, the respective ERP process passes the result to the search head 210, which may return or display the results or a processed set of results based on the returned results to the respective client device.

Client devices 1104 may communicate with the data intake and query system 108 through a network interface 1120, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "EXTERNAL RESULT PROVIDED PROCESS FOR RETRIEVING DATA STORED USING A DIFFERENT CONFIGURATION OR PROTOCOL", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PRO-CESSING A SYSTEM SEARCH REQUEST ACROSS DISPARATE DATA COLLECTION SYSTEMS", filed on 1 May 2014, and U.S. patent application Ser. No. 14/449,144, entitled "PROCESSING A SYSTEM SEARCH REQUEST INCLUDING EXTERNAL DATA SOURCES", filed on 31 Jul. 2014, each of which is hereby incorporated by reference in its entirety for all purposes.

2.14.1. ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results there-after, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such mul-tiple modes provides greater performance flexibility with regard to report time, search latency, and resource utiliza-tion.

In a mixed mode operation, both streaming mode and reporting mode are operating simultaneously. The streaming mode results (e.g., the raw data obtained from the external data source) are provided to the search head, which can then process the results data (e.g., break the raw data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the raw or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing por-tions of raw data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically the search head switches from using results from the ERP's streaming mode of operation to results from the ERP's reporting mode of operation when the higher bandwidth results from the reporting mode out-strip the amount of data processed by the search head in the]streaming mode of ERP operation.

A reporting mode may have a higher bandwidth because the ERP does not have to spend time transferring data to the search head for processing all the raw data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appre-ciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One examplary query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTER-PRISE is used as the search support system) to a search query request format that will be accepted by the corre-sponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concur-rently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return raw data to the search head. As noted, the ERP process could be configured to operate in streaming mode alone and return just the raw data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all raw data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

2.15. IT Service Monitoring

As previously mentioned, the SPLUNK® ENTERPRISE platform provides various schemas, dashboards and visualizations that make it easy for developers to create applications to provide additional capabilities. One such application is SPLUNK® IT SERVICE INTELLIGENCE™, which performs monitoring and alerting operations. It also includes analytics to help an analyst diagnose the root cause of performance problems based on large volumes of data stored by the SPLUNK® ENTERPRISE system as correlated to the various services an IT organization provides (a service-centric view). This differs significantly from conventional IT monitoring systems that lack the infrastructure to effectively store and analyze large volumes of service-related event data. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, a SPLUNK® IT SERVICE INTELLIGENCE™ system stores large volumes of minimally-processed service-related data at ingestion time for later retrieval and analysis at search time, to perform regular monitoring, or to investigate a service issue. To facilitate this data retrieval process, SPLUNK® IT SERVICE INTELLIGENCE™ enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the event data that pertains to the entity, whether produced by the entity itself or by another machine, and considering the many various ways the entity may be identified in raw machine data (such as by a URL, an IP address, or machine name). The service and entity definitions can organize event data around a service so that all of the event data pertaining to that service can be easily identified. This capability provides a foundation for the implementation of Key Performance Indicators.

One or more Key Performance Indicators (KPI's) are defined for a service within the SPLUNK® IT SERVICE INTELLIGENCE™ application. Each KPI measures an aspect of service performance at a point in time or over a period of time (aspect KPI's). Each KPI is defined by a search query that derives a KPI value from the machine data of events associated with the entities that provide the service. Information in the entity definitions may be used to identify the appropriate events at the time a KPI is defined or whenever a KPI value is being determined. The KPI values derived over time may be stored to build a valuable repository of current and historical performance information for the service, and the repository, itself, may be subject to search query processing. Aggregate KPIs may be defined to provide a measure of service performance calculated from a set of service aspect KPI values; this aggregate may even be taken across defined timeframes and/or across multiple services. A particular service may have an aggregate KPI derived from substantially all of the aspect KPI's of the service to indicate an overall health score for the service.

SPLUNK® IT SERVICE INTELLIGENCE™ facilitates the production of meaningful aggregate KPI's through a system of KPI thresholds and state values. Different KPI definitions may produce values in different ranges, and so the same value may mean something very different from one KPI definition to another. To address this, SPLUNK® IT SERVICE INTELLIGENCE™ implements a translation of individual KPI values to a common domain of "state" values. For example, a KPI range of values may be 1-100, or 50-275, while values in the state domain may be 'critical,' 'warning,' 'normal,' and 'informational'. Thresholds associated with a particular KPI definition determine ranges of values for that KPI that correspond to the various state values. In one case, KPI values 95-100 may be set to correspond to 'critical' in the state domain. KPI values from disparate KPI's can be processed uniformly once they are translated into the common state values using the thresholds. For example, "normal 80% of the time" can be applied across various KPI's. To provide meaningful aggregate KPI's, a weighting value can be assigned to each KPI so that its influence on the calculated aggregate KPI value is increased or decreased relative to the other KPI's.

One service in an IT environment often impacts, or is impacted by, another service. SPLUNK® IT SERVICE INTELLIGENCE™ can reflect these dependencies. For example, a dependency relationship between a corporate e-mail service and a centralized authentication service can be reflected by recording an association between their respective service definitions. The recorded associations establish a service dependency topology that informs the data or selection options presented in a GUI, for example. (The service dependency topology is like a "map" showing how services are connected based on their dependencies.) The service topology may itself be depicted in a GUI and may be interactive to allow navigation among related services.

Entity definitions in SPLUNK® IT SERVICE INTELLIGENCE™ can include informational fields that can serve as metadata, implied data fields, or attributed data fields for the events identified by other aspects of the entity definition. Entity definitions in SPLUNK® IT SERVICE INTELLIGENCE™ can also be created and updated by an import of tabular data (as represented in a CSV, another delimited file, or a search query result set). The import may be GUI-mediated or processed using import parameters from a GUI-based import definition process. Entity definitions in SPLUNK® IT SERVICE INTELLIGENCE™ can also be associated with a service by means of a service definition rule. Processing the rule results in the matching entity definitions being associated with the service definition. The rule can be processed at creation time, and thereafter on a scheduled or on-demand basis. This allows dynamic, rule-based updates to the service definition.

During operation, SPLUNK® IT SERVICE INTELLIGENCE™ can recognize so-called "notable events" that may indicate a service performance problem or other situation of interest. These notable events can be recognized by a "correlation search" specifying trigger criteria for a notable event: every time KPI values satisfy the criteria, the application indicates a notable event. A severity level for the notable event may also be specified. Furthermore, when trigger criteria are satisfied, the correlation search may additionally or alternatively cause a service ticket to be created in an IT service management (ITSM) system, such as a systems available from ServiceNow, Inc., of Santa Clara, California.

SPLUNK® IT SERVICE INTELLIGENCE™ provides various visualizations built on its service-centric organization of event data and the KPI values generated and collected. Visualizations can be particularly useful for monitoring or investigating service performance. SPLUNK® IT SERVICE INTELLIGENCE™ provides a service monitoring interface suitable as the home page for ongoing IT service monitoring. The interface is appropriate for settings such as desktop use or for a wall-mounted display in a network operations center (NOC). The interface may prominently display a services health section with tiles for the aggregate KPI's indicating overall health for defined services and a general KPI section with tiles for KPI's related to individual service aspects. These tiles may display KPI information in a variety of ways, such as by being colored and ordered according to factors like the KPI state value. They also can be interactive and navigate to visualizations of more detailed KPI information.

SPLUNK® IT SERVICE INTELLIGENCE™ provides a service-monitoring dashboard visualization based on a user-defined template. The template can include user-selectable widgets of varying types and styles to display KPI information. The content and the appearance of widgets can respond dynamically to changing KPI information. The KPI widgets can appear in conjunction with a background image, user drawing objects, or other visual elements, that depict the IT operations environment, for example. The KPI widgets or other GUI elements can be interactive so as to provide navigation to visualizations of more detailed KPI information.

SPLUNK® IT SERVICE INTELLIGENCE™ provides a visualization showing detailed time-series information for multiple KPI's in parallel graph lanes. The length of each lane can correspond to a uniform time range, while the width of each lane may be automatically adjusted to fit the displayed KPI data. Data within each lane may be displayed in a user selectable style, such as a line, area, or bar chart. During operation a user may select a position in the time range of the graph lanes to activate lane inspection at that point in time. Lane inspection may display an indicator for the selected time across the graph lanes and display the KPI value associated with that point in time for each of the graph lanes. The visualization may also provide navigation to an interface for defining a correlation search, using information from the visualization to pre-populate the definition.

SPLUNK® IT SERVICE INTELLIGENCE™ provides a visualization for incident review showing detailed information for notable events. The incident review visualization may also show summary information for the notable events over a time frame, such as an indication of the number of notable events at each of a number of severity levels. The severity level display may be presented as a rainbow chart with the warmest color associated with the highest severity classification. The incident review visualization may also show summary information for the notable events over a time frame, such as the number of notable events occurring within segments of the time frame. The incident review visualization may display a list of notable events within the time frame ordered by any number of factors, such as time or severity. The selection of a particular notable event from the list may display detailed information about that notable event, including an identification of the correlation search that generated the notable event.

SPLUNK® IT SERVICE INTELLIGENCE™ provides pre-specified schemas for extracting relevant values from the different types of service-related event data. It also enables a user to define such schemas.

3.0 Additional Example Search Screen

FIG. 18A illustrates example search screen 1800 in accordance with some implementations of the present disclosure. Search screen 1800 may be utilized as part of a search interface to display one or more events returned as part of a search result set based on a search query. Display of an event may include display of one or more event attributes of the event, examples of which include extracted fields, metadata, event raw data, and/or other types of data items assigned to the event. Search screen 1800 may also be utilized as part of a search interface that allows a user to modify the search query. Some examples of options for modifying the search query include any combination of deleting commands from the search query, adding commands to the search query, reordering one or more commands in the search query, and modifying variables, parameters, arguments, and/or other properties of commands in the search query.

Search screen 1800 may also be utilized to update the search result set to correspond to the modified search query and to update the events that are displayed in search screen 1800 to correspond to the updated search result set. In some cases, based on a search query being modified, the search query could be completely re-executed to retrieve new search results and generate the updated search result set. In other cases, the search query may only be partially executed.

For example, in implementations where a pipelined search language, such as SPL, is employed for search queries, additional commands that are added to a search query may be applied to at least some previous search results. These and other variations are possible for updating the search result set to correspond to a search query.

By interacting with search screen 1800 to create and/or modify search queries, a user may utilize the search interface to filter, sort, clean, enrich, analyze, report on, and/or otherwise carryout functionality provided for by commands in search queries. Furthermore, as the user generates modified search queries, the search result set can be updated, with events displayed in search screen 1800 being updated to reflect the modifications. Utilizing this approach, a user may iteratively modify a search query and view the impact of the modification via updated search results. This approach can be employed to enable users to effectively and efficiently generate queries that return expected and desired results, even without extensive knowledge of the underlying commands and/or search language employed by the queries.

3.1 Example Table Format

In various implementations, one or more events can be displayed in a table format, such as table format 1802 in search screen 1800. The table format can be employed in various interfaces for interacting with displayed events in various ways and its use is not limited to search interfaces or search screens. Events can be used to populate the table format, and may be search results, such as in search screen 1800, but could more generally be any type of events. Furthermore while in search screen 1800, events are displayed via table format 1802, other formats are possible in various implementations contemplated herein.

Table format 1802 comprises one or more columns, such as columns 1804a, 1804b, 1804c, and 1804d and one or more rows, such as rows 1806a, 1806b, 1806c, 1806d, and 1806e. Table format 1802 can include additional rows and/or columns, not shown in FIG. 18A, which may optionally be viewed by scrolling search screen 1800, or by other suitable means. The scrolling may reveal additional events and/or additional event attributes on search screen 1800.

In the example shown, each row corresponds to an event. By way of example, search screen 1800 is shown as displaying events 1, 2, 3, 4, and 5, which are each search results of a search result set that can include any number of additional results that are not shown. A search results set may generally include any number of search results. Each column corresponds to an event attribute, such as an extracted field, metadata about events (e.g., a default field), or event raw data. Each event attribute is assigned a respective attribute label, which can be utilized to represent the corresponding attribute in the table format. For example, row 1806a corresponds to event 1 and column 1804a corresponds to an event attribute of event 1 having an attribute label of _time, comprising a timestamp data item. Other attribute labels shown in FIG. 18A include _raw, corresponding to event raw data, source and host corresponding to metadata, and bytes, clientip, method, and referer, corresponding to extracted fields.

The rows in table format 1802 form cells with the columns, and each cell comprises a data item of an event attribute of a corresponding column. For example, in search screen 1800, the event attribute having attribute label _time has a value of 2013-11-10T18:22:16.000-0800 for event 1, 2013-11-10T18:22:15.000-0800 for event 2, and so on. Data items of events are shown in FIG. 18A by a textual representation of their value. Although not the case in the table formats shown herein, it is possible that the underlying value could vary from the textual representation. As an example, numeric data items could be textually represented in rounded form. Furthermore, some of the data items could be represented by means other than a textual representation.

Data items in a column are assigned to an event attribute forming sets of attribute-data item pairs, with each data item corresponding to a respective event for that event attribute. Search screen 1800 shows data items of multiple events for each event attribute. The displayed event attributes correspond to the search result set, but other event attributes corresponding to the search result set could potentially be hidden from view or not included in a column.

In the present example, each row in table format 1802 corresponds to a respective event and each column corresponds to a respective event attribute of multiple events, with each cell comprising one or more data items of the respective event attribute of the respective event. In some cases, columns of the table format may be reordered in a displayed search interface based on a user interaction with the table format. For example, a user may select a column to move (e.g., using a mouse) and drag the selected column to a new position in the table format.

A search query corresponding to the search result set that is utilized to populate the cells of table format 1802 can have its constituent commands be at least partially represented in search screen 1800. One such approach is illustrated by command entry list 1808 in search screen 1800. Examples of command entry lists will later be described in additional detail, and for purposes of the present disclosure, can be employed with other types of interfaces, which do not necessarily include events displayed in a table format.

Command entry list 1808 corresponds to at least a partial representation of the commands of the search query and comprises one or more command entries. Each command entry is respectively representing one or more commands of the search query. Furthermore, the list of search command entries is displayed in a sequence corresponding to a sequence of the search commands within the search query. Another approach to at least partially representing search commands of the search query in search screen 1800 comprises utilizing a search bar, in addition to, or instead of a command entry list. The search bar can accept user input in the form of textual input to a search string that corresponds to the search query.

3.2 Examplary Interactions with a Table Format

In some implementations, a user can interact with one or more events of a set of events (e.g., a search result set) that are used to populate a table format by interacting with the table format. For example, a user can interact with table format 1802, which is populated with at least some data items from events that correspond to the search result set.

In some respects, a user can make a selection of one or more portions of the table format. Based on the selection, the system causes for display one or more options (e.g., a list of options) corresponding to the selected one or more portions. Based on a user selecting one of the displayed options, operations corresponding to the displayed option can be carried out by the system.

In implementations where the table format is part of a search system, the interactions can be made to create and/or modify search queries. In some approaches, a user makes a selection of one or more portions of the table format. Based on the selection, the search system causes for display one or more options (e.g., a list of options) corresponding to the selection. The search system can cause one or more commands to be added to a search query that corresponds to the set of events used to populate the table format, based on a user selecting one of the options from the list of options. The one or more commands that are added to the search query can be based on (e.g., generated based on) at least the option that is selected by the user, and potentially other factors, such as one or more data items and/or one or more event attributes in the selected one or more portions of the table format.

Examples of selectable portions of a table format include selectable rows, columns, cells, and text, which are described in additional detail below. Depending on the implementation employed, any combination of these table elements may or may not be selectable. As an example, in some implementations, one or more cells may be selectable without necessarily requiring other portions of the table format to be selectable (i.e., only cells could be selectable). The same is true for other types of table elements, such as columns, and text. Furthermore, in some cases portions of the table format are individually selectable (e.g., individual cells or individual columns could be selected). In addition, or instead, portions may be selectable in groups (e.g., multiple cells or multiple columns could be selected).

FIGS. 18B, 18C, 18D, 18E, and 18F (also referred to collectively as "FIGS. 18") represent search screen 1800 after respective portions of table format 1802 have been selected by a user. FIG. 18B illustrates where a selected portion is an individual cell (e.g., cell 1810), although in some implementations a user may select multiple cells. FIG. 18C illustrates where a selected portion is an individual column (e.g., column 1804*a*). FIG. 18D illustrates where multiple columns are selected (e.g., columns 1804*b* and 1804*c*). FIG. 18E illustrates where table format 1802 itself is selected. FIG. 18F illustrates where a portion of a textual representation (text) of one or more data items (e.g., portion 1814 (a text portion) of textual representation 1812) is selected. It is noted that, where multiple columns are selected by a user, the selected columns need not be adjacent to one another, as shown. Similarly, where multiple cells are selected in the table format, those selected cells need not be adjacent to one another.

Although many approaches exist for selection of portions of a table format, in some implementations, a selectable portion(s) may be highlighted or otherwise emphasized when a pointer that is displayed in the user interface moves over a particular region of the display (e.g., a region of the table format) that corresponds to the selectable portion(s). This feature is also referred to as highlight with rollover (e.g., detected when a pointer moves over a region). One or more highlighted selectable portions can then be selected in response to additional user input, such as a mouse click or touch input to select the selectable portions. A shift-click or other method could be utilized to select additional selectable portions.

By way of example, in search screen 1800, each cell is individually selectable and the region for each cell is substantially coextensive with the cell. For example, in FIG. 18B, region 1820*a* can be used to select cell 1810, which is shown as being emphasized and selected. Furthermore, each column is individually selectable and the region for each column is coextensive with the column's header, which comprises an attribute label of the event attribute of the column. For example, in FIG. 18C, region 1820*b* can be used to select column 1804*a*, which is shown as being emphasized and selected. In implementations where rows are selectable, the region for a row could similarly correspond to the row's header (displaying the event number in the present implementation).

Selection of a textual representation, or a portion thereof, could optionally be handled, at least partially using highlight with rollover. In search screen 1800, a portion of a textual representation may be selected by the user using a click, drag to highlight, and release, as one example. Any of the various characters in text of a textual representation may be highlighted and selected, and in some implementations, multiple textual representation portions could be selected from multiple cells.

3.3 Examplary Options

A variety of approaches are available for presenting options that are displayed based on and corresponding to the selection of one or more portions of the table format. In some implementations, options can be presented as a list of selectable options. Options may appear in sidebar 1830, or elsewhere. In FIGS. 18B, 18C, 18D, 18E, and 18F, options are displayed in option menus. Display locations of option menus can be based on the one or more portions of the table format that are selected by the user. For example, option menus can be configured to appear proximate to (e.g., over, or adjacent to) the one or more selected portions of the table format, as illustrated by option menus 1826*a*, 1826*b*, 1826*c*, 1826*d*, and 1826*e*.

FIG. 19 shows example option menu 1926 in accordance with implementations of the present disclosure. Option menu 1926 comprises options 1930*a*, 1930*b*, 1930*c*, and 1930*d*, and is utilized to describe examples of configurations for option menus, such as any of option menus 1826*a*, 1826*b*, 1826*c*, 1826*d*, and 1826*e*. In the present implementation, each option can correspond to one or more commands that may be included in a search query. However, in some cases, options need not correspond to one or more commands that may be included in a search query. Instead, the option may be operable to interact with the system in some other manner. Where, an option corresponds to a command, the command may be provided to a search query utilizing a format that includes a command identifier that identifies the command and one or more command elements of the command, at least some of which may be optional (e.g., arguments, parameters, values, command options, and the like). In particular, each command could correspond to a pipelined search language command, such as an SPL command, or another type of command compatible with processing of the search query.

In various implementations, option menu 1926 is a contextual menu. In this regard, one or more of the options in option menu 1926 can be included based on context related to the selection that prompted option menu 1926. For example, option 1930*a* may be included in option menu 1926 in some contexts, but not in others. This may be desirable in that it may be more intuitive for some options to be invoked in some selection contexts, but not in others. Furthermore, one or more options in option menu 1926 may be a contextual option. In this regard, one or more commend elements for any commands corresponding to an option may be incorporated into the commands based on selection context. Furthermore, at least some of the label of the option in option menu 1926 can be based on selection context.

In some respects, context can be based, at least partially on the type or types of table elements of the table format selected by the user. In various implementations, the presented option menu may include different options depending on whether the selected portion of the table format is a column, a cell, a portion of a textual representation of a data item, or the table itself. For example, option 1930c may be included in option menu 1826b for a selection of column 1804a, but not in option menu 1826a for a selection of cell 1810. This may be desirable in that it may be more intuitive for some options to be invoked through selecting a column as opposed to a cell, or vice versa. As an example, the option may correspond to a command that operates on cells of a column, or the column itself, and therefore might be more intuitive when included as an option for a selected column. As such, the option might be contextually included based on selection of a column, but not based on selection of a cell.

Context can further be based on a number of selected portions of the table format, or a number of selected portions of the table format of one or more particular types of table elements. For example, option 1930d may be included in option menu 1826c of FIG. 18D for a selection of multiple columns 1804b and 1804c, but not in option menu 1826b of FIG. 18C for a selection of only column 1804a. In this way options included in option menu 1826c may be different than the options included in option menu 1826b based on the selected portion comprising two columns in of FIG. 18D, but only one column in FIG. 18C (e.g., based on the number being greater than one column, or based on the number being equal to a designated number of columns). As another possibility, where selection portions of a table format comprise a first selected cell and a second selected cell, an option may be caused to be included in option menu 1926 based on a determination that the first and second cells are in different columns in the table format.

Context can also be based on the event attribute(s) corresponding to the selected portion(s) of the table format. For example, one or more options may be included in option menu 1926 based on the user selecting a column, cell, or textual representation corresponding to event raw data (e.g., _raw), or based on the user selecting a table portion corresponding to event timestamps (e.g., time).

Thus, for example, an option may be included in option menu 1926 based on a determination that at least one of one or more data items of at least one selected one or more cells comprises event raw data, and/or that at least one of selected one or more columns represent event raw data of a set of events. Furthermore, an option may be included in option menu 1926 based on a determination that at least one of one or more data items of at least one selected one or more cells comprises a timestamp of event raw data, and/or that at least one of selected one or more columns represent data items comprising timestamps of a set of events.

Furthermore, context can be based on one or more data types assigned to the selected portion(s) of the table format. Examples of data types include numeric data types, categorical data types, and user defined data types. A numeric data type may correspond to numbers and a categorical data type may correspond to a combination of numbers, letters, and/or other characters. A cell may be identified as comprising a numeric data type or a categorical data type by the system analyzing the data item represented in the cell. A column may be identified as comprising a numeric data type or a categorical data type by the system analyzing at least some of the data items represented in the column (e.g., in cells). Such determinations may be made based on the selection of the table format and prior to selecting an option, or could be performed prior to the selection of the table format. Furthermore, in some cases, the data type could be selected by a user.

Thus, for example, an option may be included in option menu 1926 based on a determination by the system that at least one of one or more data items of at least one of selected one or more cells is of a numeric data type (e.g., based on the overall data type of the cell's corresponding column, or based on the cell's particular data type), and/or that at least one of selected one or more columns represent data items of a numeric data type. Similarly, an option may be included in option menu 1926 based on a determination that at least one of one or more data items of at least one selected one or more cells is of a categorical data type, and/or that at least one of selected one or more of the columns represent data items of a categorical data type. As an example, where each selected column has a numeric data type, an option may be presented that corresponds to one or more commands that apply at least one statistical functions to the data items of the columns, and/or generate a graph where each axis represents a respective one of the columns. As a further example, the one or more commands be operable to remove one or more non-numeric cells from selected one or more cells and/or selected one or more columns, where at least one non-numeric cell is detected in a selection.

As a further example, context can be based on a source of data items in the selected portion(s) of the table format. For example, one or more options may be included in or excluded from option menu 1926 based on a determination by the system that at least one of one or more data items of at least one of selected one or more cells comprises a statistical value generated by one or more statistical functions performed on values of data items of at least some events and/or that at least one of selected one or more columns represents data items comprising statistical values generated by one or more statistical functions performed on values of data items of at least some events. As an example, the system may refrain from offering one or more options related to extracting new data items from data items that comprise statistical values. A statistical value may refer to a value generated from an event using one or more statistical functions (e.g., average, sum, mean, median, mode, standard deviation, variance, count, range), such that the value no longer corresponds directly to event raw data. In some cases, a value may be determined as a statistical value based on identifying the value as an output of a statistical command in a search query. For example, statistical commands may be commands known to produce one or more statistical values an output.

As another example, one or more options may be included in or excluded from option menu 1926 based on a determination by the system that at least one of one or more selected one or more cells is an empty cell, and/or that at least one of selected one or more columns comprises one or more empty cells. As an example, the system may offer one or more options related to one or more commands that are operable to remove or otherwise perform some operation on empty cells based on a determination that a selection comprises at least one empty cell. Furthermore, one or more options displayed for selections comprising empty cells may exclude one or more options otherwise displayed where the selection does not comprise empty cells.

In further cases, one or more options may be included in or excluded from option menu 1926 based on a determination by the system that at least one of one or more data items of at least one of selected one or more cells comprises multiple values, and/or that at least one of selected one or more columns represents one or more cells comprising multiple values. A data item that comprises multiple values may comprise an array, matrix, or other representation of multiple values for a single event attribute of a single event. Each value could be displayed in the same cell and may be displayed in a manner that indicates the values as being different values for the same event and event attribute. As an example, where a user selects a portion of a textual representation of a data item in a cell, the system may offer or refrain from offering one or more options corresponding to one or more commands, based on whether the data item comprises multiple values.

In option menu 1926, options 1930a and 1930b are examples of form-based options, which include at least one form element that can be modified by a user. A form-based option may have at least some defaults entered into the form. Examples of form elements that may be included in a form-based option include one or more of a text box, dropdown list, radio button, checkbox, and the like. Where an option corresponds to one or more commands, a form element could be employed for selecting and/or entering one or more command elements for a command and/or a command identifier (so as to select from the one or more commands). Optionally default command elements and/or command identifiers may be automatically entered into the form prior to or after selection of the option. An example of a form element is a dropdown list that comprises a list of possibilities for command elements and/or command identifiers. As another example, a text box could be used to enter one or more command elements of a command. The text box could comprise placeholder text that is descriptive of a command element corresponding to the text box.

A form-based option may be selected by a user using a corresponding apply button, or other suitable means. For example, option 1930a could be selected by clicking on apply button 1932 after providing input to configure the form, or optionally without configuration where the form comprises one or more default values. An option, such as option 1930c, could be a nested form-based option, where option menu 1926 comprises a link that can be selected by the user to open a form of the nested form-based option. The form may open within or outside of option menu 1926 (e.g., replace the link with the form, expand the link to display the form, or appear outside of the option menu). The form could similarly include an apply button to select the option. Option 1930d is an example of an option that does not include a form. As an example, option 1930d may be selected upon mouse up or mouse down. The option could include one or more default command elements. In addition, or instead one or more of the command elements could be contextually generated, for example, based on the user selection.

As described above, the system can cause one or more commands to be added to a search query that corresponds to a group of events used to populate the table format, based on a user selecting one of the options from the list of options. For example, upon a user selecting an option, the one or more commands could be automatically added to the search query. Where the search query employs a pipelined search language, the one or more commands can be added sequentially to the end of the search query. In implementations where the search query is displayed to the user, for example, in a search bar, the one or more commands may be added to the search bar. In implementations where the search query is represented by a command entry list (e.g., command entry list 1808), the command entry list may be updated to represent the one or more commands as one or more command entries.

The one or more commands that are added to the search query may be in proper syntax for the search query, complete with command identifiers and any command elements that are needed or desired for execution of the commands. In some cases, one or more added command elements for a command are default command elements associated with a selected option. Furthermore, one or more added command elements for a command could be provided by the form of a form-based option. As another option, the command elements could be contextually generated based on the portion(s) of the table format selected by the user.

The one or more commands corresponding to an option can be contextually based on an event attribute that corresponds to a selected portion of the table format. For example, the event attribute can be used to generate at least a portion of one or more of the commands for the option. As an example, the event attribute, and/or one or more data items assigned to the event attribute can be incorporated into at least one command element of one or more commands that correspond to the option, or used to generate at least one value for the at least one command element. A reference to an event attribute (e.g., an attribute label of the event attribute) or a data item (a value thereof), or data generated therefrom, could be included in a form element of an option as a default command element for a command. In addition, or instead, one or more references (or values, or data generated therefrom) could be included as text in a command string added to the search query and used to invoke a command. The command string can include a command identifier along with the reference(s), value(s), or data generated therefrom, used for a command element. As one example, a command element that is based on the event attribute may be a command element that instructs the command as to which event attribute and/or data item or items assigned to an event attribute to operate on, for example, within events input into the command.

Thus, where a user selects a column, one or more commands for an option may be based on (e.g., generated using) any event attributes corresponding to the column. For example, at least one command element may be generated from the event attribute(s) and/or one or more data items that are assigned to the event attribute(s), or values thereof. As an example, the user could select column 1804a, as in FIG. 18C. A command element for a command corresponding to an option in option menu 1826b could instruct the command to operate on data items of an event attribute having the attribute label _time, based on column 1804a comprising the event attribute, or could provide data generated from one or more of the data items as input to the command. Similarly, a user could select both columns 1804b and 1804c, as in FIG. 18D. A command element of a command corresponding to an option in option menu 1826c could instruct the command to operate on at least some data items of the event attributes having the attribute labels of source and host, based on columns 1804b and 1804c respectively comprising those event attributes, or could provide data generated from one or more of the data items as input to the command.

For a cell, the user could select cell 1810, as in FIG. 18B, and a command element of a command corresponding to an option in option menu 1826a could be generated to instruct the command to operate on the data item assigned to the event attribute having the attribute label referer, to use the value of that data item as an input to the command, or to generate data from the value of the data item as an input to the command, each based on cell 1810 corresponding to a data item assigned to the event attribute.

For text, the user could select portion 1814 of textual representation 1812, as in FIG. 18F, and a command element of a command corresponding to an option in option menu 1826e could be generated to instruct the command to operate on at least the portion of the text in the data item assigned to the event attribute having the attribute label "_raw," to use at least the portion as an input to the command, or to generate data based on the portion as an input to the command (e.g., a keyword that includes the portion), all based on portion 1814 being in a data item assigned to the event attribute.

As discussed above, based on the selection of one or more displayed options, operations corresponding to a displayed option that is selected by the user can then be carried out by the system. As one example, when an option is selected (e.g., in option menu 1926), the operations may be automatically performed. Furthermore, the screen can be updated based on any changes corresponding to the selected options. For example, in search screen 1800, when a user selects an option, the set of events utilized to populate table format 1802 (e.g., a search results set) may be automatically updated by the operations associated with the option. As an example, one or more portions of a search query could be executed, as needed to accurately portray events corresponding to the search query in the table format. Furthermore, the displayed table format 1802 may be automatically updated to reflect changes to the set of events. More particularly, where one or more commands are added to a search query, or the search query is otherwise modified by an option, table format 1802 can be automatically updated to correspond to the modified search query. This could result in more or fewer events being included in the table format, and/or more or fewer event attributes being included in the table format, depending on the commands.

Thus, for example, a user may directly interact with the table format to manipulate a corresponding search query and automatically see the results of the manipulations reflected in the table format. In doing so, the user need not necessarily directly code the search query, which can require extensive knowledge of the underlying search query language. Instead, complicated aspects of coding the search query can be embedded in the options, and results of the options (and any underlying commands) can quickly be portrayed to the user. For example, the user could select an option to remove a column comprising an event attribute, and a command assigned to the option that operates to remove the event attribute from inputted events can automatically be added to the search query. At least the added command could automatically be executed, and the displayed table format could be updated to no longer include the column, as the event attribute would be excluded from search results.

It should be noted that execution of a search query (or one or more portions thereof), as described herein can comprise an automatic reformulation of the search query (or one or more portions thereof), so as to more efficiently achieve equivalent search results as the search query.

Below, various potential options are described with respect to user selections of a table format. Although options may be described as corresponding to a single command, similar functionality may be achieved utilized multiple commands. It is further noted that an omission of a particular option type from a particular option menu is not intended to limit the option from potentially being included from the option menu. As an example, although extraction type options are only shown in option menu 1826*e* of FIG. 18F, similar options are contemplated as being included for extracting new fields for option menus 1826*a*, 1826*b*, 1826*c*, and 1826*d*.

In FIG. 18B, option menu 1826*a* is shown as including two options. The first option corresponds to a command that is operable to filter out each event input into the command that does not include the value "http://www.buttercupgames-.com/product.screen?productid=5F-BV5-GO1" for a data item of an event attribute labeled "referer." The value and attribute may be provided to the command from the value and event attribute associated with the user selection. The second option is similar to the first option, but filters out each event input into the command that does include the specified value.

In FIG. 18C, option menu 1826*b* is shown as including sixteen options, with a filter text box at the top. The filter text box can be used to filter out events input into a command that do not include any keywords entered into the text box by a user. Those keywords may be incorporated into the command. The first option may be similar to the first option in option menu 1826*a*, where the value may be entered by the user.

The second option is associated with a command that is operable to remove events input into the command that contain an identical combination of values for an event attribute. The event attribute may be provided to the command as the event attribute associated with the selected column.

The third option may correspond to a command that is operable to sort the events input into the command in ascending order of values for an event attribute, where the event attribute may be provided to the command as the event attribute associated with the selected column.

The fourth option is similar to the third option, but sorts the events in descending order of the values.

The fifth option corresponds to a command that is operable to change the attribute label of an event attribute for an associated column. The event attribute may be provided to the command as the event attribute associated with the selected column. Furthermore, the new attribute label for the command may be entered into the text box by a user.

The sixth option corresponds to a command that is operable to remove an event attribute from events input into the command. The event attribute may be provided to the command as the event attribute associated with the selected column.

The seventh option corresponds to a command that is operable to remove events input into the command that have an empty cell, or no value, for a given event attribute of events. The event attribute may be provided to the command as the event attribute associated with the selected column.

The eight option corresponds to a command that is operable to apply a lookup table to changes values for a given event attribute of events. The event attribute may be provided to the command as the event attribute associated with the selected column.

The ninth option corresponds to a command that is operable to extract all fields discovered within data items for a given event attribute of events. Such an option is later described in additional detail. The event attribute may be provided to the command as the event attribute associated with the selected column.

The tenth option corresponds to a command that is operable to split a given event attribute for events input to the command into one or more other event attributes (e.g., resulting in additional columns). The event attribute may be provided to the command as the event attribute associated with the selected column.

The eleventh option corresponds to a command that is operable to evaluate an expression for each value of a given event attribute for events input into the command and assign the resulting value to an event attribute for the event that had its value evaluated. The event attribute may be provided to the command as the event attribute associated with the selected column. Furthermore, a user may use the first text box to specify an attribute label for the resulting value and use the second text box to specify the evaluation expression, which are used as command elements in the command. If an event attribute already exists that has the attribute label entered by the user, that event attribute may optionally be overwritten with the resulting values.

The twelfth option corresponds to a command that is operable to find transactions based on events input to the command that meet various constraints. Events may be grouped into transactions based on the values of a given event attribute. The event attribute may be provided to the command as the event attribute associated with the selected column. Furthermore, a user may use the first text box to specify a max pause value for the command and use the second text box to specify a max span value for the command. The maxspan constraint requires the transaction's events to span less than maxspan. The maxpause constraint requires there be no pause between a transaction's events of greater than maxpause.

The thirteenth option corresponds to a command that is operable to display the most common values for a given event attribute in a set of events input to the command. The event attribute may be provided to the command as the event attribute associated with the selected column.

The fourteenth option corresponds to a command that is similar to the command of the thirteenth option, but groups the top values by the event attribute having the attribute label "_time."

The fifteenth option corresponds to a command that is operable to display the least common values for a given event attribute in a set of events input to the command. The event attribute may be provided to the command as the event attribute associated with the selected column.

The sixteenth option corresponds to a command that is operable to provide statistics on values for a given event attribute in a set of events input to the command grouped by the event attribute having the attribute label "host." The given event attribute may be provided to the command as the event attribute associated with the selected column.

In FIG. 18D, option menu 1826c is shown as including five options. The first option corresponds to a statistical command that is operable to perform a summation of values of events input to the command for a first event attribute grouped by a second event attribute. The first and second event attributes may be provided to the command as the event attributes associated with the selected columns. Such a command might only be included in option menu 1826c where at least one of the selected columns is of a numerical data type (e.g., where one is of a numerical data type and another is of a categorical data type). Furthermore, the event attribute associated with a selected column having a numerical data type may be used as the first event attribute and the event attribute associated with a selected column having a categorical data type may be used as the second event attribute.

The second option corresponds to a command that is similar to the command of the first option, but is operable to perform an average rather than a summation.

The third option corresponds to a command that is operable to correlate values between event attributes of events input to the command to show the co-occurrence between the values. The command may build a contingency table, comprising a co-occurrence matrix for the values of the event attributes. The event attributes may be provided to the command as the event attributes associated with selected columns.

The fourth option corresponds to a command that is operable to correlate event attributes of events input to the command to show the co-occurrence between the event attributes. The event attributes may be provided to the command as the event attributes associated with selected columns.

The fifth option corresponds to a command that is operable to filter out all event attributes from events input to the command except for given event attributes. The given event attributes may be provided to the command as the event attributes associated with selected columns.

In FIG. 18E, option menu 1826d is shown as including five options. The first option corresponds to a command that is operable to count the number of events input into the command.

The second option corresponds to a command that is operable to count the number of events input into the command by the event attribute having the attribute label "_time."

The third option corresponds to a command that is operable to transpose events input to the command and event attributes of the commands, such that each row may become a column.

The fourth option corresponds to a command that is operable to return the first N events input to the command where N is a positive integer (e.g., 10).

The fifth option corresponds to a command that is operable to return the last N events input to the command where N is a positive integer (e.g., 10).

In FIG. 18F, option menu 1826e is shown as including six options. The first option corresponds to a command that is operable to filter out events input to the command that do not include a given keyword or phrase for a given event attribute. The given event keyword or phrase may be provided to the command as identified from at least a selection portion of the textual representation of a data item, and the given event attribute can be provided by the event attribute associated with the data item.

The second option corresponds to a command that is similar to the first option, but removes events that do not include the given keyword or phrase for the given event attribute.

The third option corresponds to a command that is similar to the first option, but removes events that do not start with the given keyword or phrase for the given event attribute.

The fourth option corresponds to a command that is similar to the first option, but removes events that do not end with the given keyword or phrase for the given event attribute.

The fifth option is operable to initiate a field extraction workflow for extracting one or more new fields.

The sixth option corresponds to a command that is operable to extract a new field having a given field label from a given event attribute for event input to the command. The given field label may be generated from the selected portion of the textual representation of a data item, and the given event attribute can be provided by the event attribute associated with the data item. Such an extraction may be a suggested field extraction, later described in additional detail below.

3.4 Command Entry List

In some respects, the present disclosure relates to a command entry list, an example of which was briefly discussed with respect to command entry list 1808. Command entry list 1808 corresponds to an example of an implementation of a command entry list in a search screen of a search system. However, concepts related to a command entry list are not intended to be specifically tied to such implementations. To this effect, command entry lists are discussed in additional detail below with respect to FIG. 20 and command entry lists 2008*a* and 2008*b*.

Command entry lists 2008*a* and 2008*b* each represent potential implementations of command entry lists, in accordance with concepts disclosed herein. Command entry lists 2008*a* and 2008*b* each comprise a list of command entries, which can be displayed in a search interface (such as is command entry list 1808), or other interface. As shown, command entry lists 2008*a* and 2008*b* each comprise command entries 2040*a*, 2040*b*, 2040*c*, and 2040*d*. Although the command entries are listed in a vertical column (with one command entry per row), other list formats could be employed.

Each command entry in a command entry list may represent one or more commands of a plurality of commands of a search query. By way of example, FIG. 20 shows search query 2044 which may corresponds to each of command entry lists 2008*a* and 2008*b*. Command entry 2040*a* corresponds to commands 2044*a*, command entry 2040*b* corresponds to command 2044*b*, command entry 2040*c* corresponds to command 2044*c*, and command entry 2040*d* corresponds to command 2044*d*, by way of example.

As shown, the list of command entries of command entry lists 2008*a* and 2008*b* are displayed in a sequence corresponding to the plurality of commands of the search query. In particular, the command entries are displayed in the list in the same sequence as their corresponding commands appear in the search query. As the search query utilizes a pipelined search language in the present examples, each command entry that corresponds to a command may be considered a data processing pipe and the sequencing can portray to the user the relationship between commands in terms of inputs and outputs for the data processing pipes. It is noted that, the display in the sequence could be visually conveyed using a variety of possible approaches, such as by depicting a combination of alphanumeric characters proximate to each command entry, and/or the by the positioning of the command entries on screen. Furthermore, in some implementations, the list of command entries of a command entry list need not be displayed in a sequence corresponding to a plurality of commands of a search query in every implementation of the present disclosure.

Command entries 2040*b*, 2040*c*, and 2040*d* each display a representation of their respective underlying commands. In the approach depicted in command entry list 2008*a*, each command is listed as the command would appear in search query 2044. Pipes (e.g., "I") or command separators, are omitted from display, and may be implied from the depiction of the command entries. However, in some implementations, command separators might be depicted, or a subset of command separators might be depicted, for example, within a command entry that corresponds to multiple commands. In the approach depicted in command entry list 2008*b*, various portions of commands are formatted in different manners, to improve legibility for users. For example, command identifiers are followed by colons and are aligned to the colons, and might be bolded. Command element parameters are formatted in a distinguishable manner using a different color of text than other portions, and command modifiers are distinguishable as unformatted text. Command variables are depicted in text boxes.

In some respects, through interaction with a command entry list, a user can modify the search query. For example, one to all of the command entries can correspond to a respective form for modifying its respective underlying commands in the search query. In the approach depicted in command entry list 2008*a*, text of any portion of a command may be modified. For example, each command entry comprises a text box that includes the command. A user may modify the command by modifying the text in the text box. The corresponding command in search query 2044 can be updated accordingly to correspond to the modified command. Thus, a user could change "limit=10" in command entry 2040*d* to "limit=20," and command 2044*d* may be modified to reflect the changes made using command entry 2040*d*. Such changes may be reflected automatically, or may first require the user to apply the changes.

In the approach depicted in in command entry list 2008*b*, portions of the commands are represented by a respective form element. Users may optionally be restricted from modifying at least some portions of the commands in the command entries, such as command identifiers. Furthermore, some portions of the commands may have respective dropdown lists, or option menus, associated therewith that can be used to select fields, aggregation methods, or other command parameters to be used as the portion of the command. The options presented for a given portion of a command may be included based on the type of command element suitable for the position of the given portion in the command. As shown, count, referrer, host, and remove all have corresponding option menus, indicated as rounded rectangular boxes (e.g., 2041 in FIG. 20).

In some cases, a user interaction with the command entry list may break a dependency of a command element(s) of one or more command entries. For example, a user could change "field—_raw" in command entry 2040*b* to "field—host" and command 2044*b* may be modified to reflect the change made to command entry 2040*b*. In the present example, "_raw" and "host" are used as command elements that instruct the command having command identifier "field" as to which event attribute to operate on. When executed, data items of the event attribute may be removed from events input into the command. Thus, due to the modification "_raw" data items may no longer be removed, but "host" data items may be removed instead. However, as shown, command entry 2040*c* has a command element instructing the command to operate on an event attribute referenced by "host." In some implementations, in response to the user adding "host" to command entry 2040*b*, the system may optionally detect that the modification to command entry 2040*b* breaks a dependency of the command element (e.g., event attribute) referenced in command entry 2040*c* and automatically throw that command entry into an error state. In the error state, the commands associated with the command entry may be excluded from execution in the search query and a visual indication may be displayed to the user that the command entry is in the error state.

Although some modifications may throw one or more command entries into an error state, in some cases, a broken dependency caused by a user interaction may be automatically identified and corrected in the search query. For example, assume that a first command entry represents a command in a search query that is executable to extract a new field from an event attribute and names that field "referer." The command may include a command element "referer," which instructs the command to label the new field "referer." Also assume that a second command entry represents a subsequent command in the search query that is executable to operate on a field labeled "referer." In accordance with implementations of the present disclosure, the system may automatically detect a dependency between the commands of the command entries when a user renames "referer" through interaction with the first command entry. Based on detecting the dependency, the system may automatically rename the command element (e.g., event attribute) in the command(s) represented by the second command entry (and potentially any other dependent commands in the search query) to correspond to or match the renamed command element represented by the first command entry. Thus, where a user interaction comprises a user renaming a command element in one or more commands using a form element in a designated command entry that represents the command element, and one or more other command elements in one or more other commands can be automatically renamed in the search query so as to correspond to the renamed command element. In this way, error states can be avoided for command entries representing commands that include command elements that depend on (e.g., reference) command elements of other commands.

The approach depicted in command entry list 2008b may be similar to command entry list 2008a, but with only designated portions of a command being directly modifiable by a user, while at least some portions are not directly modifiable by the user. By way of example, command identifiers are not directly modifiable through the depicted command entries. However, as indicated using underlining, command variables are directly modifiable as text boxes. Command element parameters may optionally be modifiable using respective dropdown lists, as one example.

As shown in FIG. 20, each command entry has one or more corresponding selectable options to modify the command entry list with respect to the command entry. The selectable options are accessible through respective form elements. As an example, in each of command entry lists 2008a and 2008b, command entries 2040b, 2040c, and 2040d each comprise respective options 2042a, 2042b, and 2042c. The options for a command entry are selectable for the command entry by way of one or more respective form elements, which are visually and operably associated with the command entry. In command entry list 2008a, two form elements are employed for each of command entries 2040b, 2040c, and 2040d. In particular, a button (e.g., x-button), and dropdown list are included for each command entry. The option corresponding to the button (which in other implementations could be selectable in some other manner) in command entry list 2008a is operable to delete at least the corresponding command entry from command entry list 2008a. Similar functionality may be incorporated into the options, as shown in command entry list 2008b.

Deleting the corresponding command entry may automatically shift positions of the subsequent command entries in the command entry list to fill the gap left by deleting the command entry, while otherwise retaining sequencing of the command entries in the command entry list. Furthermore, deleting the command entry may delete (e.g., automatically) the one or more commands that correspond to the command entry from search query 2044 (and optionally one or more command separators). Similar to the command entries, any subsequent commands in the search query may have their sequencing retained, with a command that immediately preceded any deleted command(s) being configured to receive the input that would otherwise had been provided to the deleted command(s). Thus, through selection of the option, both the search query and the command entry list may be updated.

As other potential options, the options for a command entry can be selectable to reorder the command entry within the command entry list. One example of a reorder option is a shift up option, which is operable to swap positions of the command entry associated with the option with the command entry immediately preceding the command entry in the list. Swapping a position of the command entry may automatically swap position of the one or more commands represented by the associated command entry with the one or more commands represented by the immediately preceding command entry in search query 2044. Another example of a reorder option is a shift down option, which is similar to the shift up option with the immediately preceding command entry being substituted with the immediately following command entry for swapping. It will be appreciated that other reordering options are possible, and each may comprise modifying the sequencing of command entries in the command entry list and modifying the search query to reflect corresponding changes. Furthermore, in some cases, a user may interact with the command entry list by selecting a command entry (e.g., using a mouse), and dragging the command entry to a different position in the command entry list, thereby reordering the command entry list.

In addition to command entries, a command entry list may include a blank entry, such as blank entry 2050. Blank entry 2050 is operable to add new command entries to the command entry list. In command entry list 2008a, blank entry 2050 comprises a form that is operable by a user to input a command into blank entry 2050. In the example shown, the form comprises a text box for inputting the command as text, although other form elements could be employed. As shown, the text box is created with placeholder text that reads "Add new pipe . . . " and may be utilized to apply blank entry 2050, with a command entered therein by a user, to command entry list 2008a as a new command entry and/or to include the command entered therein in search query 2044 (e.g., add the new command entry to the end of the list of command entries and/or add the new command(s) to the end of the search query). One or more associated options 2052 may be incorporated into one or more form elements in addition to or instead of the text box. Options 2052 may provide a menu of commands that a user can add to the command entry list to create a new command entry by selecting its associated option.

It should be noted that changes made to the command entry list using a form element may be applied to the search query as part of operations associated with the form element or the form containing the form element (e.g., automatically). However in some implementations, the user may make multiple changes to command entries or sequencing of the command entries in the command entry list, and the changes are individually or collectively applied to the search query by the user, for example, using one or more apply buttons, and/or save features.

In FIG. 20, command entry 2040a is an input command entry. An input command entry can optionally be included in a command entry list and corresponds to an input query (e.g., 2044a), or pipeline, which serves as an input to the subsequent commands of the search query. Therefore, an input command entry may be the first command entry in a command entry list, if present. The input command entry may be permitted to represent more than one command, while command entries 2040b, 2040c, and 2040d may optionally be restricted to representing single commands. One or more commands corresponding to an input command entry may optionally be hidden from display in the interface and/or the command entry list (although they may optionally be capable of being revealed in some manner). Furthermore, the interface and/or the command entry list may restrict the user from directly modifying the commands represented by the input command entry.

In some implementations, an input command entry corresponds to a saved input query or pipeline that is selected by the user as an input. "Web Logs" in FIG. 20 is an example of a label corresponding to a saved input query or pipeline that can be displayed with the command entry list. The user can optionally be permitted to selectively replace the saved input query with a different input search query (e.g., another saved query) through the interface comprising the command entry list. As an example, form element 2056 could comprise an option operable to initiate such a selection. It should be appreciated that search query 2044 can be updated accordingly to replace commands of a previous input search query (e.g., commands 2044a) with a newly selected input search query or pipeline.

From the foregoing, it should be appreciated that one or more command entry lists can be employed to create and/or modify a search query. It is further noted that, command entry lists can be incorporated into interfaces that allow search queries to be created and/or modified using additional means. Command entry list 1808 in FIG. 18A is one such example where, as described above, a user may modify or create the search query, for example, through interactions with table format 1802, or possibly using a search bar. Thus, the search query described with respect to search screen 1800 could correspond to search query 2044 of FIG. 20.

In these cases, where the search query is modified through table interactions, the search bar, or other means, the changes may be propagated to the command entry list (automatically or otherwise). To illustrate the foregoing, when a user selects an option, such as one of the options in option menu 1926, one or more commands corresponding to the option can be automatically added to the end of command entry list 1808 as a command entry. In some cases, where the option is a form-based option, the form corresponding to the option might be reproduced in the command entry, as completed by the user. In particular, each of command entries 2040b, 2040c, and 2040d in command entry list 2008b could correspond to a form of a respective option previously selected by a user. The form elements utilized for creation and/or modification of the command in the form of the option can be reproduced, as shown.

3.5 Example Pipeline Selection Interface

In further respects, implementations of the present disclosure relate to data processing pipelines (or simply pipelines) that are defined by one or more search queries. A data processing pipeline can correspond to a set of sequenced commands configured such that inputs to the pipeline are operated on by a first command in the sequence, and each subsequent command operates on results produced by the preceding command in the sequence, until a final command in the sequence provides one or more outputs to the pipeline. The sequence of the commands can be defined by a search query, such as by using a pipelined search language like SPL.

In various implementations, a search query can be created that defines a data processing pipeline that extends another data processing pipeline, which itself may be defined by a search query. In some cases, to create such a search query, one or more data processing pipelines can be selected as a basis for the search query (e.g., as an input search query or pipeline, as described above). In doing so, the full search query need not be created (e.g., by a user), instead, only an additional query may be defined that corresponds to an extended portion of the selected data processing pipeline(s).

In some implementations, a user can select the one or more saved data processing pipelines as a basis for the search query using a selection interface. The selection interface could optionally be displayed with another interface, such as a search interface, in the same screen as the other interface, or in a different screen. An example of a suitable selection interface is described with respect to selection interface 2100 of FIG. 21.

As shown, selection interface 2100 comprises a plurality of pipeline entries, such as pipeline entries 2102a and 2102b, which are listed in selection interface 2100. Each pipeline entry represents a saved pipeline (e.g., a persistently stored pipeline) and displays a pipeline label assigned to the saved pipeline. For example, pipeline entry 2102a has pipeline label 2104a that reads "All Data," and represents a respective saved pipeline that could optionally serve as a basis for all other pipelines. As another example, pipeline entry 2102b has pipeline label 2104b that reads "Web Logs," and represents a respective saved pipeline. Each saved pipeline can represent a saved search query that defines the saved pipeline. As an example, the saved pipeline corresponding to pipeline entry 2102b can represent a saved search query comprising commands 2044a of FIG. 20, by way of example.

Each pipeline entry is selectable to load the saved pipeline that corresponds to the pipeline entry. For example, each pipeline entry can have one or more links that are selectable to load the corresponding pipeline. In the example shown, two links are included for each pipeline entry, which are "edit pipeline" links and "use as input" links. As shown, pipeline entry 2102a comprises edit pipeline link 2108a and use as input link 2106a and pipeline entry 2102b comprises edit pipeline link 2108b and use as input link 2106b.

To this effect, in some implementations, a user may assign one or more tags to any pipeline entry. As an example, pipeline entry 2102a has an assigned "data set" tag. Other tags for other shown include "mine," "accelerated," and "lookup." A user can filter out pipeline entries from selection interface 2100 based on their assigned tags. For example, filter form 2112 can be used to select which tag(s) pipeline entries should have to be included in selection interface 2100. As another possible feature, each pipeline entry has a down chevron, which is selectable to show configuration settings for that pipeline entry. As shown, the pipeline entry with a pipeline label that read "Errors in the last 24 hours" has been selected, and thereby expanded to show its configuration settings. Some of the configuration settings may be changed through selection interface 2100, such as those shown as including "Edit" links that may be selected to edit a corresponding setting.

In response to a user selecting an edit pipeline link, the system may cause the corresponding pipeline of the pipeline entry to be loaded for editing. By selecting edit pipeline link 2108b, for example, a saved pipeline corresponding to commands 2044a in FIG. 20 could be loaded into an interface where the user may modify the pipeline. Loading a saved pipeline may comprise loading at least some of a saved search query corresponding to the saved pipeline. Thus, commands 2044a could be loaded into an interface. A user may modify at least a portion of the saved search query by adding, deleting, and/or modifying one or more commands of the pipeline using the interface.

The saved pipeline may be loaded into a search interface, which may correspond to search screen 1800, as one example. Thus, the saved pipeline could be used as the search query described above that can be modified using the search interface. In addition, or instead, the saved pipeline could be loaded as the search query described above as being modified using a command entry list by populating the command entry list with command entries representing the saved pipeline. However, the saved pipeline may be loaded into other interfaces, which may still implement an interactive table format or command entry list, as described above, or another type of interface. The interface may or may not display events that correspond to the search query. In implementations where the events are displayed, upon loading the saved pipeline, events may be loaded and/or displayed that correspond to the saved pipeline (e.g., an output data set of the saved pipeline).

The events could be loaded by optionally executing the saved pipeline. However, in some implementations, the events could be loaded from an existing data set corresponding to the saved data pipeline. In some cases, the data set may be saved (e.g., persistently) in association with the saved data pipeline and may correspond to an output data set of the saved data pipeline. A saved data set could be saved as a table, or in another format. By loading the saved data set, the saved pipeline need not be executed to load the events, thereby saving system resources. Furthermore, where one or more commands are added to the saved pipeline, the one or more commands may use the data set as an input data set for further processing, rather than executing the entire pipeline.

Any modifications that may have been made to the loaded pipeline may be saved, for example, to the saved pipeline, such that the saved pipeline is updated to correspond to the modified search query (the save process may be initiated by the user, for example, by selecting a save option in the interface). Furthermore, an updated output data set may be saved in association with the updated saved pipeline, which may replace a previously saved data set. The updated saved pipeline and/or updated saved data set may then be accessed using the pipeline entry in the selection interface, for example, through edit pipeline link 2108*b* or use as input link 2106*b*.

In response to a user selecting a use as input link, the system may cause the corresponding pipeline of the pipeline entry to be loaded as an input pipeline for an existing search query, or as a basis for a new pipeline that may be created based on the input pipeline. By selecting use as input link 2106*b*, for example, a saved pipeline corresponding to commands 2044*a* in FIG. 20 could be loaded into an interface for creating and/or modifying a search query that builds on, or extends, the saved pipeline. Loading a saved pipeline may comprise loading at least some of a saved search query corresponding to the saved pipeline. Thus, commands 2044*a* could be loaded into the interface. A user may possibly delete and/or modify the loaded one or more commands using the interface. However, in some cases, the one or more commands may be hidden from the user and/or the interface may preclude the one or more commands from being modified (e.g., as a default that may be overridden by the user). Furthermore, the user may be precluded from modifying the underlying saved pipeline using the interface (at least directly).

The saved pipeline may be loaded into a search interface, which may correspond to search screen 1800, as one example. Thus, the saved pipeline could be used at least as a basis for the search query described above that can be modified using the search interface. In addition, or instead, the saved pipeline could be loaded as at least a basis of the search query described above that may be modified using a command entry list by populating the command entry list with one or more command entries representing the saved pipeline. However, the saved pipeline may be loaded into other interfaces, which may still implement an interactive table format or command entry lists, as described above, or another type of interface. In implementations where the events are displayed, upon loading the saved pipeline, events may be loaded and/or displayed that correspond to the saved pipeline (e.g., an output data set of the saved pipeline).

The events could be loaded by optionally executing the saved pipeline. However, in some implementations, the events could be loaded from an existing data set corresponding to the saved data pipeline. In some cases, the data set may be saved (e.g., persistently) in association with the saved data pipeline and may correspond to an output data set of the saved data pipeline. By loading the saved data set, the saved pipeline need not be executed, thereby saving system resources. Furthermore, where one or more commands are added to the saved pipeline, the one or more commands may use the data set as an input for further processing, rather than executing the entire pipeline.

In various implementations, one or more commands can be added to and/or edited in a search query that builds off of, or extends, the loaded saved pipeline (e.g., commands 2044*a*). The search query may correspond to the saved pipeline (e.g., commands 2044*a*), with an additional search query that builds off of the saved pipeline. One such example is search query 2044 in FIG. 20, with the additional search query comprising commands 2044*b*, 2044*c*, and 2044*d* that might have been added using command entry list 2008*a* or 2008*b*. As another example, the additional search query may have been added using a combination of command entry list 1808 and interactions with table format 1802, where the interface corresponds to search screen 1800. Where updated events are needed for display, the updated events may be generated based on the output data set of the loaded saved pipeline, for example, by executing the additional search query using the output data set as an input, thereby saving system resources. Furthermore, by preventing the user from modifying the loaded pipeline in the interface, it may be ensured that the output data set can be used regularly for this purpose.

The constructed search query may be saved, for example, as a new saved pipeline that corresponds to the search query (the save process may be initiated by the user, for example, by selecting a save option in the interface). Furthermore, an output data set may be saved in association with the new saved pipeline that corresponds to an output of the pipeline. Additionally, the constructed search query can be saved in association with the saved pipeline and a new pipeline entry. The saved pipeline may then be accessed, for example, in selection interface 2100 using an associated use for input pipeline link and an associated edit pipeline link in the pipeline entry, similar to web logs.

3.6 Extracting Field Label-Value Pairs

In some respects, the present disclosure relates to various approaches for extracting field label-value pairs from data items of events, such as event raw data, extracted fields, metadata, or other data items that may be assigned to one or more events. These approaches are useful in combination with some implementations described herein, such as various search interfaces. For example, various aspects of these approaches may be incorporated into at least one of the options that may be presented based on a user selecting a portion of a table format, which may be one of the options in option menu 1926 (e.g., as one or more commands). However, it is noted that these approaches are more generally useful in the context of analyzing and/or interacting with events, which may optionally be facilitated by a graphical interface for displaying the events.

Extracting a field label-value pair from an event can generally refer to a process whereby a field label and a value associated with the field label are identified from the content of an event, such as event raw data of the event, or another event attribute, as a field label-value pair. Extractions of field label-value pairs can be implemented utilizing extraction rules that are applied to data in the events to extract values for specific fields as data items for the fields. In the context of extracting field label-value pairs, an extraction rule for a field can include one or more instructions that specify how to extract a value for the field from event data and further how to identify and/or extract a field label for the value from the event data. In some cases, an extraction rule comprises one or more regular expressions to provide instructions for identifying a field label and/or value. The field label may optionally be assigned to the field.

An extraction rule for extracting field label-value pairs can generally include any type of instruction(s) for identifying and extracting values and for identifying and/or extracting a field label corresponding to any extracted values, from data in events. The field label may optionally be generated from the data in the events. In contrast, other extraction rules may only provide instructions for identifying and extracting values from data in events. A field label may be manually entered for a field associated with the values.

An example of an extraction rule for extracting field label-value pairs is a rule that identifies a field label for a field based on text on the left hand side of an equal sign ("="), and identifies a value for a new data item or value associated with the field label based on text on the right hand side of the equal sign within a value of a data item. The equal sign can be used to demarcate text representing a field label and text representing a value associated with that field label. The identified text on each side of the equal sign could further be demarcated by a space character (" "). It should be noted that other demarcating character(s) could be employed in addition to, or instead of equal signs and space characters to define text representing a field label and/or value associated with the field label, such as one or more colons, back slashes, ampersands, quotation marks, and the like. Furthermore, rules that identify demarcating characters can vary in complexity, such as by considering text representing a value as being demarcated by characters that are not a number or word character. A word characters may include a to z, A to Z, or underscore, as an example. Furthermore, text representing a field label could be demarcated in a different manner than text representing the value, for at least one boundary thereof. Additionally, processing, such as decoding, could optionally be applied to the text portions to generate the field label and/or value.

Using such an extraction rule that identifies field labels and values using one or more demarcating characters, a system can identify within text in a data item that reads "itemid=EST-14," "itemid" as a field label, and "EST-14" as a value for a data item associated with the field label for a field label-data item pair. Such as in the raw event data of event 1 in FIG. 18A. Any values that are extracted from events using an extraction rule may be assigned to a new or existing field of an event as data items, for example, to define a late-binding schema for events. Thus, with reference to FIG. 18A, using the extraction rule, a new event attribute (an extracted field) may be created and assigned the extracted field label "itemid" for each event, along with data items corresponding to the extracted value associated with the field label for that event. As an example, the extraction rule may generate itemid data items having the values of "EST-14," "EST-15," "EST-18" respectively for events 1, 3, and 4 in FIG. 18A. As events 2 and 5 do not include text in the format of "itemid=," they could optionally be assigned a data item having a blank, or default value, or no value (e.g., empty). Similar extraction rules can be applied to each search result. The aforementioned example utilizes events that are part of search results for convenience only. It is noted that concepts related to extracting field label-value pairs are more generally applicable to any set of events.

3.7 Additional Example Search Screen

FIGS. 12A, 12B, 12C, and 12D (also referred to herein collectively as "FIGS. 12"), show a progression of a search screen in an example of a search interface as a user constructs a search query in accordance with some implementations of the present disclosure. The progression is in the depicted sequence shown, but at least some of the progression is not shown.

The search interface utilizes the search screen to display one or more events returned as part of a search result set of a search query. The search interface can correspond to the search interface described with respect to search screen 1800 of FIG. 18A. However, it is noted that aspects of the present disclosure described with respect to FIG. 12 are also applicable to the search interface described with respect to search screen 600, or other search interfaces or search screens described herein. Furthermore, unless specified, search screen 1200 and the search interface can offer similar functionality as the other search screens and search interfaces described herein. In particular, the following description provides additional potential features that can be incorporated into search screens 600, 1800, and their corresponding search interfaces, and not to limit features.

As with the description in above sections, it should be appreciated that various concepts described below have more general utility than for search interfaces, or for a particular type of search interface. In these respects, various concepts are severable from the particular implementations described herein. As one specific example, although various concepts are described herein with respect to search, many of these concepts are more broadly applicable to queries in general. Thus, while the terms search interface, search screen, search results, search query, and other similar terms are utilized herein, these concepts are more broadly applicable to query interfaces, query screens, query results, and queries. Types of queries include search queries, script queries, and data processing queries.

3.8 Interface Panels

Search screen 1200 optionally includes interface panel 1205. In various implementations, interface panel 1205 is purpose-built for assisting users in formulating commands for queries, such as the query corresponding to search results displayed in table format 1202. In the implementation shown, the query is represented using command entry list 1208 in sidebar 1230, which can correspond to any of command entry lists 1808, 2008*a*, and 2008*b* described above.

Interface panel 1205 is adjacent sidebar 1230 and extends lengthwise along sidebar 1230. However the particular location, size, and relative positioning of interface panel 1205 can vary. For example, interface panel 1205 could extend crosswise in a search screen (e.g., adjacent the top or bottom of the search screen). Furthermore, in the search interface, interface panel 1205 is anchored in its position, but in other implementations could be floating and movable by the user. Additionally, although a single panel is shown, in some cases, functionality of the interface panel could be incorporated into multiple panels, which could be shown concurrently and/or could be independently hidden and unhidden. It should be appreciated that any of the various aspects of interface panel 1205 could be independently configurable by a user.

In the search interface of FIGS. 12, interface panel 1205 is implemented as a panel, by way of example only. In other cases, a window, tab, or other interface mechanism(s) can be employed. A user can selectively hide and unhide interface panel 1205 by selecting form element 1207, which is implemented as a clickable button. Interface panel 1205 can be selectably hidden and unhidden in any of the various FIG. 12 shown. In implementations where the user can hide and unhide interface panel 1205, the user is able to selectively access the various form elements included therein as needed for adding to and/or modifying the search query, as is further described below. As shown, interface panel 1205 comprises one or more form elements to assist the user in constructing the query.

The form elements and contents thereof included in interface panel 1205 can change over time based on context to assist the user in interacting with table format 1202. Interface templates can be used to populate interface panel 1205. Each interface template generally comprises instructions for one or more forms. In some implementations, each interface template corresponds to a respective table manipulation action a user may perform on table format 1202. As used herein, a table manipulation action may describe a predefined alteration to the number of rows, columns, and/or cells in a table format and/or the contents thereof that can be achieved by adding one or more commands to a query, such as the search query represented at least partially by command entry list 1208.

In some implementations, each option presented to the user through selection of one or more interactive regions (e.g., selectable cells, columns, rows) of the table format can correspond to a table manipulation action and interface template. For example, the options can be the options in option menu 1926 or any of the various options described herein. Where an option is instantiated in the search interface, it may be done so as instructed by its associated interface template. For example, an interface template can provide instructions that define any of the various features of an option described with respect to FIG. 19, including context for displaying the option based on the selection that prompted option menu 1926 (or more generally the list of options).

Further, the interface template for an option can define the overall flow of user interaction with the option. In various implementations, the overall flow of user interaction defined by an interface template extends from the presentation of the option through modification of the query (e.g., through adding one or more commands to the search query based on user selection of the option). In this way, an interface template can define one or more forms and the sequence and/or conditions for presentation of the one or more forms (e.g., whether a form is a form-based option, nested form-based option or any of the features of an option). Further, an interface template can define one or more form elements for each of the forms, the number thereof to include in a form, as well as the contents thereof, including potential default contents. Various examples of such contents have been described herein.

Additionally, an interface template can define one or more mappings between form elements and modifications to the query. For example, an interface template may map form elements to one or more command identifiers and/or command elements for one or more commands to add to the query. In doing so, the interface template defines the syntax for the one or more commands. Thus, as has been previous described herein, the one or more commands that are added to the search query may be in proper syntax for the search query, complete with command identifiers and any command elements that are needed or desired for execution of the commands. Thus, the user can perform the table manipulation action associated with the interface template with little to no knowledge of the underlying query language.

3.9 Option Menu Links

In the example of FIGS. 12, option menus are implemented in a different manner than in FIGS. 18. In FIGS. 18, display locations of option menus are based on the one or more portions of the table format that are selected by the user. As described above, option menus can be configured to appear proximate to (e.g., over or adjacent to) the one or more selected portions of the table format, as illustrated by option menus 1826a, 1826b, 1826c, 1826d, and 1826e. In contrast, FIGS. 12, includes any number of option menu links, such as option menu links 1210A, 1210B, 1210C, 1210D, and 1210E (also referred to collectively as option menu links 1210), which may be at static locations with respect to search screen 1200.

Each of option menu links 1210 are displayed in search screen 1200 (optionally in option bar 1231) throughout the user constructing a search query. One to all of the option menu links 1210 can be in an inactive state or an active state based on a portion of the table format selected by the user. In the implementation shown, a visual indicator is presented in search screen 1200 for each particular option menu based on whether a particular option menu link is in an inactive state or active state. For example, option menu links 1210A and 1210B are in an inactive state, which may be indicated using respective greyed out links or text. Option menu links 1210C, 1210D, and 1210E are in an active state, which may be indicated by respective non-greyed out, or colorized links or text. Whether a particular option is in an active state or an active state can be visually indicated in any suitable manner. In some cases, inactive option menu links are not displayed in the search interface, whereas active option menu links are displayed in the search interface. It should be appreciated that when a particular option menu link changes states, search screen 1230 can be automatically updated to visually indicate the new state.

An option menu link is selectable by the user based on the option menu link being in an active state. Based on the user selecting an active option menu link, the system reveals and displays a list of options in the search screen. The list of options can be displayed in the form of an option menu corresponding to option menu 1926, described above, or other option menus described herein. In some respects, based on the one or more portions of the table format being selected by a user in the search interface, the states of the option menu links are automatically contextually updated, as needed, to correspond to the selection. For example, the system can configure the option menu links such that each option menu link having an option menu comprising at least one selectable option is in an active state. Whether an option menu has a selectable option therein can be determined contextually, such as based on the one or more portions of the table format selected by the user. In particular, as described above, one or more options might be contextually included based on selection of a column, a cell, or other designated portion of the table format.

In some cases, option menu links 1210 functionally group, or organize, the options that are selectable by a user. For example, the active ones of option menu links 1210 can collectively comprise the selectable options of option menu 1926. Using this approach, each option menu link can correspond to options having a common functionality or characteristic when executed. In the present example, each option corresponding to option menu link 1210A edits the events displayed in the table format, each option corresponding to option menu link 1210B sorts the events displayed in the table format, each option corresponding to option menu link 1210C filters the events displayed in the table format, each option corresponding to option menu link 1210D cleans the events displayed in the table format, and each option corresponding to option menu link 1210E adds a new column or field to the displayed table format (e.g., to the events displayed in the table format).

In various implementations, in response to a user selecting an option, the one or more forms defined by its corresponding interface template are displayed to the user. For example, in FIGS. 12B, 12C, and 12D, the one or more forms are displayed in interface panel 1205. Where interface panel 1205 is in a hidden state it may be automatically revealed to the user based on the selection of the option. Also, where a different form is in interface panel 1205 at the time the option is selected, that form may be replaced with the one or more forms. Generally, one or more values of selected data items or values generated therefrom and/or event attribute identifiers corresponding to the selected data items could be automatically mapped to one or more of the form elements. All of this behavior could be defined by the instructions of an interface template. Automatically unhiding interface panel 1205 and/or displaying the form can be beneficial, for example, in cases where user input is desired for constructing the one or more commands to add to the query.

4.0 Command Entry List and Interface Templates

In further respects, in addition to or instead of each option corresponding to a table manipulation action and interface template, as described above, each command entry may correspond to a table manipulation action and interface template (e.g., the same interface template). For example, FIG. 12 shows command entry list 1208, which can correspond to command entry lists 1808, 2008a, and 2008b, described above. In various implementations, each command entry list can be selected to cause one or more forms to be displayed, as instructed by an interface template. In some cases, a user selects a command entry so as to access one or more forms for modifying the one or more commands represented by the command entry. As an example, a user may select a command entry by clicking on the command entry or a portion thereof. Clicking on a command entry may be similar to clicking on an option in the option menu, as described above. In particular, one or more forms may be displayed in a similar manner. The form elements of the one or more forms can be populated with at least a portion of the one or more commands represented by the command entry, such as one or more command elements. Further the one or more commands can be modified by the user via input to the one or more form elements. Also similar to an option, the one or more forms may be displayed in interface panel 1205. This behavior can be defined by an interface template.

Furthermore, for the purpose of displaying the one or more forms of the interface template, in some cases, only one command entry may be selected at a single time. Selecting one command entry may automatically deselect the currently selected command entry and update the displayed form. When interface panel 1205 is hidden upon selection, the form may remain hidden until being unhidden by the user.

In addition to or instead of selecting a command entry directly, a command entry may be automatically and indirectly selected based on a user selecting a corresponding option, such as one of the options in an option menu. More particularly, selection of an option may cause a corresponding command entry to be added to command entry list 1208 (e.g., to the bottom of the list) representative of the one or more commands added to the query. Additionally, adding the command entry may coincide with the command being selected in command entry list 1208. Thus, a single interface template may correspond to both an option and a command entry that may be created as part of the interface template. In some cases, there is a one-to-one correspondence between an option and a command entry. Furthermore, there may be a one-to-one correspondence between a command entry and a command represented by the command entry (i.e., one command per command entry). However, in other cases these are one-to-many relationships (e.g., multiple command entries can be added for a single command and multiple commands can be represented by a single command entry).

In various implementations, selection of a command entry in the command entry list causes the one or more forms of the interface template to be displayed in the same state as when the user completed previous interaction with the forms of the associated interface template. Thus, the previous form may be displayed to reflect the various user input into the form elements, such as user selections and user entered text. In this way, the user can go back to the forms via the commend entry as needed to modify the one or more commands using the same forms and/or information entered by the user. It should be appreciated that the one or more forms may or may not be the forms used to initially generate the one or more commands after selection of a corresponding option.

In various implementations, the state of the various forms accessed in FIG. 12 is stored as metadata. The metadata may be saved in association with a saved pipeline (which may also be referred to as a data object, a search object, or a query object). Where a user loads the saved pipeline into a search interface, such as by selecting edit pipeline link 2108c, the associated metadata may be loaded as well and the search interface can be configured as instructed by the metadata. Thus, the user can continue interacting with the query where the user left off at save time. Saving and loading the metadata can be useful for various reasons. One benefit is that the system can save and reuse relevant information about a query or query session that is not obtainable from the query itself. Another benefit is even where the information is obtainable from the query, the system does not need to process the query to extract the information or be coded to perform such complex extraction.

Other metadata that can optionally be saved in association with a pipeline include modifications made by the user to table formatting. As an example, the user may rearrange the ordering of the displayed columns in table format 1202. Column format metadata can describe the ordering of columns such that it is preserved when the saved pipeline is later accessed. In search screen 1200 one of the options available in one of the option menus may be used to reorder a column. The option may not cause one or more commands to be added to the query. Instead, the option can cause the metadata to reflect the ordering of the columns as modified by the user based on selecting the option. Using the option, the user may place a column where desired, such as by swapping places with another column. In addition to or instead of a being in an option menu, the option column be invoked in another manner such as by dragging and dropping a column. As a further example, column format metadata can capture column widths that the user may modify for any of the various columns, for example, by dragging column dividers. Other optional column formatting metadata include column data types and/or column names. This and other table formatting may be stored in the metadata.

Also, a query of a saved pipeline may be dependent on one or more other queries that each may be saved as a respective saved pipeline. The metadata of each saved pipeline may correspond to the portion of the query that was composed for and saved to the saved pipeline (e.g., the extended portion or an input portion) and loading of the query using the saved pipeline could optionally load the metadata (or portions thereof) of each saved pipeline from which is depends. In some cases, a saved pipeline includes at least one link to a saved pipeline from which it depends. As an example, a saved pipeline may include a link to the saved pipeline it extended, such that a chain of links may be formed amongst saved pipelines back to an initial input pipeline. The chain of links can be used to sequentially load the chain of saved pipelines starting from the initial input pipeline and optionally the metadata associated with the respective saved pipeline. However, it is noted that this is one example and the metadata need not be saved with respect to a particular portion of the query or otherwise be specific to a saved pipeline.

4.1 Selecting Command Entries to View Corresponding Query Results

As indicated above, in various implementations, a user may select a command entry in a command entry list to view query results corresponding to the selected command entry. In particular, the user may select a command entry to specify an endpoint in the query represented by the command entry list. By selecting an endpoint, the query results displayed in the table format are caused to correspond to the commands of the query up to the endpoint. In some implementations, by selecting a command entry, the endpoint is specified as being directly after the one or more commands represented by the selected command entry. Thus, for example, a user may select command entry 2233 in FIG. 22D to specify its corresponding command as the endpoint.

It should be appreciated that each command entry in the command entry list may be similarly selectable to achieve a similar result for the one or more commands it represents. Further, when command entries are added to the command entry list, those command entries are also selectable. A command entry may be selected, for example, by clicking on the command entry in the command entry list. By selecting a command entry the query results displayed in the table format may optionally be automatically updated to correspond to the query up to the specified endpoint. Thus, the user can view the progression of the query results by selecting the various command entries in the command entry list without losing subsequent commands of the query. It is noted that selecting a command entry typically automatically deselects the previously selected query. Furthermore, when a command entry is added to the command entry list (e.g., using an option), in some cases, the command entry becomes automatically selected.

In some cases, when the query results are updated to correspond to the query up to the endpoint, the corresponding commands of the query are executed to update the query results. By way of example, by selecting command entry 2233 in FIG. 22D, the table format may look similar to what is shown in FIG. 22C (although if commands of the query are completely re-executed, the events in the query results could differ). It is noted that the command entry list may still look as it does in FIG. 22D except that command entry 2233 could be highlighted or otherwise indicated as being an endpoint rather than command entry 2235. By subsequently reselecting command entry 2235, search screen 2200 would look similar to how it does in FIG. 22D.

In further respects, the user may optionally be permitted to interact with the displayed query results corresponding to the query up to the endpoint to insert one or more commands into the query directly after the endpoint, and to insert one or more command entries that represent the one or more commands directly after the selected command entry in the command entry list. For example, the user may select interactive regions (e.g., cells, columns, text) of the table format to add one or more commands to the query as has been described throughout the application.

In some cases, the user may optionally be precluded from interacting with the displayed query results where the query results do not correspond to the entire query. Also, as one example, the selection of prior command entries in the command entry list may be utilized to preview prior states of the query results (e.g., without completely re-executing the commands). In some cases, the prior states of the query results could be saved with respect to a corresponding command entry so that the commands need not be completely re-executed on the data sources. However, at least some of the commands may be executed as needed to accurately portray the query results (e.g., after inserting a command entry and/or modifying one or more commands thereof).

It is also noted that in the present implementation, selecting a command entry displays a corresponding form allowing the user to modify the one or more commands represented by the selected command entry using one or more form elements of the form. As has been described previously, this form could be the same form displayed to the user when the one or more commands where adding to the query or modified in the query.

It is further noted that in some implementations, metadata can be stored with respect to a particular command of the query and/or command entry. For example, a state of the search interface can be saved to each command entry that represents the state when the command entry was previously selected (e.g., first added and/or last modified). The state in the metadata can include the column formatting (e.g., column widths, data types, orderings, and/or names) for each column in the table and optionally other information such as user input into one or more forms corresponding to the command entry. Thus, for example, when a new command entry is selected, the metadata of the command entry can be loaded into the table. Furthermore, any changes made while the command entry is selected can be reflected in the metadata of the command entry. In some cases, one or more changes are propagated to the metadata of one or more other command entries (e.g., each subsequent command entry in the list). As an example, column width and/or data types of columns may be propagated to the metadata. In some implementations, a change to column names may be propagated through the subsequent commands of the query. For example, a column name may comprise an attribute label and commands may reference event attributes by their attribute label. Thus, changing an attribute label may results in the references being automatically updated with the changed attribute label.

While the present example is given with respect to a table format, the query results need not be displayed in a table format, or could be displayed in a different table format than described with respect to search screen 2200. In particular, it is emphasized that this concept may be implemented in any of the query interfaces described herein, or in other interfaces.

4.2 Search Point Processing

In some respects, the present disclosure provides various approaches to automatically managing the processing of commands provided by users when constructing search queries that define pipelined searches. Although search queries and pipelined searches are described, it should be appreciated that these approaches may be generally applicable to queries that define data processing pipelines. In various implementations, a user can use an interface to construct a search query, such as any of the various search interfaces described herein. Furthermore, the user can view search results corresponding to the search query, which can be updated to reflect commands that are added to, deleted from, or modified in the search query by the user to construct the search query.

In some approaches, a search query defines a pipelined search that is executed on one or more event sources (e.g., each event source can correspond to a respective data source). One or more events of a search results set of the pipelined search are displayed to the user. When a user selects at least one command to add to the search query, the search query is modified to incorporate the at least one command, and a new pipelined search defined by the modified search query is conducted on the one or more event sources. The one or more events that are displayed to the user may be updated to correspond to a search results set of the new pipelined search.

In accordance with the present disclosure, rather than always executing the new pipelined search on the one or more event sources, the system can configure the new pipelined search to be executed on the search results set of the pipelined search. Doing so may be advantageous in that the search results set of the pipelined search typically has fewer events to process than the one or more event sources (e.g., the results set may be a subset of the event sources). Furthermore, the new pipelined search can leverage the processing performed by the execution of the previous pipelined search, thereby reducing the processing used to arrive at the results set of the new pipelined search.

However, as will later be described in additional detail, it may not always be desirable to leverage a search results set of a pipelined search for a new pipelined search. In some implementations, the system automatically selects between executing a pipelined search on an existing results set and on one or more event sources. In doing so, the system can automatically select the more desirable source on which to execute the pipelined search. A result set the system selects on which to execute pipelined searches can be referred to as a search point.

FIG. 23 illustrates executing pipelined searches in a search interface in accordance with implementations of the present disclosure. In particular, diagram 2300 shows searches 2302, 2304, 2306, 2308, 2310, and 2312. Searches 2302, 2304, and 2306 are executed on event source 2350. In particular, search 2302 is executed on event source 2350 to produce result set 2352, search 2304 is executed on event source 2350 to produce result set 2354, and search 2306 is executed on event source 2350 to produce result set 2356. In some implementations, each event source 2350 corresponds to a respective data source, such as has been described above. Furthermore, each event source 2350 can comprise one or more events, which may be indexed events as described above. Additional events may be incorporated into an event source, for example, as the event data is provided by one or more forwarders.

Also in FIG. 23, searches 2308 and 2310 are executed on results set 2356. In particular, search 2308 is executed on result set 2356 to produce result set 2358 and search 2310 is executed on result set 2356 to produce result set 2360. Also, search 2312 is executed on result set 2358 to produce result set 2362. Each result set in FIG. 23 can comprise one or more events that are responsive to the corresponding search. The events in a result set may or more not be indexed for search (e.g., comprise indexed events).

Each pipelined search in FIG. 23 can comprise one or more pipelined search processing commands that are executed to generate a result set. Similar to search 2310, the commands corresponding to search 2308 extend, or build on, the commands defining search 2306. In an interface, a user may iteratively construct base query 2320 by providing commands to incorporate into a search query via the interface. For example, the user may initially provide one or more commands corresponding to search 2306. After providing the commands, search 2306 may be executed and one or more events from result set 2356 are displayed in the interface that correspond to the search query as initially constructed. Subsequently, the user may provide one or more additional commands corresponding to search 2308 to extend the search query and result in base query 2320. After providing the commands, the one or more events displayed in the interface may be updated to correspond to base query 2320. Using this approach, the user receives visual feedback (e.g., in the form of displayed events) of the impact of modifying the search query as it is being constructed.

Aspects of the present disclosure allow for the reuse of any number of results sets generated as the user constructs the search query so that the visual feedback can be provided to the user without needing to execute each command of the search query each time it is modified by the user. For example, assuming the search query is base query 2320, the search system can execute base query 2320 on event source 2350 to produce a result set of the query and display one or more of events from the result set to the user. However, in other cases, the search system constructs a search query and executes the search query on result set 2356 to produce result set 2358, which would also satisfy base query 2320. Thus, the displayed one or more events can be updated using result set 2358 to provide the visual feedback to the user.

4.3 Search Point Management

As mentioned above, a result set the system selects on which to execute pipelined searches can be referred to as a search point. The system can continue to execute new pipelined searches on the selected result set until the search point is updated to a different result set. By updating the search point, the system can automatically select the most desirable source on which to execute a particular pipelined search. The foregoing is illustrated with respect to FIG. 22 with FIG. 23, by way of example.

Assume a user opens search screen 2200 to construct a new search query as shown in FIG. 22A. Optionally using form 2260, the user can specify event source 2350 for a search query. As a result, the system executes an initial query (e.g., search 2306) that corresponds to each event in event source 2350 to produce result set 2356 and sets result set 2356 as the search point. As shown in FIG. 22A, one or more events from result set 2356 are displayed in table format 2202.

Subsequently, using form 2262, the user selects one or more fields (e.g., bytes) corresponding to events from event source 2350. The one or more event attributes displayed in form 2262 can be based on events in event source 2350 and/or result set 2356, and comprise, for example, an event raw data attribute, extracted fields, default attributes, or metadata attributes assigned to one or more events from event source 2350. In some cases, the event attributes include interesting fields, as described above. Form 2262 can be similar to forms in interface panel 2205, as described above, and in some cases may be included in interface panel 2205 and/or have an associated interface template. Using form 2262, the user can select and deselect the listed event attributes for use in a "fields" command. The system automatically generates the "fields" command based on the event attributes selected by the user (optionally in response to the user selecting "Apply" button 2263).

In response to the user selections (Apply button 2263 in the present example), the system executes a query (e.g., search 2308) that extends the initial search which was previously executed and which produced result set 2356. In order to construct the query, the system can determine whether to execute a new search on the event source (that is optionally specified in the initial query, or externally) or a result set (which could include determining which result set to use). In the present example, this includes determining whether to update the search point.

In some cases, if the system determines to retain the current search point, the new pipelined search is executed on the result set (e.g., result set 2354) currently designated as the search point. If the system determines to update the current search point, the new pipelined search may be executed on event source 2350 (or a different result set in some cases), and the result set produced by the new pipelined search may be set as the search point.

In some implementations, the system determines whether to execute a new search on the event source or a result set based on at least the one or more commands corresponding to the selection made by the user to extend the previous search. For example, form 2262 corresponds to one or more commands including the event attributes selected by the user as parameters of the one or more commands (a fields command in the present example). In this example, by selecting apply button 2263, the user selects the one or more commands to extend the previous search.

The selection described above may be made in different ways, such as by selecting an option in an option menu. For example, a selection may correspond to one or more selectable options in option menu 2226A or 2226B. In the example shown, the user selects apply button 2263 in FIG. 22A, causing the display of FIG. 22B, selects option 2233A in FIG. 22B, causing the display of FIG. 22C, and selects option 2233B in FIG. 22C, causing the display of FIG. 22D. As noted above, selecting an option may directly cause execution or a query comprising commands corresponding to the selected option, or cause presentation of one or more forms, form elements, or other UI elements used to select and/or define the command(s) and cause execution of the command(s) in a query.

In the example of FIGS. 23, in response to the selection of one or more commands in FIG. 22A, the system determines to execute pipelined search 2308 on result set 2356, which produces result set 2358. In this case, the system determines to maintain the search point as result set 2356. As a result, the system causes the events displayed to the user to be updated to correspond to result set 2358, as shown in FIG. 22B. In this case, a selection corresponding to a fields command in FIG. 22A also caused columns corresponding to selected event attributes to be displayed in search screen 2200, as shown in FIG. 22B. For example, column 2250 is newly presented based on the selection and corresponds to the newly selected field "bytes."

Also in FIGS. 23, in response to the selection of one or more commands in FIG. 22B, the system determines to execute pipelined search 2310 on result set 2356, which produces result set 2360. In this case, the system determines to maintain the search point as result set 2356. As a result, the system causes the events displayed to the user to be updated to correspond to result set 2360, as shown in FIG. 22C. In this case, a selection of a field extraction command in FIG. 22B also caused a column corresponding to a field extracted from event attributes to be displayed in search screen 2200, as shown in FIG. 22C. For example, column 2252 is newly presented based on the selection and corresponds to the newly extracted field "test."

Further in FIGS. 23, in response to the selection of one or more commands in FIG. 22C, the system determines to execute pipelined search 2302 on event source 2350, which produces result set 2352. In this case, the system determines to update the search point to result set 2352. As a result, the system causes the events displayed to the user to be updated to correspond to result set 2352, as shown in FIG. 22D. In this case, the selection was of a "head" command in FIG. 22C, which results the first N (e.g., 10 in the present example) events in search order.

As described above, when a user modifies the search query being constructed using the search interface, the user can receive visual feedback in the form of an update to the displayed events. In various implementations, the determinations as to whether to execute a new search on the event source or a result set are configured such that events are consistently displayed in search screen 2200 as the user constructs the search query. For example, for various potential reasons, were a filtering command to be executed on a result set, there may be an insufficient number of events to display that satisfy the search query. In particular, a filtering command can filter events in a pipelined search, meaning the events in the search pipelined may be narrowed down or reduced using these commands based on filtering criteria.

As an example, the foregoing could occur in implementations where a result set being searched does not include or may not include each event from event source 2350 that corresponds to the previous search. This could be because event source 2350 has ingested new data resulting in new events being at event source 2350 since the search used to produce the result set was executed. As another example, for quicker feedback to users, the search may have been executed to generate the result set as a subset or preview of the events that satisfy the query at event source 2350 (e.g., a sufficient number to fill the event display area of the search screen).

To illustrate the forgoing, in the present example, option 2233B corresponds to a filtering command. In cases where result set 2356 only includes eight events, for example, were the query executed on result set 2356, there may be less than the ten events shown in FIG. 22D available to display as feedback. By executing the query on event source 2350, additional events may be available for result set 2352 to allow ten events to be displayed to the user.

Consistency issues may also arise where a query having a filtering command is executed to produce a result set, and a subsequent query is executed on the event source. In this case, one or more events corresponding to the result set may be displayed to the user as feedback for the query. In the new result set produced by the subsequent query, events not present in the previous result set may be included in the new result set from the event source. This may cause the ordering, or other display aspects of the events displayed to the user to change to accommodate the additional events, which complicates the user's ability to interpret the visual feedback. For example, the displayed events may be ordered by the value of bytes in column 2250. Depending on the value of bytes in additional events and the number of additional events from the event source, the events the user was previously viewing may no longer be displayed or may shift to different positions on the screen. By managing search points, the system can avoid or reduce such inconsistencies when displaying events, while still reusing result sets when desirable.

In addition to filtering commands, the system may update the search point based on the selection corresponding to at least one transforming command. A transforming command can transform events in a pipelined search, meaning the contents, or values of event attributes assigned to events in the search pipelined may be transformed based on transformation criteria. Updating the search point may be desirable where the transformations are based on values of multiple events. For example, the transformation may apply to events at event source 2350, but not in the result set corresponding to the current search point, for reasons as described above. Values from these events could impact the results of the transformations. Therefore, applying the transformation to a result set may not result in accurate results to display to the user and the results could change drastically were the transformation to be subsequently performed on the event source for a later query.

Examples of filtering and/or transforming commands follow. A "dedup" or deduplication command can specify a number of duplicate events to retain for each value of a single field, or for each combination of values among several fields, and may return the events based on search order. For historical searches (e.g., searches on a distinct time range (such as the past hour, the previous day, or between 2 and 4 last Tuesday)), the most recent events may be searched first. For real-time searches (e.g., searches that display a live and continuous view of events as they stream into the system), the first events that are received may be searched, which may not necessarily be the most recent events). A "where" command can specify one or more evaluation expression the system users to filter events from search results. The search may only keep the results for which the evaluation was successful (that is, the Boolean result was true). A "regex" or regular expression command removes from results, events that do not match a regular expression specified in or by the command. A "search" command retrieves events from indexes or filters events from results of a previous search command in a search pipeline using keywords, quoted phrases, wildcards, and/or key/value expressions. When a search command is not the first command in a query, the search may be used to filter the results of a previous command in the query. A "stats" or statistics command when executed calculates aggregate statistics over events, such as average, count, and sum. If a by clause is not included in the command, one row may be returned for display, which is the aggregation over each available event. If a by clause is included, a row can be returned for display for each distinct value of events specified in the by clause. A "top" command causes display of the most common values of an event attribute for events. Executing a top command case include determining the most frequent tuple of values of all fields in a field list, along with a count and percentage. In some cases, including an optional by clause results in determining the most frequent values for each distinct tuple of values of group-by fields.

Thus, in some approaches to ensure consistency in visual feedback, the system is configured to update the search point based on the user selecting to modify (e.g., extend) the previous search with one or more commands comprising a filtering and/or transforming command. For example, the system can be configured so that each time the user modifies a query by adding a filtering or transforming command, the one or more events displayed for feedback are produced by executing a modified query on the event source.

In other cases, such as where the one or more commands do not comprise any filtering and/or transforming commands, the one or more events used for feedback can be from a result set produced by executing the modified query on the search point. In the present example, apply button 2263 corresponds to a non-filtering and non-transforming command. As can be seen in FIG. 22B, the fields command adds at least one column to the table format, such that the view of events will remain consistent when executed on the result set corresponding to the search point. Similarly, option 2233A corresponds to a non-filtering and non-transforming command. As can be seen in FIG. 22C, the field extraction command also adds at least one column to the table format, such that the view of events will remain consistent when executed on the result set corresponding to the search point. However, were the pipelined searches comprising these commands executed on the event source, the order of the events displayed in the feedback could change, as described above. Thus, it may be desirable to refrain from updating the search point for these commands. Other examples of commands it may be desirable to refrain from updating the search point for include sort commands, commands that add, join, or append fields form other data tables, searches, lookup tables, or other sources, and more.

In some respects, the system can configure the search point for a command such that it corresponds to a result set of the most recent filtering and/or transforming command in the search query. Thus, for example, queries for the fields command corresponding to apply button 2263 and the field extraction command corresponding to option 2233A may each be executed on result set 2356, as shown in FIG. 23, to produce result sets 2358 and 2360 respectively.

Using this approach, had non-filtering and non-transforming commands been added to the query prior to the filtering command corresponding to option 2233B, for feedback modified queries corresponding to those commands would also be executed on result set 2356. However, had non-filtering and non-transforming commands been added to the query immediately after the filtering command corresponding to option 2233B, modified queries corresponding to those commands would be executed on result set 2358, until the query is modified to add a filtering and/or transforming command. In another approach, each modified query corresponding to a non-filtering and non-transforming command could be executed on the result set corresponding to the prior command (e.g., the endpoint of the previous query). Using this approach, result set 2362 could be produced by executing a modified query on result set 2358.

The system can utilize various approaches to determine whether to execute a new search on the event source or a result set (and optionally which result set) based on at least the one or more commands corresponding to the selection made by the user to modify the search (e.g., extend the previous search). In some cases, the system selects between a results set and the event source for execution of a new pipelined search based on an analysis of the selected one or more commands. This can include, for example, analyzing metadata associated with the selected one or more commands. As an example, the system may predefine user selections of one or more commands as a new search point in the metadata. Based on the system identifying the selected one or more commands as a new search point using the metadata (e.g., by identifying a search point flag), the system updates the search point.

Using the forgoing example, apply button 2263 and option 2233A and other selectable UI elements may be pre-assigned as non-search point selections (e.g., a selection that retains the current search point) in the system, such as by using metadata associated with the UI elements prior to the user loading the search interface, while option 2233B and other selectable UI elements may be similarly pre-assigned as search point selections (e.g., a selection that causes a result set corresponding to the selected one or more commands to be assigned as the search point).

In some implementations, in response to the user making the selection (e.g., of an option), a command entry corresponding to the selection is added to the command entry list, as has been described above. Each command entry may correspond to a command entry object (e.g., a JSON object). Each command entry object can store various information, such as the one or more commands of the corresponding command entry, the metadata, such as a flag indicating whether the command entry includes a search point command or no search point commands, and a job identifier (ID) of the result set corresponding to the command entry.

Using this approach, the system can identify the search point, as needed, from the list of command entries. For example, in order to execute a pipelined search corresponding to one or more commands added to or modified in the query being constructed, the system can use the metadata to identify which result set to use as a search point. In some implementations, the system determines the most recent command entry corresponding to a command prior to the one or more commands (e.g., for non-filtering and non-transforming command) in the query that has a search point flag and sets the search point to the result set corresponding to the most recent command entry. As described above, a command entry may have a search point flag when the command entry includes at least one filtering and/or transforming command. In another approach, the system analyzes the one or more commands of the command entry list to determine what result set to use as the search point.

Thus, in response to a user selecting one or more commands to modify the query, the system may automatically identify and/or determine the search point by analyzing one or more previous commands (e.g., via the metadata or otherwise), execute a modified query on the identified search point, and display one or more events corresponding to the modified query. As mentioned above, in some cases, a user can select an endpoint of the query and the query results displayed in the table format are caused to correspond to the commands of the query up to the endpoint. In these implementations, the system can similarly identify a search point for the feedback (e.g., by searching for the most recent filtering and/or transforming command to the endpoint, as described above).

In some implementations, to execute the modified query, the system constructs the modified query based on the identified search point. For example, in some implementations, the system constructs the modified query so it identifies the search point. In some cases, the system constructs a command(s) and includes the command(s) in the modified query to identify the search point. The command(s) can identify the search point using a search point ID, such as the job ID of the search job that produced the corresponding result set (e.g., extracted from the corresponding command entry object metadata). The commands may be the initial commands of the query, such as where the query is in a pipelined search language like SPL.

For SPL, the system may use a "loadjob" command. The loadjob command loads events or results of a previous search job for a new search job. The result set to load may be identified either by the search job id or a search name (e.g., a saved search name) and optionally a time range of the current search. Thus, the command(s) (e.g., loadjob command) may represent each command of a previous search and the subsequent commands may be included in the modified query for execution by the system. In some implementations, as an example, only previously completed search jobs may be used as search points (e.g., ad hoc or real-time searches may not be available as search points). When the event source is used rather than a search point (e.g., when updating the search point), the system similarity constructs the modified query to identify the event source rather than the search point. In these cases, the modified query may include each command corresponding to the query being constructed for execution by the system (e.g., up to the endpoint). Further, the query may identify the event source.

In some cases, when a user saves the search pipeline, or query being constructed, one or more of the result sets generated based on the user constructing the query are saved in association with the saved pipeline. The saved data set(s) can be loaded with the saved pipelined, such as has been described above, in section 3.5 EXAMPLE PIPELINE SELECTION INTERFACE. A saved data set may be set as the initial search point, such as where the system identifies that it corresponds to a most recent filtering and/or transforming command in the query loaded with the data set. However, it is noted a saved pipeline need not be loaded with any saved data set.

In some cases, based on the user selecting to load a saved pipeline, the system automatically determines which command and/or command entry should correspond to the search point, constructs a query corresponding to the loaded query being constructed up to the command based on the determination, and executes the constructed query. As an example, the identification and construction can be similar to what has been described above when the system updates the search point. Thus, the system may identify a most recent command entry or command (with respect to an endpoint of the query being constructed) from the command entry list that corresponds to a filtering and/or transforming command. The query may be constructed from the command entry object of each command entry up to and including the endpoint (e.g., from the commands defined by those command entries).

When a saved pipeline is loaded, the system may use the last command of the query being constructed as the endpoint. In other cases, the endpoint is saved in association with the saved pipeline (e.g., in metadata). For example, the endpoint could be saved as the current endpoint at the time the user selected to save the pipeline (e.g., corresponding to the selected command entry and corresponding displayed results at save time). It is noted that in some cases, the most recent command, described above, corresponds to the endpoint. In this case, one or more events of the result set of the constructed query are displayed to the user. This can occur where the endpoint is a search point command, such as a filtering and/or transforming command. Where the most recent command does not correspond to the endpoint, such as where the endpoint is a non-search point or non-filtering and non-transforming command, the system may automatically construct a query on the search point and display one or more events of the result set of the query to the user (e.g., instead of events from the search point result set). Once displayed, the user can continue with constructing the query and the system can update the search point as desired.

It is noted that whether a particular command or set of commands is used as a new search point can depend upon the context in which the user selects to extend or modify a query with the command(s). For example, this may depend upon the particular UI element(s) the user interacts with to select the command(s) and/or options the user selects. Thus, in some cases, a user may select a first option in the search screen to extend a query with one or more commands and the system determines to retain the current search point, whereas a user may select a second option in the search screen to extend a query with the same one or more commands and the system determines to update the search point. In this case, each option could be associated with different metadata, which instructs the system to perform the corresponding actions (e.g., updating or maintaining the current search point).

While the forgoing described the system analyzing metadata associated with the selected one or more commands, and selections being pre-defined as search point or non-search point selections or commands, in other implementations, the system analyzes one or more of the parameters, command identifiers, or other command elements in the command(s) selected by the user to determine whether to execute a new search on the event source or a result set (or which result set). Also, in some cases, the system can base the determinations on the metadata, but it is noted that the metadata is not necessarily outcome determinative. For example, the system may consider other factors when setting and determining search points, such as whether a search job has timed out, whether a result set is unavailable, or whether a search point is stale (e.g., based on a time stamp assigned to the result set).

As another example, the system may analyze a result set to determine whether to run a new pipelined search on the result set or the event source. As one example, the system could determine to execute a new pipelined search on the event source based on determining that executing the new pipelined search on the result set would result in a result set comprising less than a threshold number of events, or the events otherwise failing to satisfy some criteria (e.g., display criteria). The threshold or other criteria could be determined based on analyzing the one or more commands selected by the user to modify the query. For example, the criteria could be extracted or determined from one or more command attributes, such as a command parameter. As one example, the system could determine that result set 2358 or result set 2356 comprises a sufficient number of events (e.g., at least ten) to satisfy the requirements of the head command and use one of those results as a search point based on the determination. In some cases, this may include the system running the new search on a result set, and analyzing the results. The system may then run the search on the event source based the system determining the search results are insufficient (e.g., to display to the user as feedback). Otherwise the search results could be displayed to the user as feedback. As another example, the system could determine to execute the new search on and display results from the event source for either or both of the selections corresponding to option 2233A and apply button 2263 rather than from a search point.

Although implementations have been described with respect to search screen 2200, it is noted that various implementations apply to other search screens, such as search screen 600, described above. For example, using search screen 600, the user could select the command(s) to modify the query using search bar 602. This can include the user typing at least one new command into the search bar, or command line, and/or modifying at least one command in search bar 602 (e.g., a command corresponding to a previously executed pipelined search). Although the search query displayed in search bar 602 and being constructed by the user may specify the event source for execution of the query, the system can construct a corresponding query on a result set, which is run to provide events displayed for the visual feedback for the query being constructed by the user.

Thus, as described above, in various implementations, processing power and storage used in constructing a query can be significantly reduced by reusing search results and/or search jobs, optionally while factoring in when doing so would or would not be desirable based on various factors.

4.4 Additional Examplary Implementations

FIG. 24 presents a flowchart illustrating a method of reusing result sets in accordance with the disclosed embodiments. Each block illustrating methods in accordance with FIG. 24, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 2402, a result set corresponding to a pipelined search is displayed. For example, a search system can cause one or more events of result set 2356 to be displayed in search screen 2200, as described above with respect to FIGS. 22A and 22B.

At block 2404, a selection of a command to modify the pipelined search is received. For example, the search system can receive, from a user, a selection of a command from a plurality of selectable commands, the selection being to extend the pipelined search with the selected command in a new pipelined search. The selection can correspond to option 2233A and the plurality of selectable commands can correspond to the various options selectable by the user in one or more option menus.

At block 2406, the results set or an event source is selected between for execution of a new pipelined search. For example, the search system can select between results set 2356 and event source 2350 for execution of the new pipelined search. The selection can be based on an analysis of the selected command and at least one command of the pipelined search. For example, the system can analyze metadata associated with the commands (e.g., command entries) to determine whether to update the search point and which result set to use as the search point.

At block 2408, a result set corresponding to the new pipelined search is displayed. For example, the search system can cause one or more events of result set 2358 to be displayed in search screen 2200, as described above with respect to FIGS. 22B and 22C. In the present example, the system has selected the result set based on the commands and constructed a modified query to perform the new pipelined search on the result set.

FIG. 25 presents a flowchart illustrating a method of reusing result sets in accordance with the disclosed embodiments. At block 2502, a selection is received to load a saved pipelined search. For example, a search system can receive a selection of a saved pipeline corresponding to the constructed query in FIG. 23. The selection may correspond to, for example, input link 2109a, 2109b, 2107a, or 2107b in FIG. 21. In particular, in some implementations, a query previously saved and/or constructed using the search interface corresponding to search screen 2200 (or search screens 1800 or 2300) may be used as an input to the search interface corresponding to search screen 2200. For example, as described above, in response to a user selecting a use as input link in FIG. 21, the system may cause the corresponding pipeline of the pipeline entry to be loaded as an input pipeline for an existing search query, or as a basis for a new pipeline that may be created based on the input pipeline. By selecting use as input link 2106d, for example, a saved pipeline corresponding to command of the query constructed in search screen 2200 of FIG. 22D could be loaded into an interface for creating and/or modifying a search query that builds on, or extends, the saved pipeline. As shown, the user selecting (e.g., clicking on) use as input link 2106d causes use as input links 2107a and 2107b to be displayed. The user selecting (e.g., clicking on) edit pipeline 2108d causes edit pipeline links 2109a and 2109b to be displayed. Alternatively any of these links may be directly accessible from the pipeline entry, may be accessible from a different screen and/or interface, or may not be included. It is also noted that one or more of the links may not be included in a pipeline entry, or may be grayed out depending on permissions associated with the user attempting to access the saved pipeline. Each pipeline entry in selection interface 2100 can optionally comprise similar links offering similar functionality as pipeline entry 2102c for the save pipeline corresponding to that entry.

An example of functionality of "edit pipeline" links has been described above. A primary distinction between edit pipeline 2109a and edit pipeline link 2109b is the query interface the saved pipeline is loaded into in response to a user selection of the link. The user can select edit pipeline link 2109a, which reads "Edit in Table," to use the saved pipeline as an input to the search interface corresponding to search screen 2200. In response to selecting the link, the system may, for example, automatically load the saved pipeline into the search interface corresponding search screen 2200 and display search screen 2200 to the user. The user can select edit pipeline link 2109b, which reads "Edit in Search" to use the saved pipeline as an input to the search interface corresponding to search screen 600 and display search screen 600 to the user. In response to selecting the link, the system may, for example, automatically load the saved pipeline into the search interface corresponding to search screen 2200 and display search screen 2200 to the user.

It is noted that in various implementations, loading a saved pipeline using an edit pipeline link loads the metadata stored in association with the saved pipeline. The metadata can be used to restore the editing session to its previous state in the search interface. Thus, it should be appreciated that metadata associated with a data object can include any information necessary to restore a corresponding editing session.

Saving a new pipeline can cause the pipeline to be displayed in selection interface 2100 of FIG. 21. Selecting edit pipeline link 2109a restores the state of the editing session to search screen 2200. Thus, the search screen may appear substantially as it did in the table format when the query was initially constructed and form elements of the forms may include input provided in the previous editing session (e.g., by loading form metadata, table formatting metadata, and/or command entry list metadata). However, the events displayed to the user may vary depending on any changes to the events at the event source or in result sets.

It is further noted that selecting edit pipeline 2109b can similarly function to restore the state of an editing session in a search interface corresponding to search screen 2200. Furthermore search screen 2200 may optionally include a save option. Care may be taken to allow for accessing saved pipelines where an editing session was saved in one search interface and editing is resumed in a different search interface.

At block 2504, a search point and an endpoint of the saved pipelined search are identified. For example, in response to the user selecting input link 2109a, the search system can determine the search point and the endpoint by analyzing the metadata saved with respect to the command entries. With respect to FIG. 22D, the system may identify command entry 2235 (e.g., the command corresponding to command entry 2235) as corresponding to the search point and command entry 2239 (e.g., the command corresponding to command entry 2239) as corresponding to the endpoint.

At block 2506, a result set is received corresponding to the result set. For example, the search system can construct and execute a query up through the search point to produce the result set, or the result set may have been previously saved and is loaded by the search system (e.g., in association with the saved pipeline).

At block 2508, a query is executed on the result set corresponding to the saved pipeline up through the endpoint. For example, based on the endpoint being different than the search point, the search system can construct and execute a query that is executed on the result set corresponding to the search point.

At block 2510, a result set of the executed query is displayed. For example, the search system can cause display of one or more events of the result set to the user. The display could appear similar to FIG. 22D. Furthermore, the display may be automatically presented in response to the user selecting input link 2109a. The user can then continue to modify and/or extend the query that was previously constructed.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The invention claimed is:

1. A computer-implemented method for executing search queries, the method comprising:
identifying an indication of a command selected to modify a query comprising a pipeline query language;
analyzing at least one command of the modified query to determine whether to execute the modified query on an event source having a set of events and whether to execute the modified query on a result set from a previous search performed on the set of events at the event source using the query, wherein each event of the set of events comprises a portion of raw machine data;
based on the determination, executing, by at least one processor, the modified query on the set of events of the event source or the result set from the previous search performed on the set of events at the event source; and
causing display of at least one event of a second result set from the execution of the modified query.

2. The computer-implemented method of claim 1, wherein the query corresponds with a plurality of commands represented in a command entry list, and the determining is based on metadata of at least one command entry in the command entry list.

3. The computer-implemented method of claim 1, further comprising receiving a selection of the command to use to modify the query, wherein the selection of the command is of an option of a plurality of selectable options in an option menu, each selectable option corresponding to one or more of a plurality of selectable commands.

4. The computer-implemented method of claim 1, further comprising:
assigning the result set as a search point prior to identifying the indication of the command selected to modify the query;
determining to retain the result set as the search point, wherein the determining is of the result set based on the determining to retain the result set as the search point.

5. The computer-implemented method of claim 1, further comprising:
receiving a selection of the command, the selection being to extend the query with the selected command to generate the modified query;
selecting between the result set and the set of events of the event source for execution of the modified query based on an analysis of at least the selected command; and
based on the selecting being of the result set, causing display of at least one event of a new result set from the execution of the modified query on the result set.

6. The computer-implemented method of claim 1, wherein at a time of the execution of the modified query on the result set, the event source includes at least one more event incorporated into the set of events than at a time of execution of the previous search performed using the query.

7. The computer-implemented method of claim 1, wherein each event of the set of events comprises a time stamp and the portion of machine data reflects security-related information of at least one computing system.

8. The computer-implemented method of claim 1, wherein the modified query comprises the pipeline query language.

9. The computer-implemented method of claim 1 further comprising generating the modified query based on the command selected.

10. The computer-implemented method of claim 1, wherein the at least one command analyzed comprises the command selected to modify the query.

11. One or more non-transitory computer-readable media having instructions stored thereon, the instructions, when executed by at least one processor of a computing device, to cause the computing device to perform a method comprising:
identifying an indication of a command selected to modify a query comprising a pipeline query language;
analyzing at least one command of the modified query to determine whether to execute the modified query on an event source having a set of events and whether to execute the modified query on a result set from a previous search performed on the set of events at the event source using the query, wherein each event of the set of events comprises a portion of raw machine data;
based on the determination, executing, by at least one processor, the modified query on the set of events of the event source or the result set from the previous search performed on the set of events at the event source; and
causing display of at least one event of a second result set from the execution of the modified query.

12. The one or more computer-readable media of claim 11, further comprising receiving a selection of the command to use to modify the query, wherein the selection of the command is of an option of a plurality of selectable options in an option menu, each selectable option corresponding to one or more of a plurality of selectable commands.

13. The one or more computer-readable media of claim 11, further comprising:
assigning the result set as a search point prior to identifying the indication of the command selected to modify the query;
determining to retain the result set as the search point, wherein the determining is of the result set based on the determining to retain the result set as the search point.

14. The one or more computer-readable media of claim 11, further comprising:
receiving a selection of the command, the selection being to extend the query with the selected command in the modified query;
selecting between the result set and the set of events of the event source for execution of the modified query based on an analysis of the selected command; and
based on the selecting being of the result set, causing display of at least one event of a new result set from the execution of the modified query on the result set.

15. The one or more computer-readable media of claim 11, wherein at a time of the execution of the modified query on the result set, the event source includes at least one more event incorporated into the set of events than at a time of execution of the previous search performed using the query.

16. The one or more computer-readable media of claim 11, wherein the modified query comprises the pipeline query language.

17. A system comprising:
at least one processor; and
memory having instructions stored thereon, the instructions, executable by the at least one processor to cause the system to perform a method comprising:

identifying an indication of a command selected to modify a query comprising a pipeline query language;

analyzing at least one command of the modified query to determine whether to execute the modified query on an event source having a set of events and whether to execute the modified query on a result set from a previous search performed on the set of events at the event source using the query, wherein each event of the set of events comprises a portion of raw machine data;

based on the determination, executing, by at least one processor, the modified query on the set of events of the event source or the result set from the previous search performed on the set of events at the event source; and causing display of at least one event of a second result set from the execution of the modified query.

18. The system of claim 17, wherein modified query applies a late-binding schema.

19. The system of claim 17, wherein the at least one command analyzed comprises the command selected to modify the query.

\*   \*   \*   \*   \*